A. A. MERRITT.
SEWING MACHINE.
APPLICATION FILED DEC. 12, 1908.
1,041,652.
Patented Oct. 15, 1912.
35 SHEETS—SHEET 7.
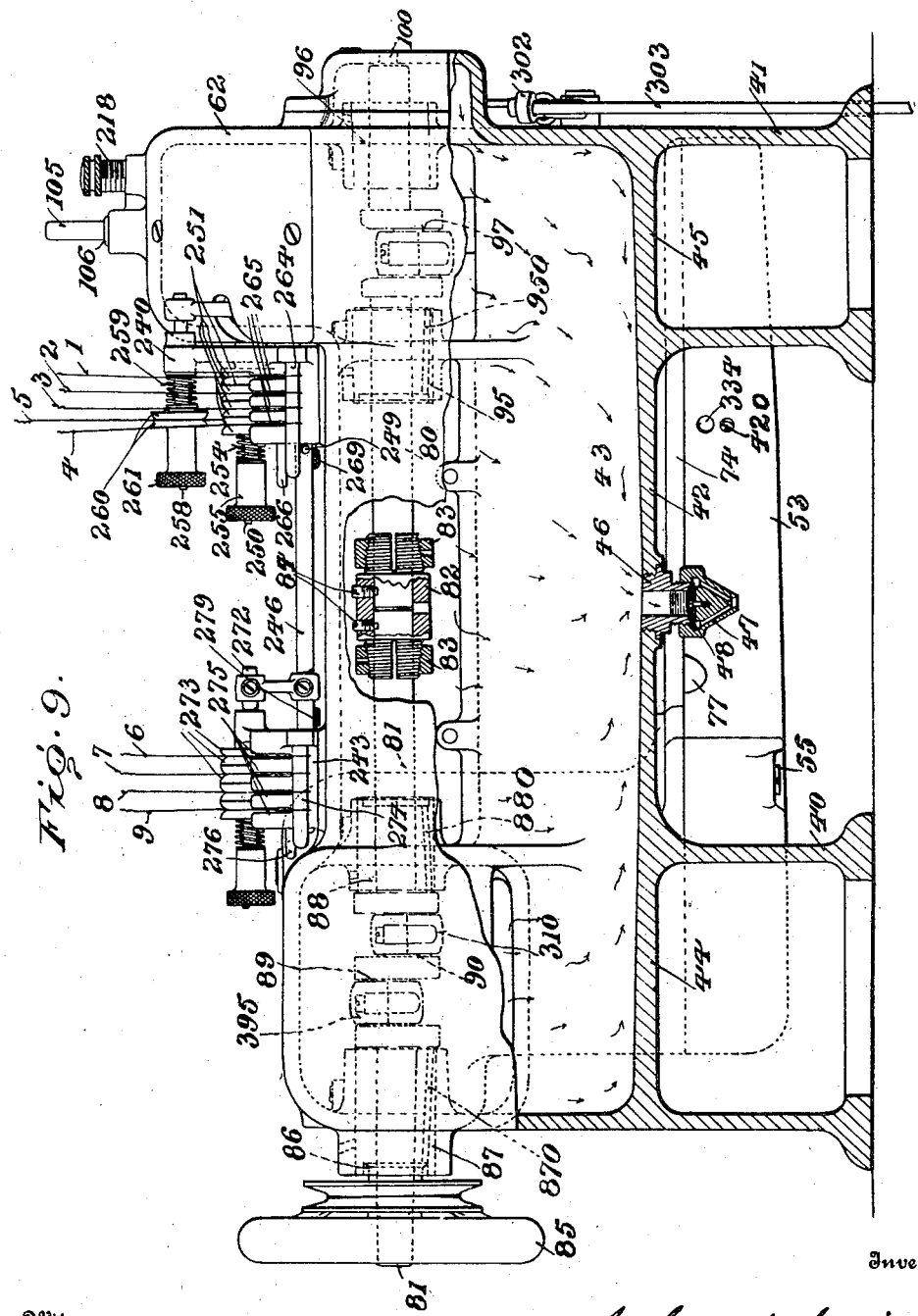

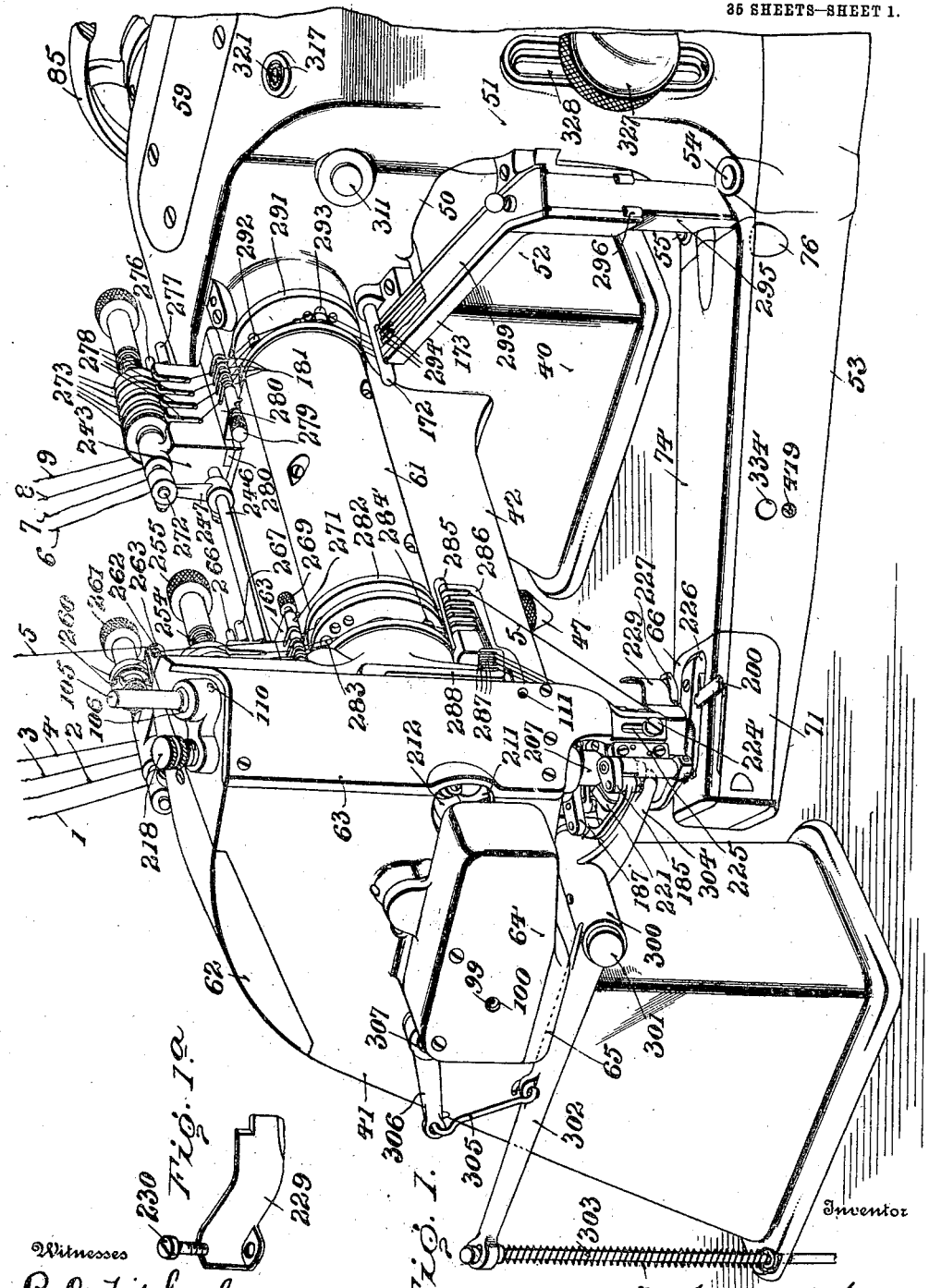

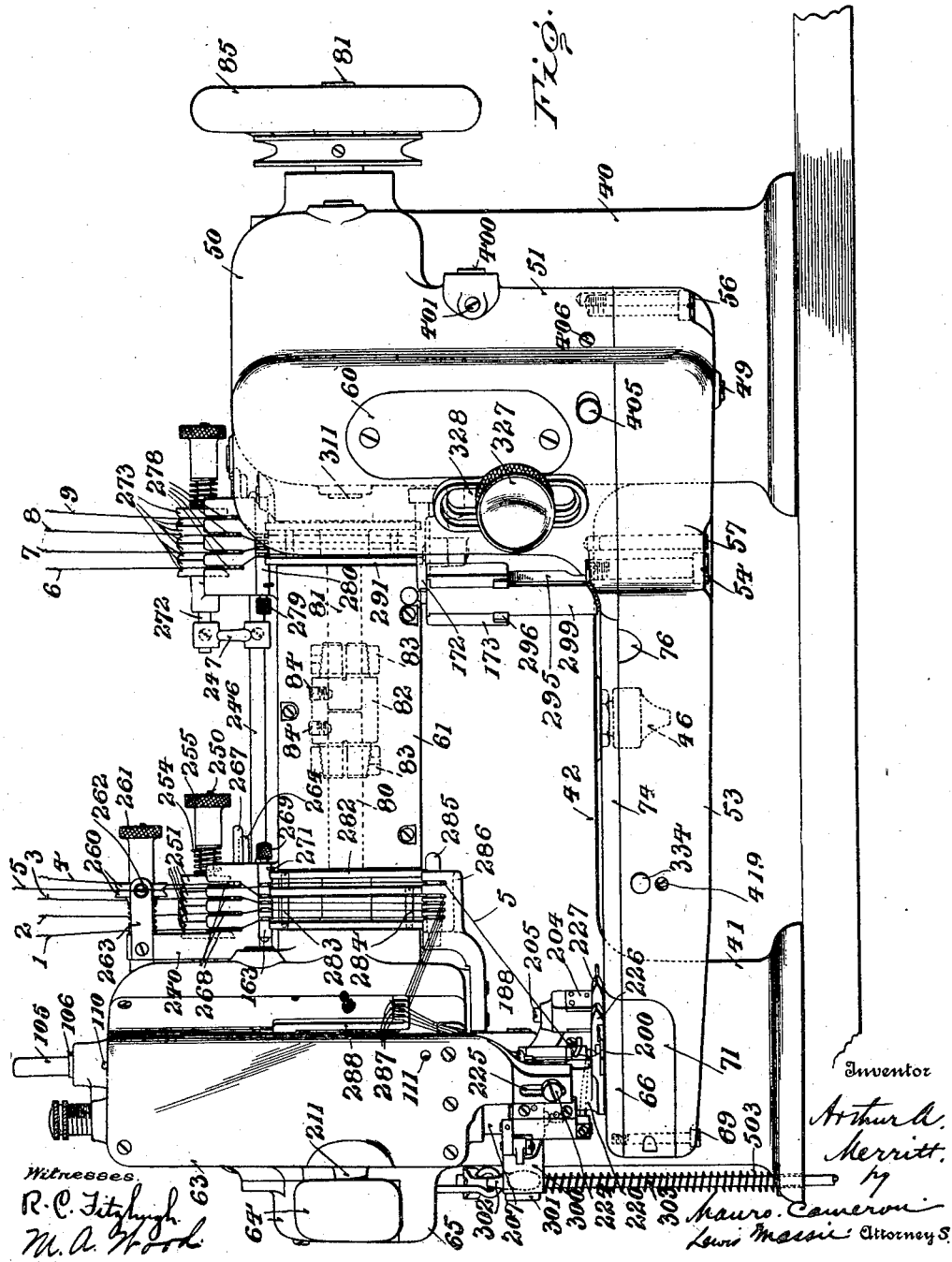

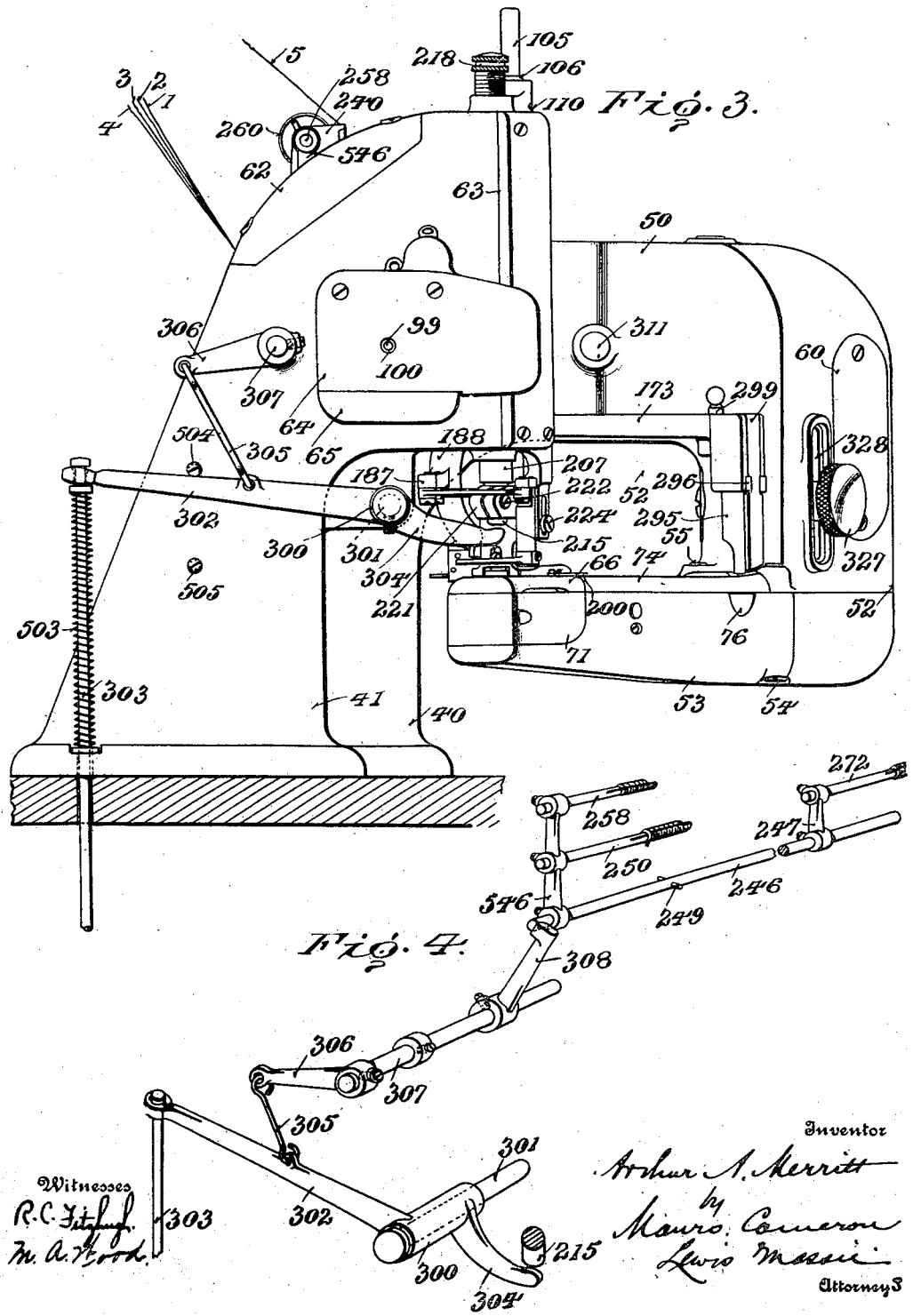

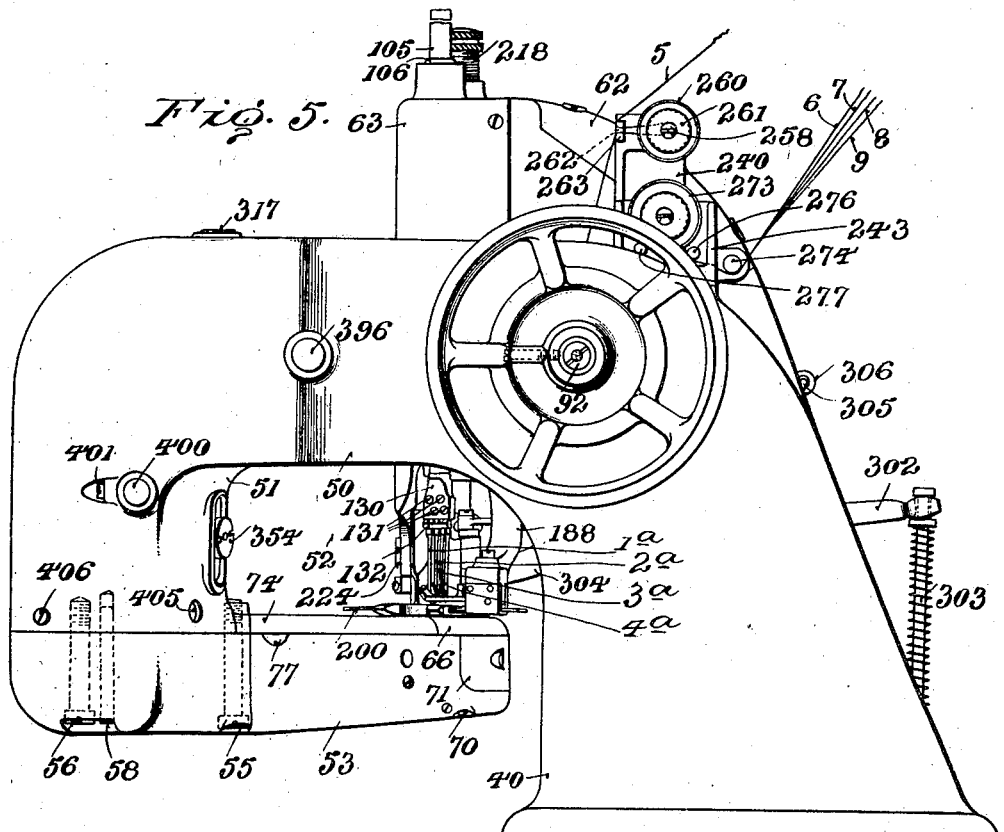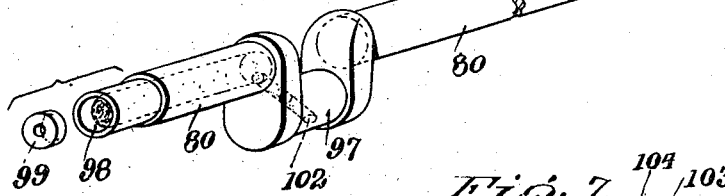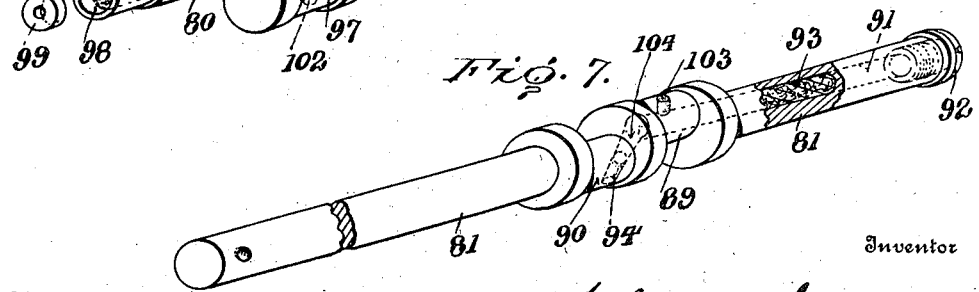

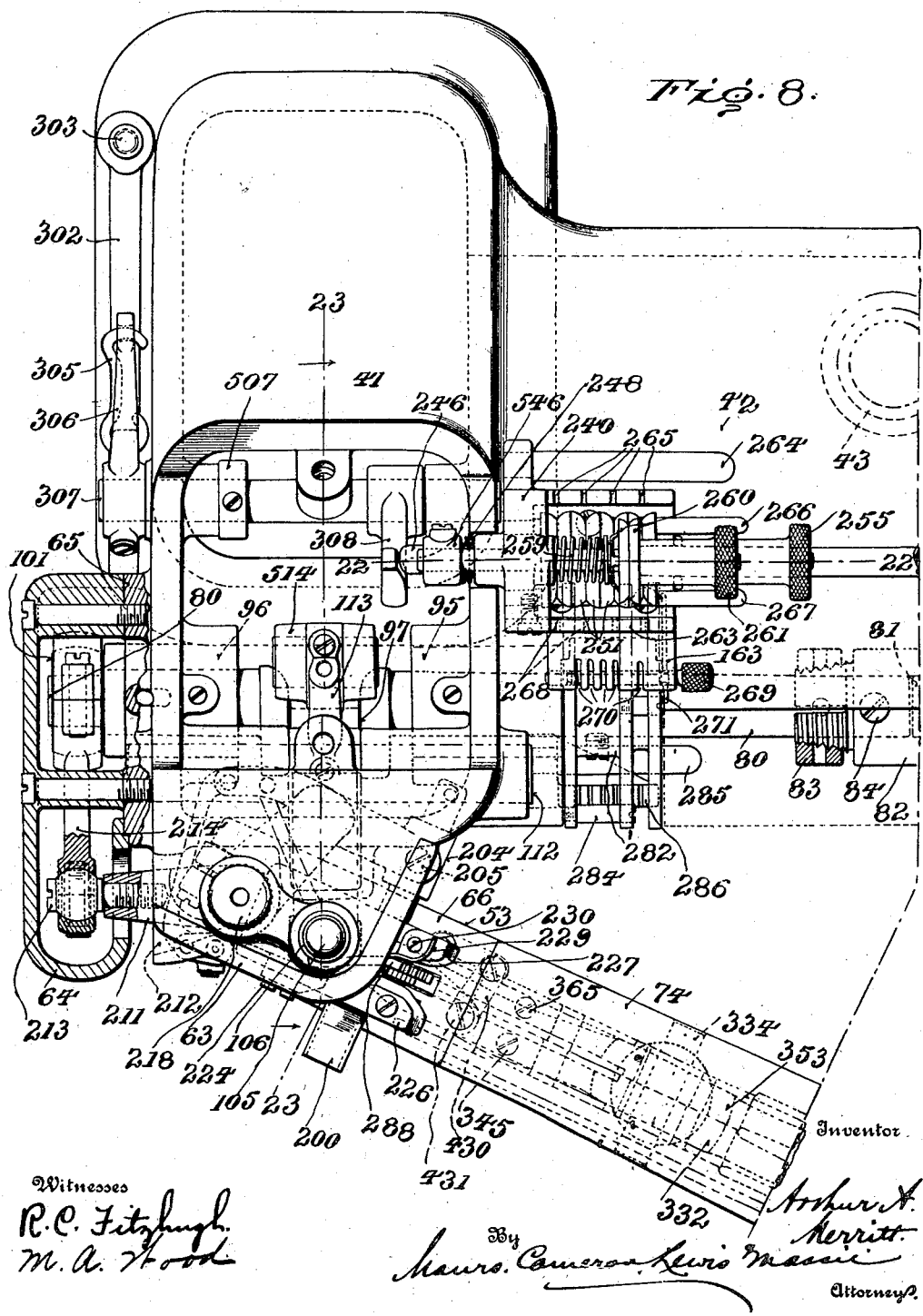

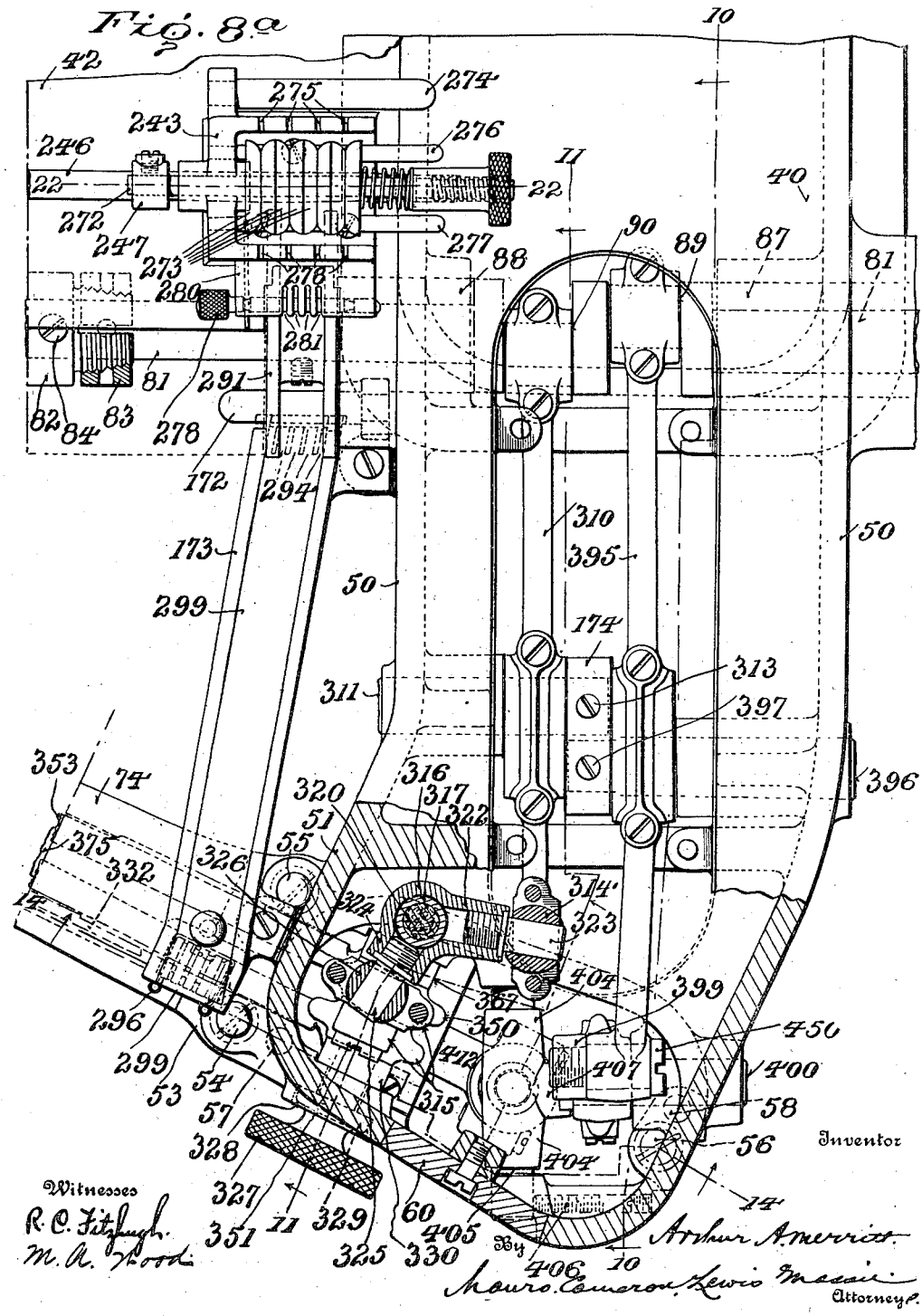

A. A. MERRITT.
SEWING MACHINE.
APPLICATION FILED DEC. 12, 1908.
1,041,652.
Patented Oct. 15, 1912.
35 SHEETS—SHEET 8.
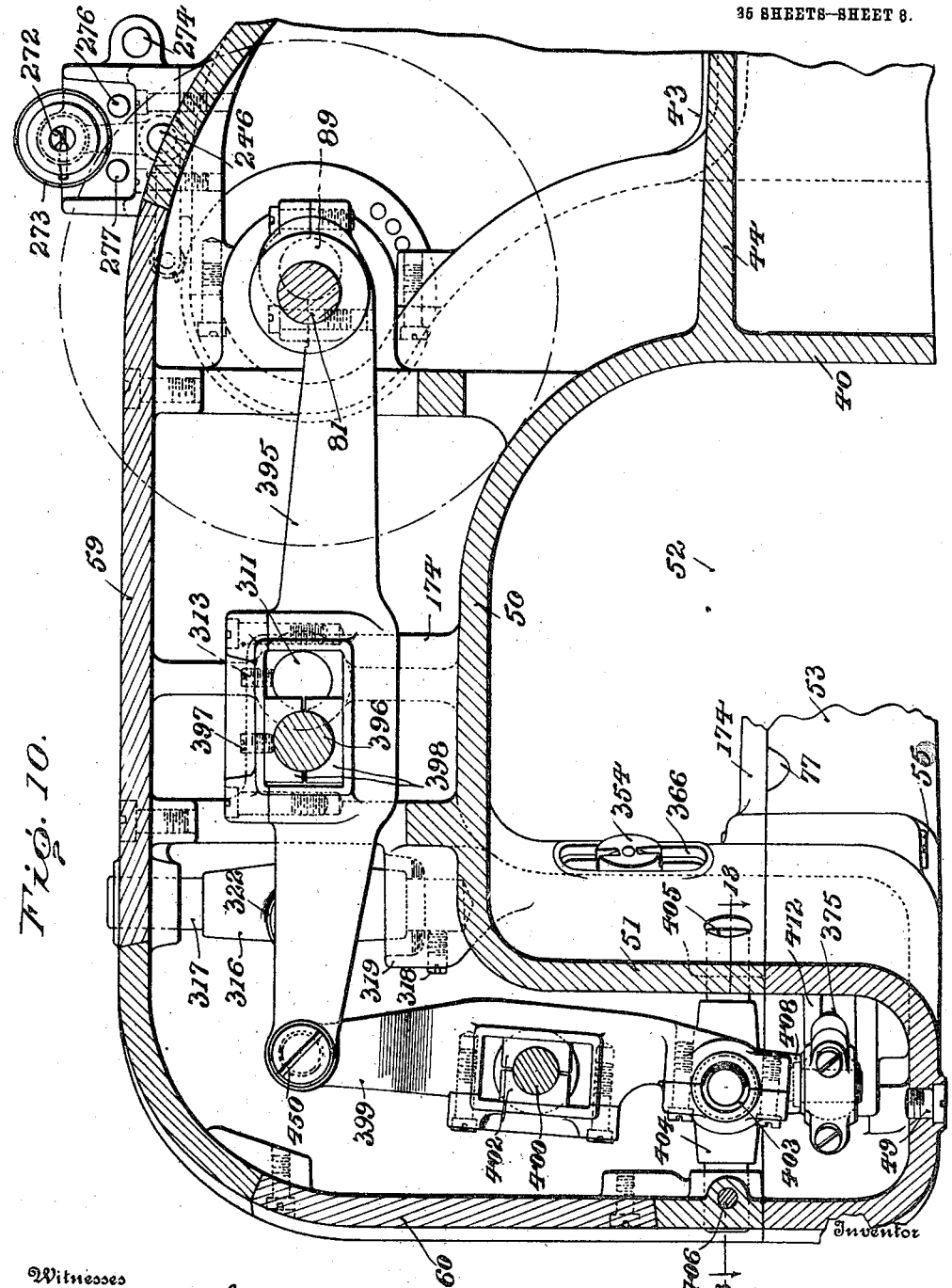

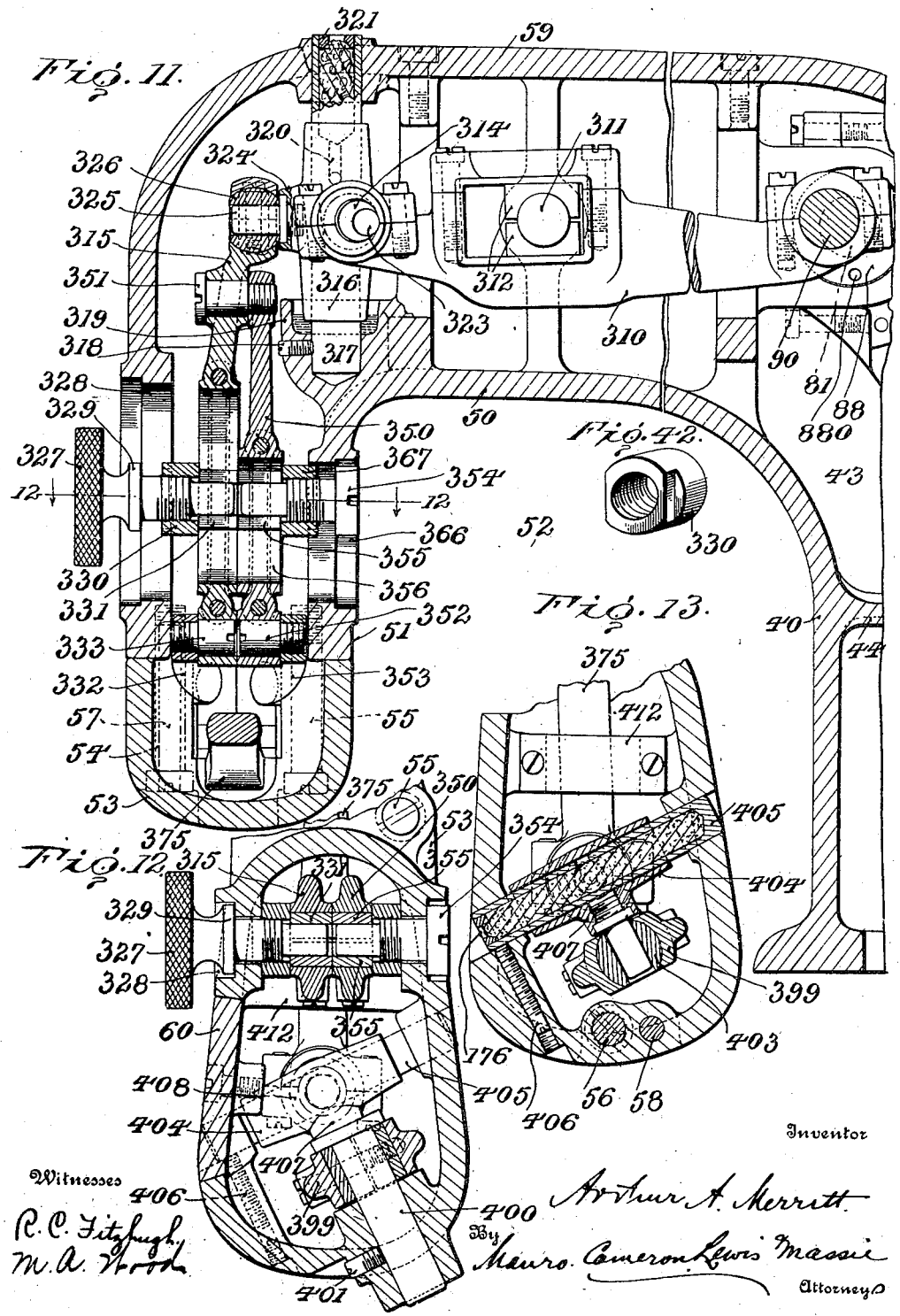

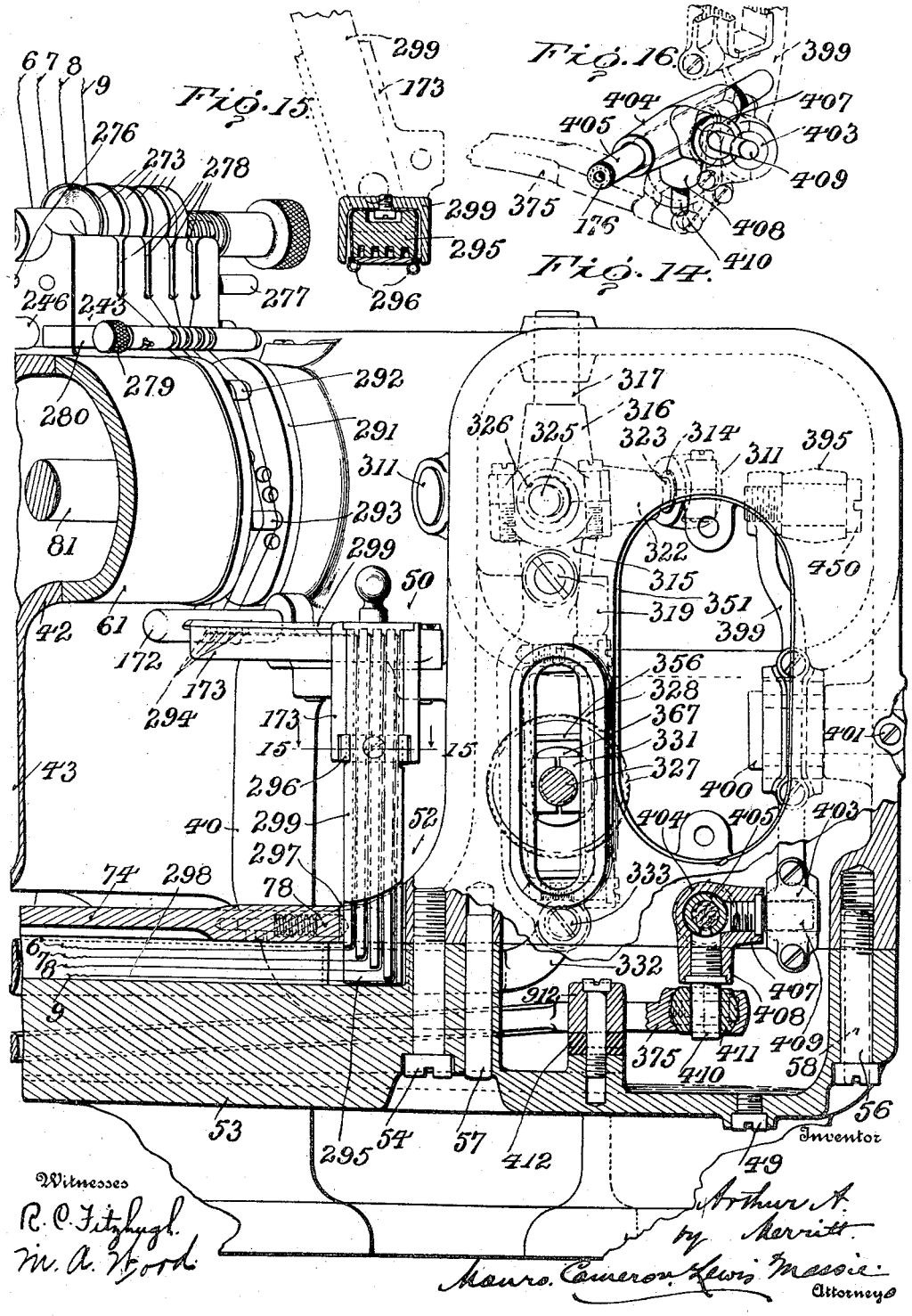

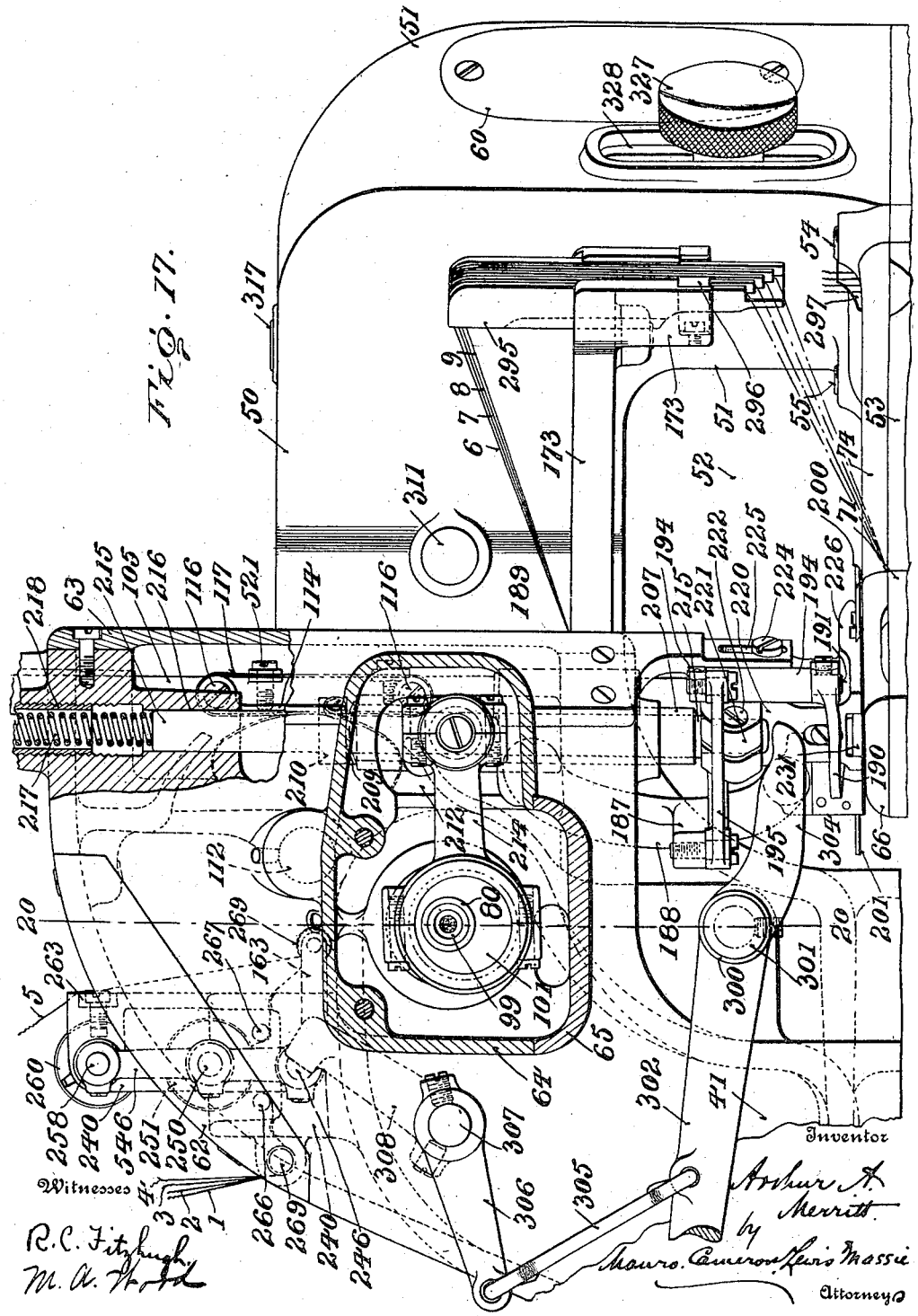

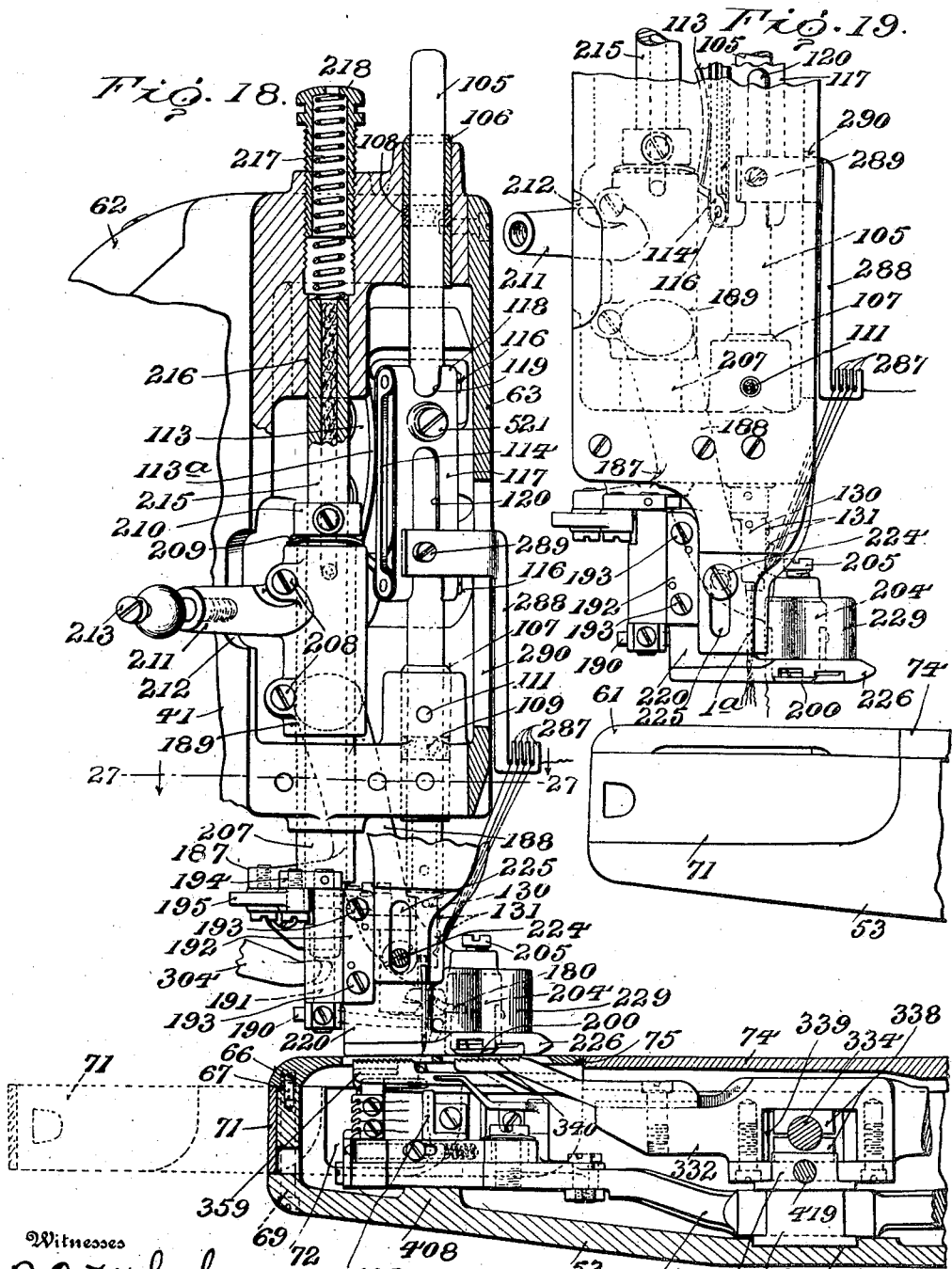

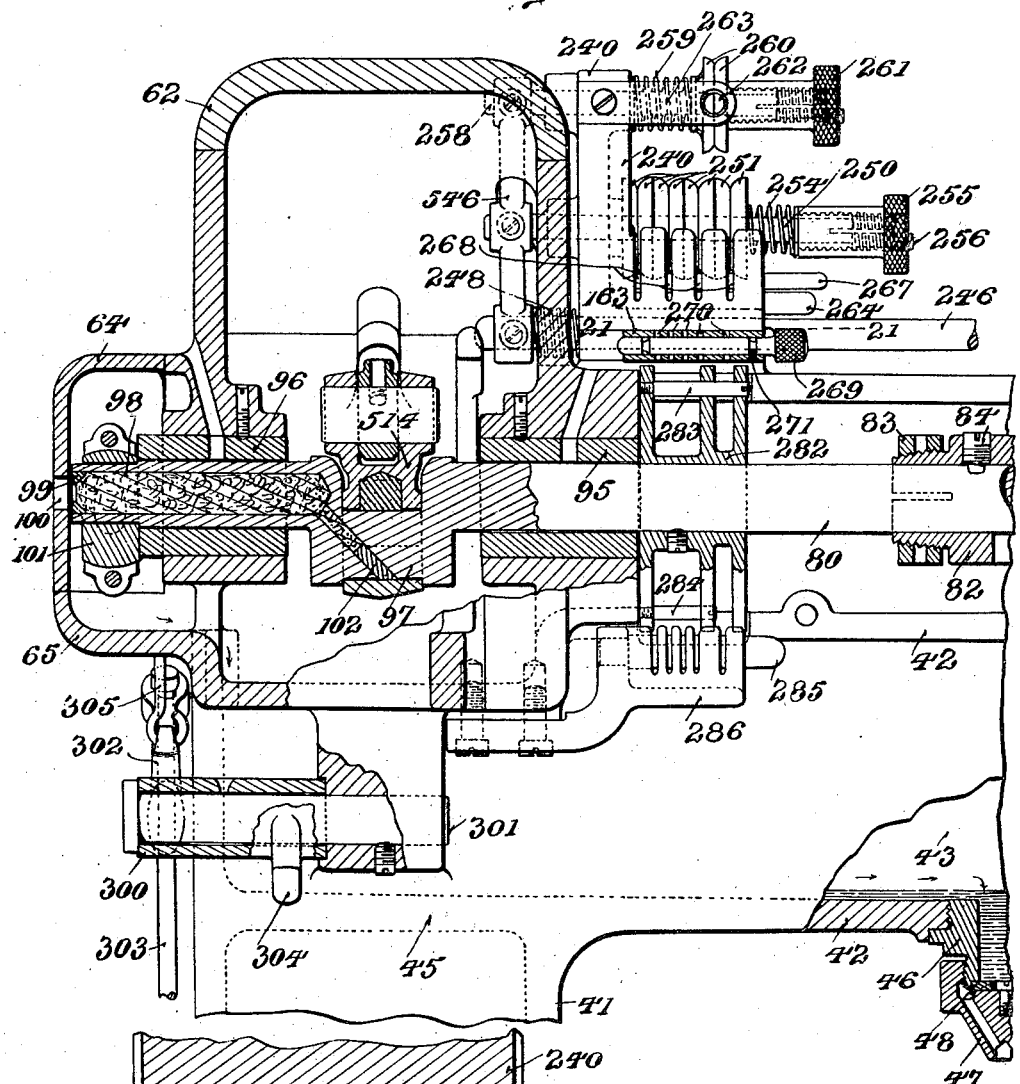

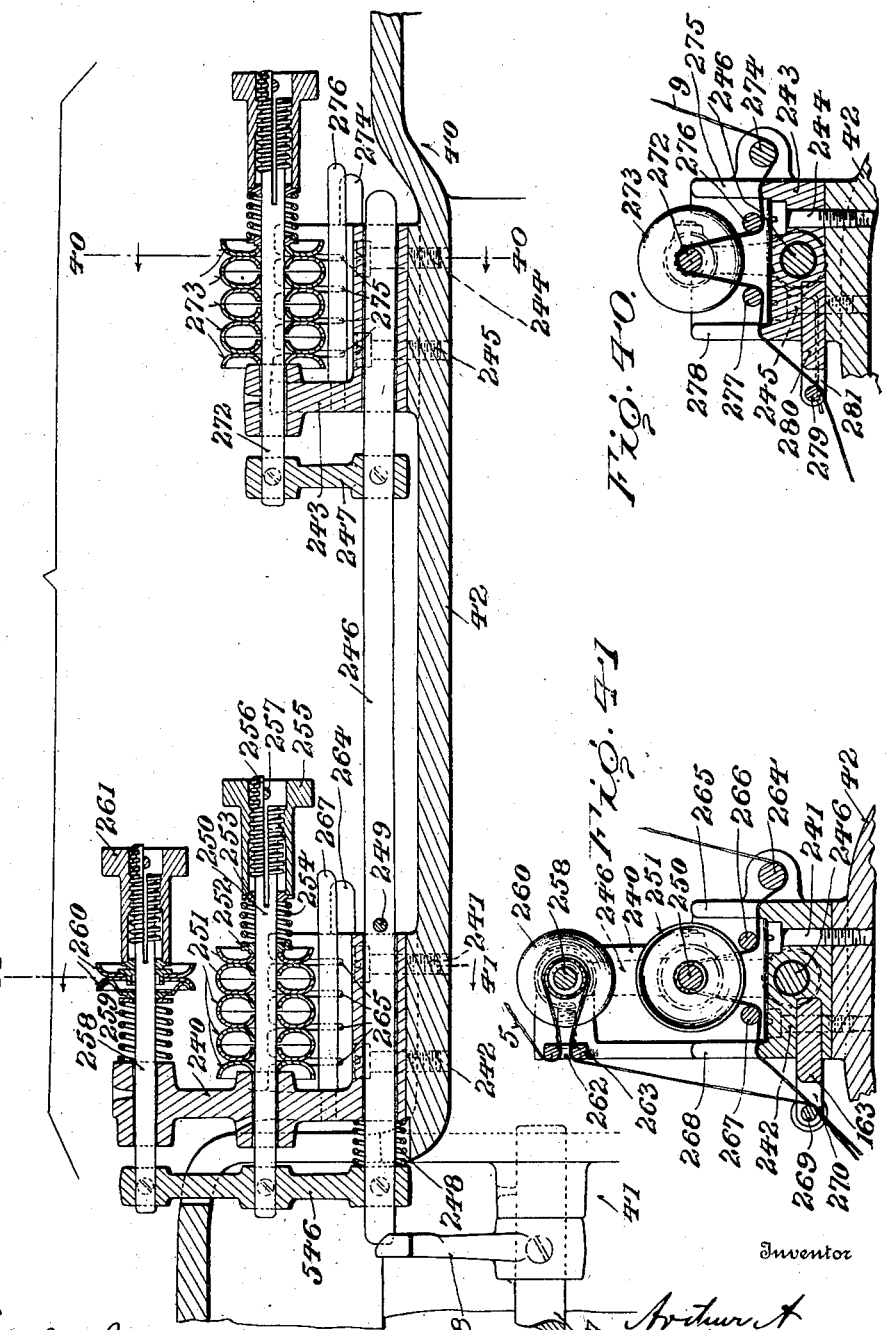

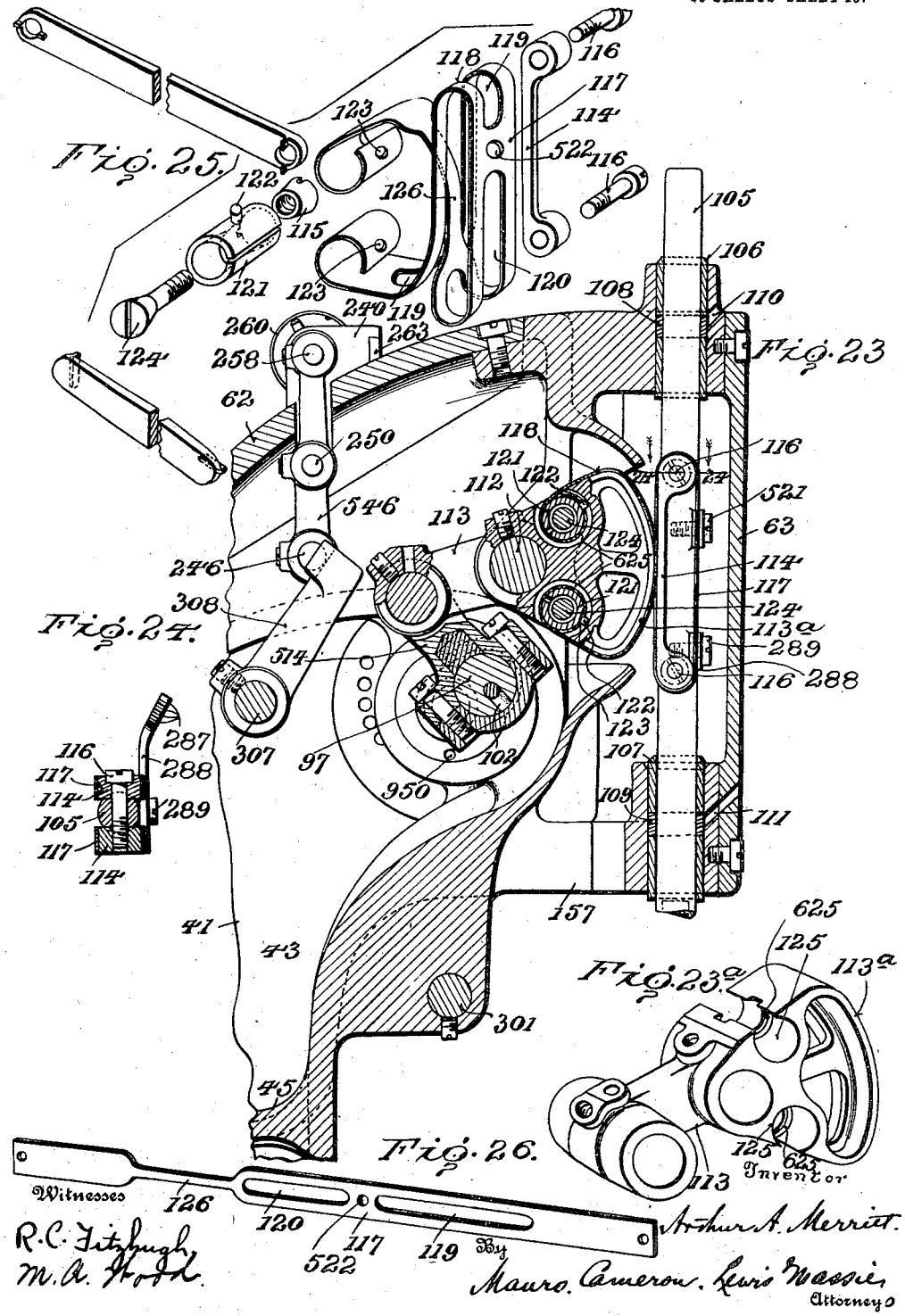

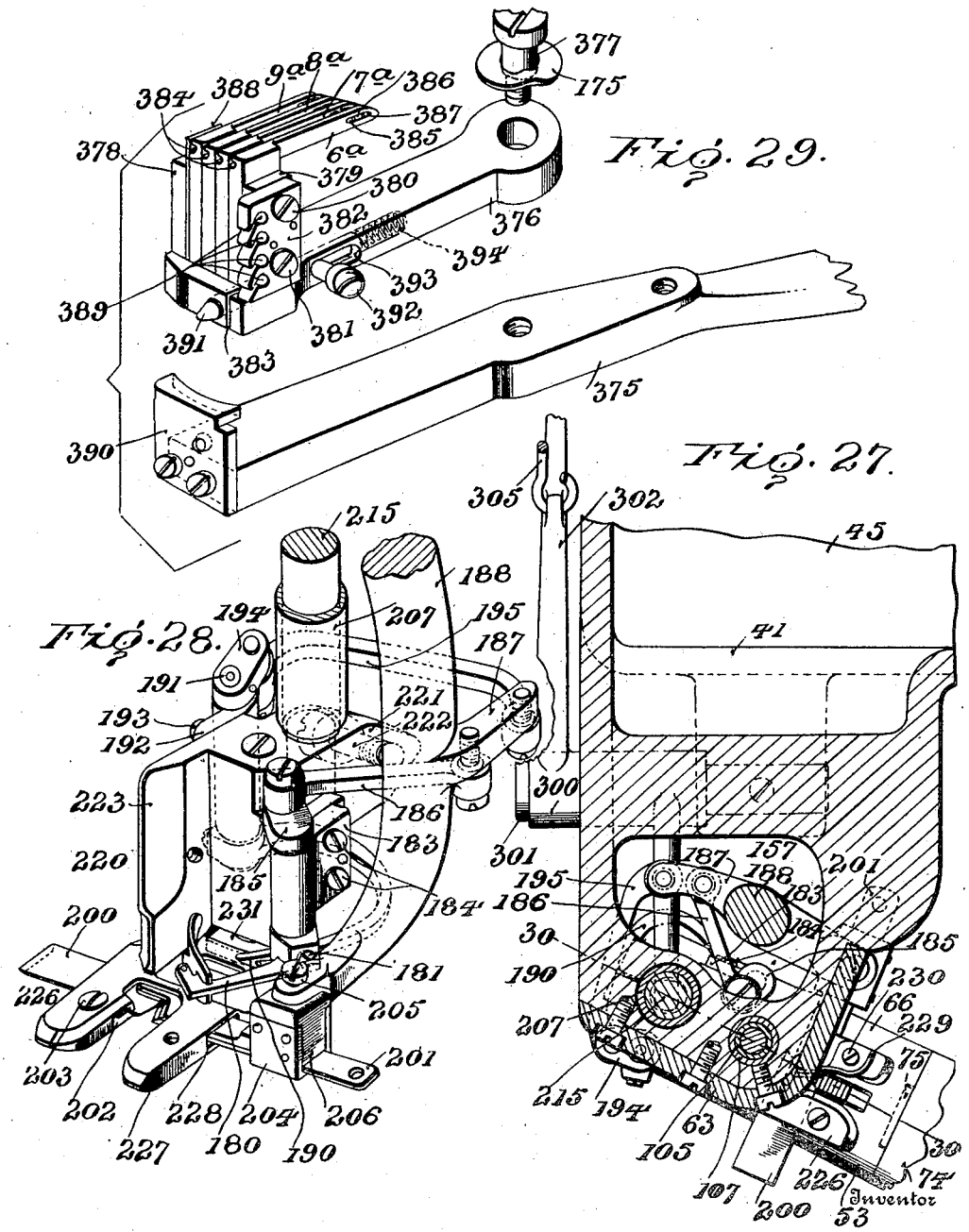

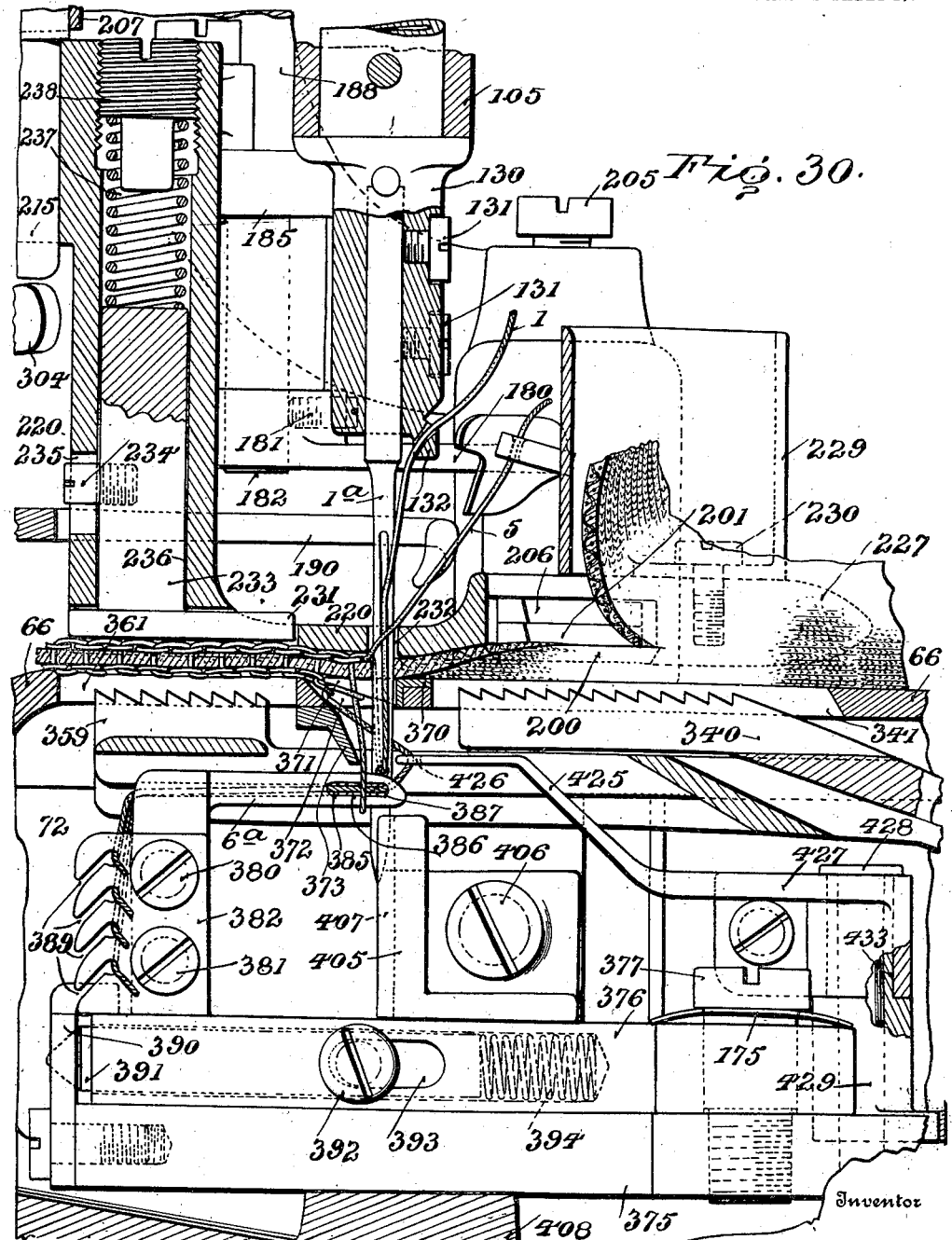

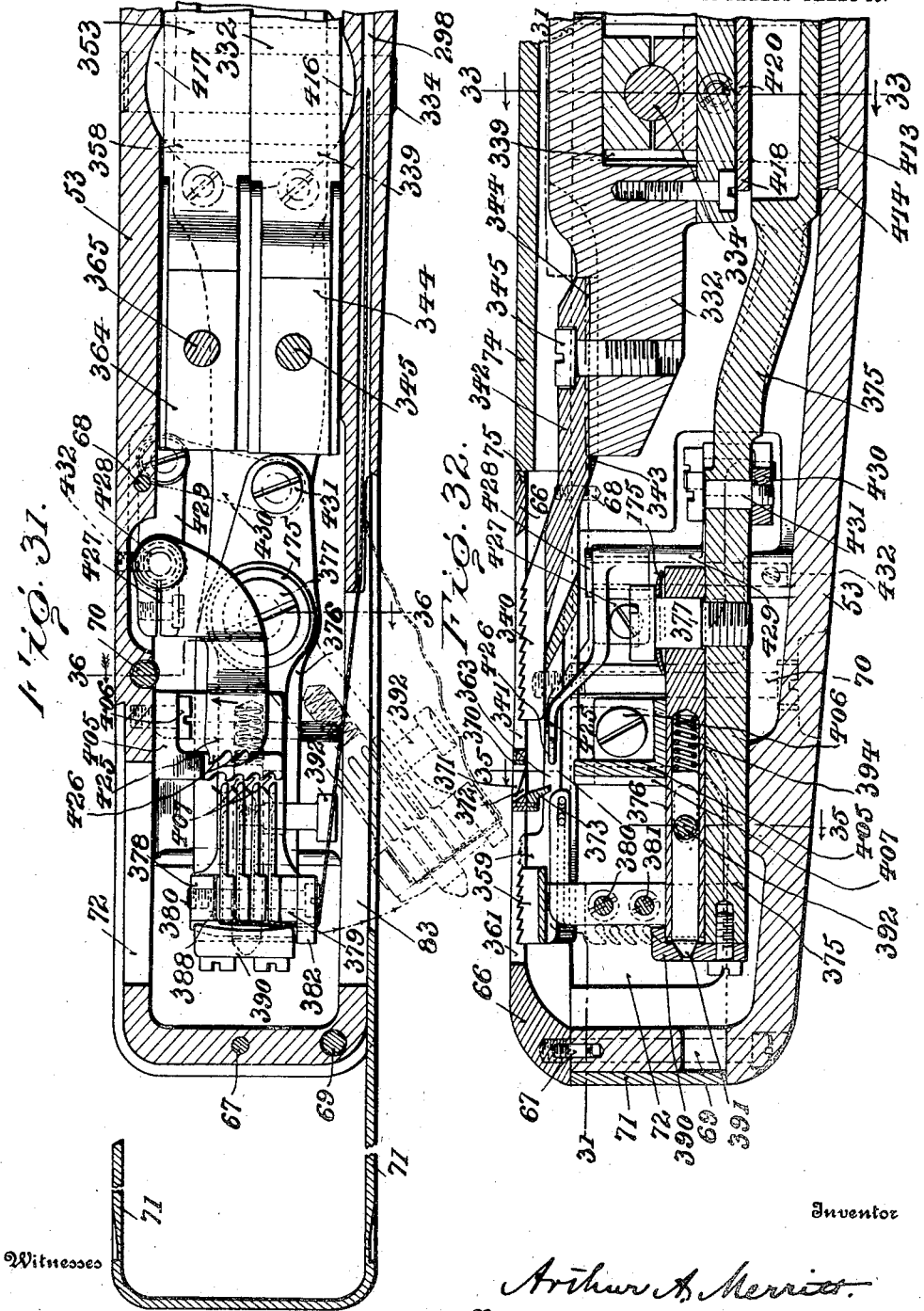

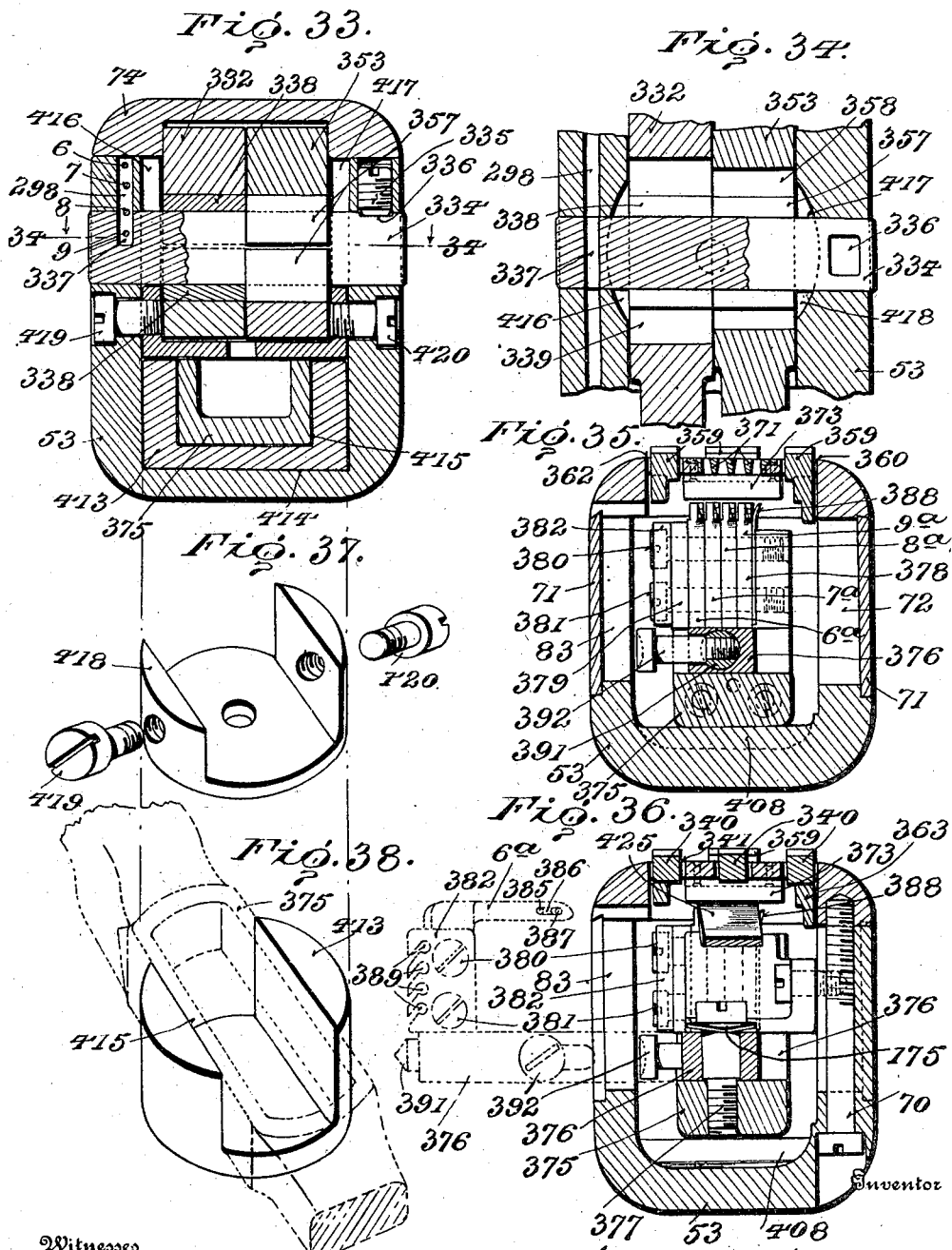

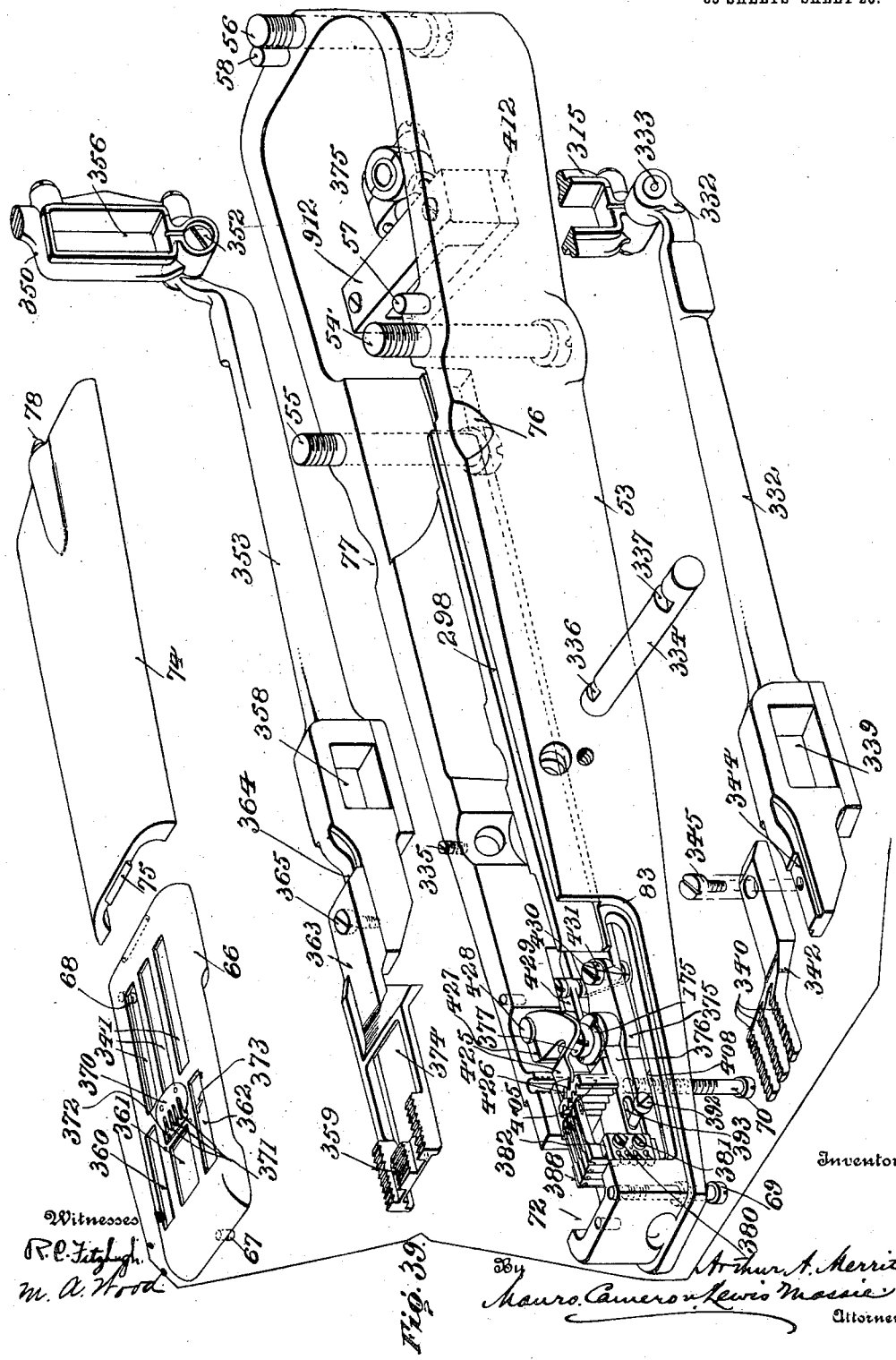

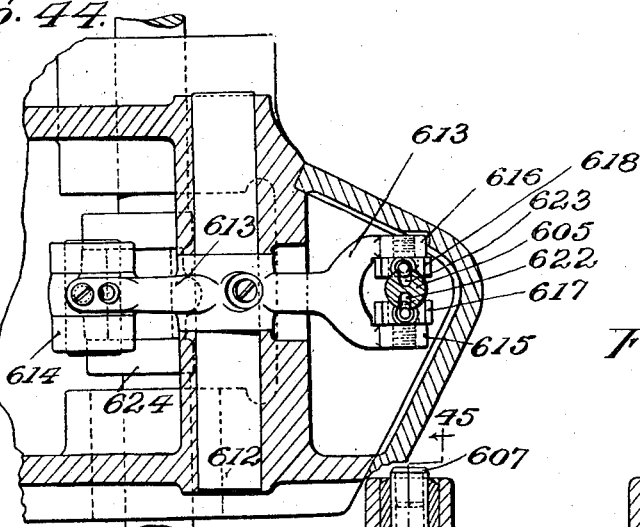
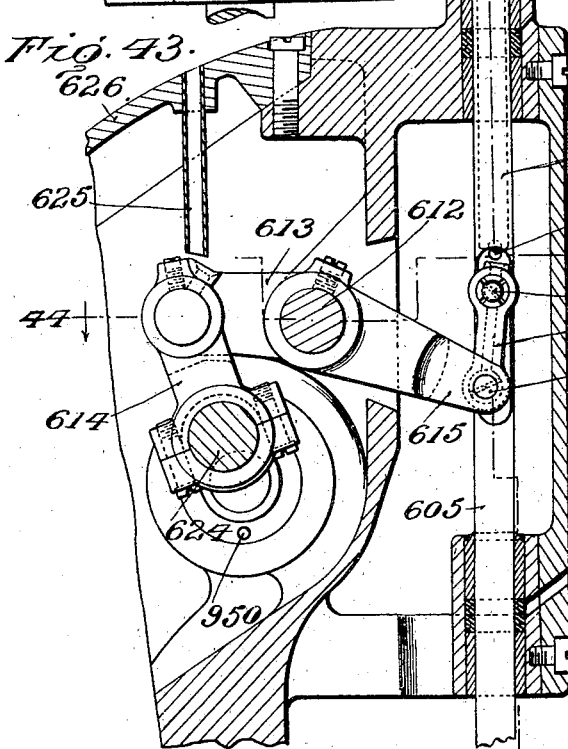
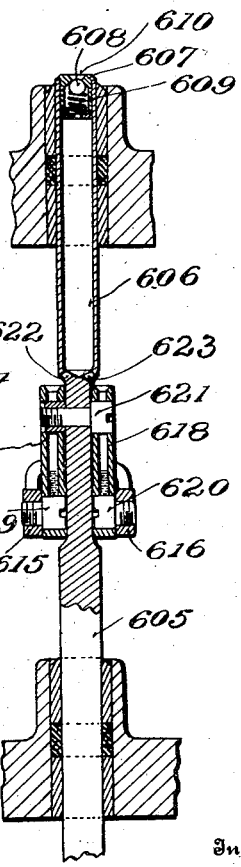

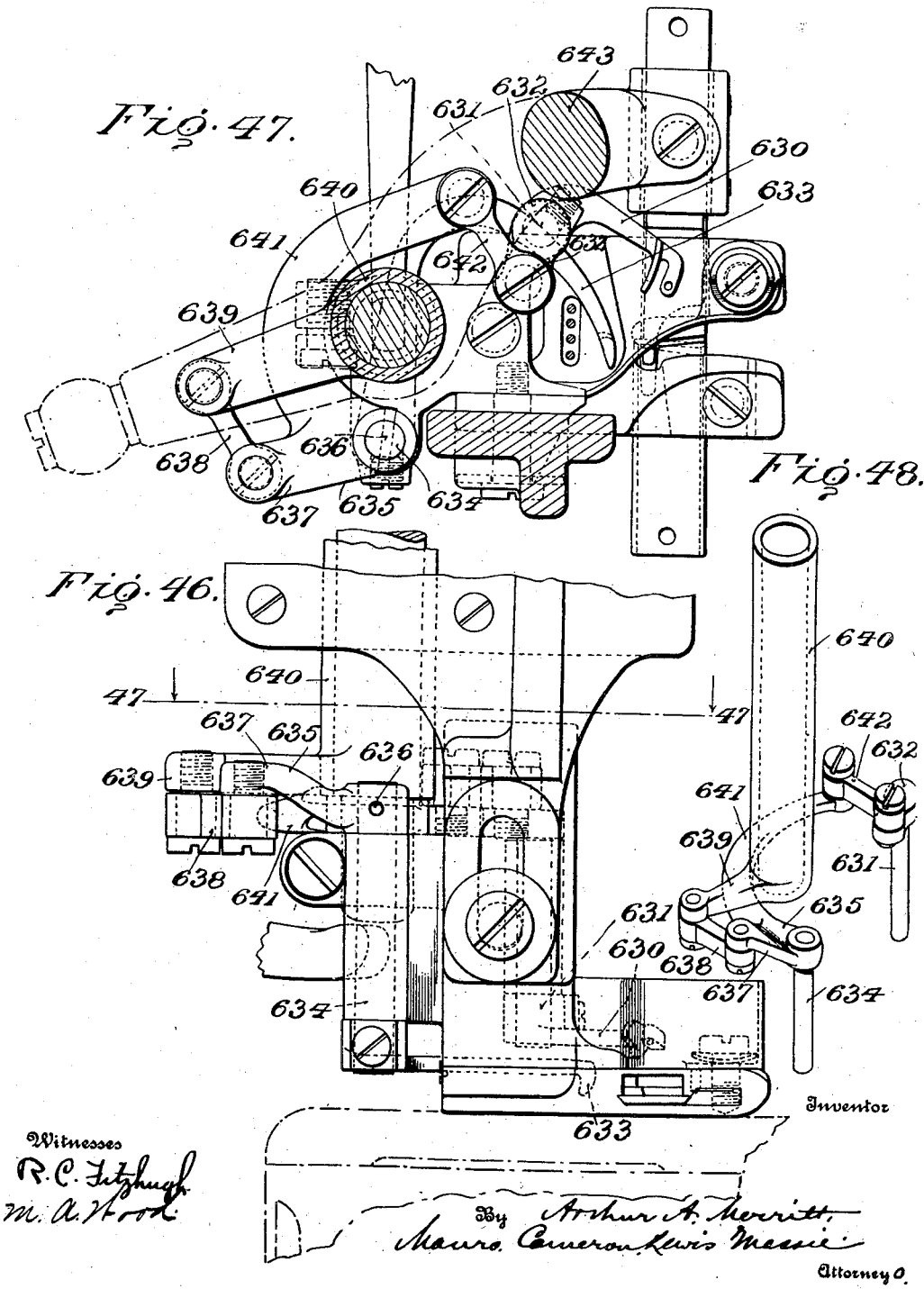

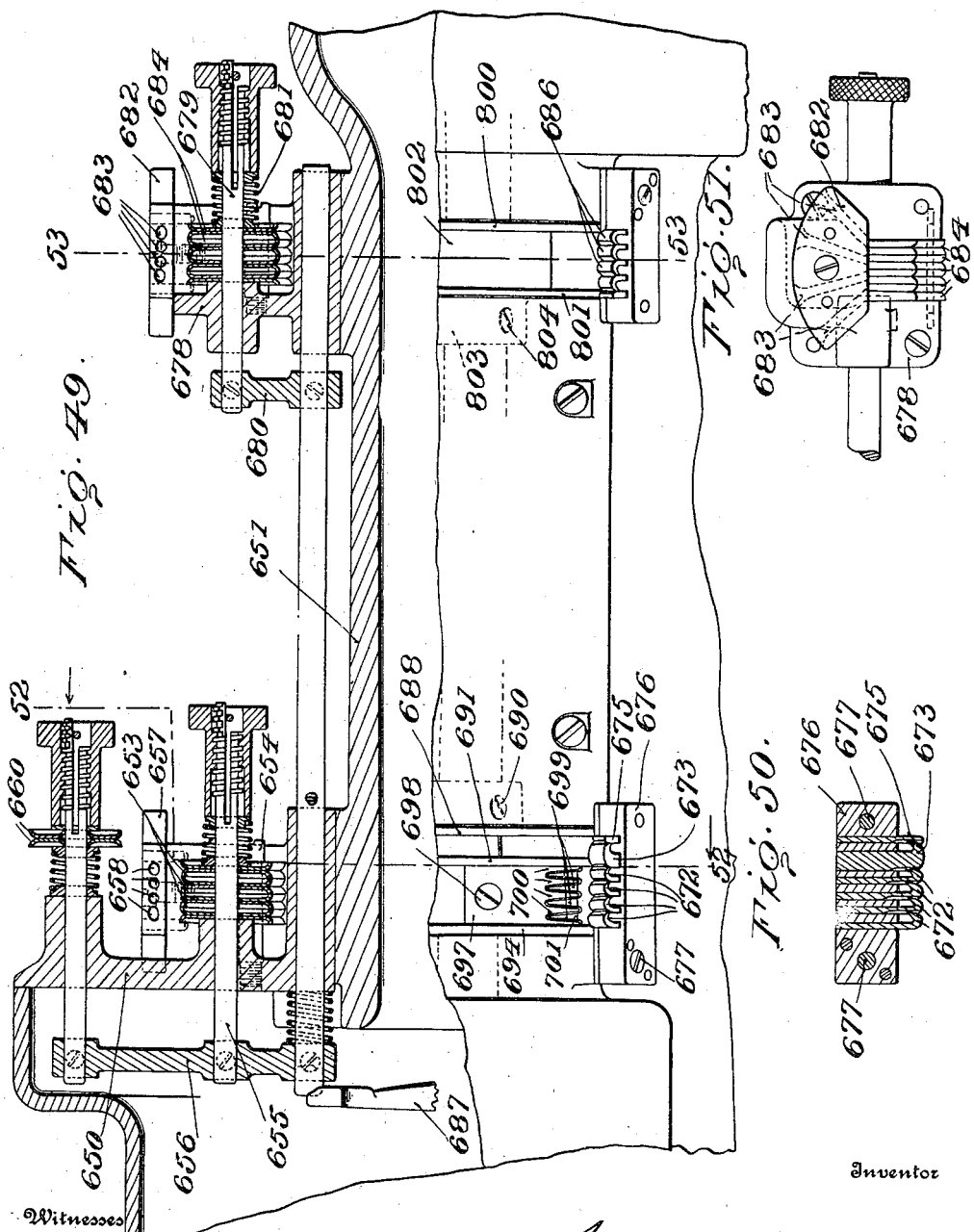

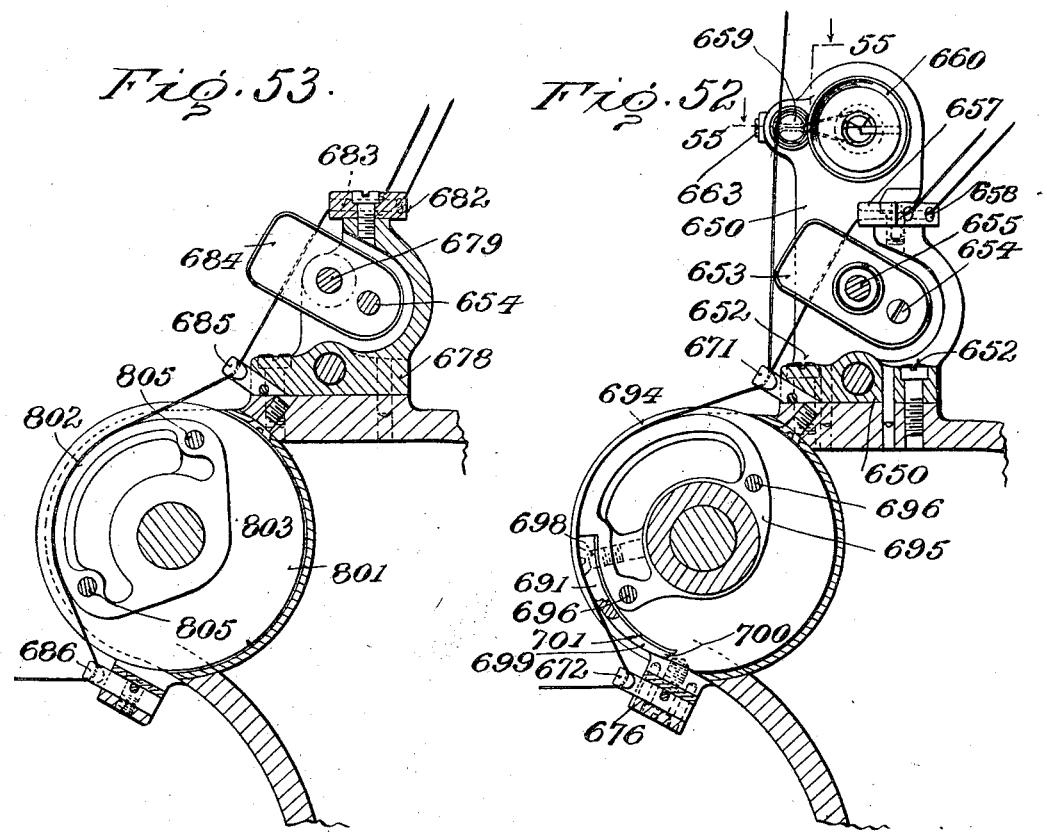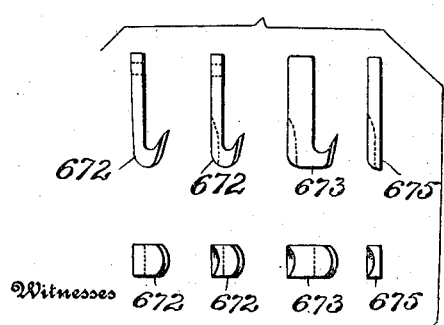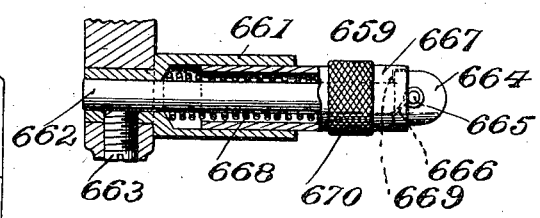

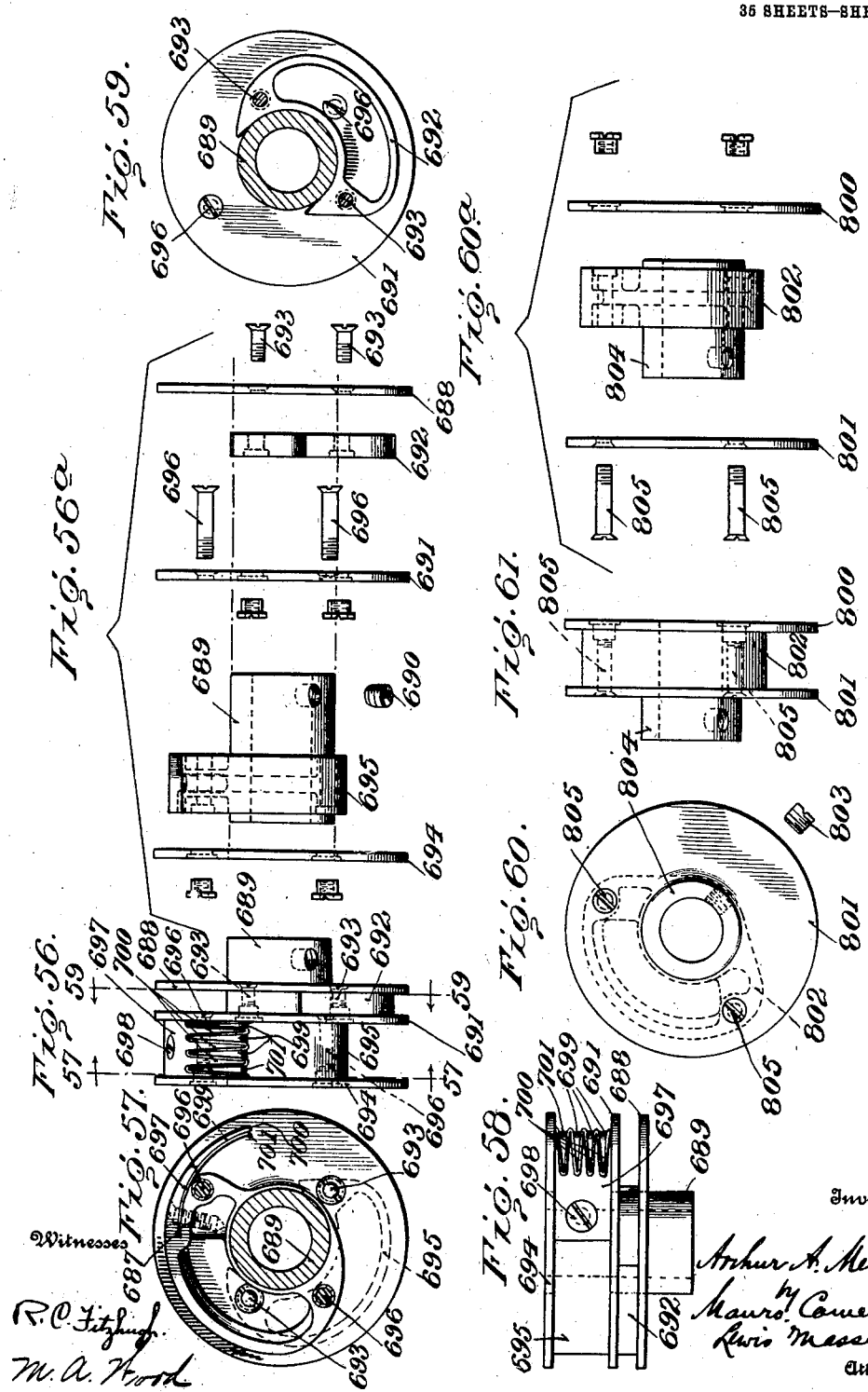

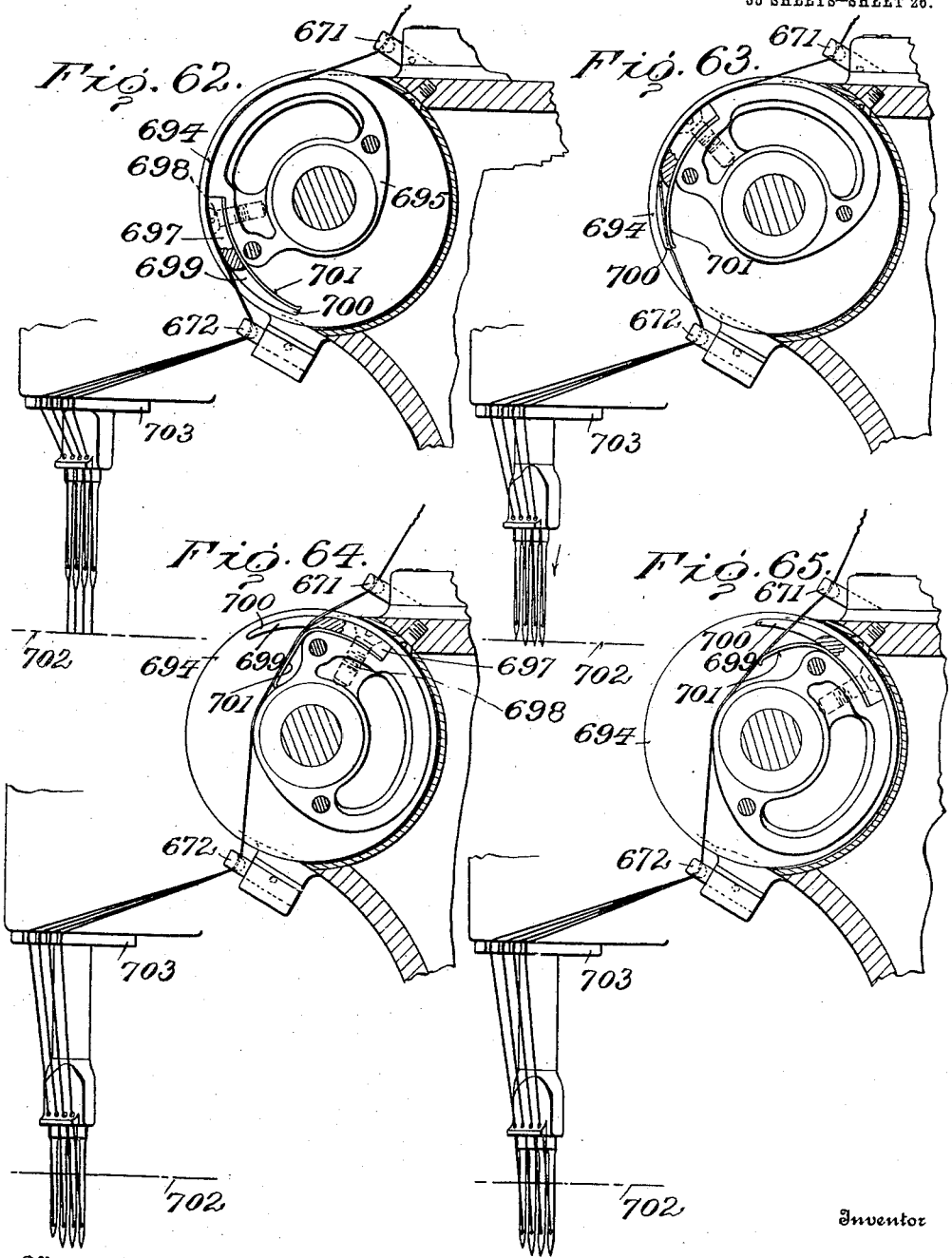

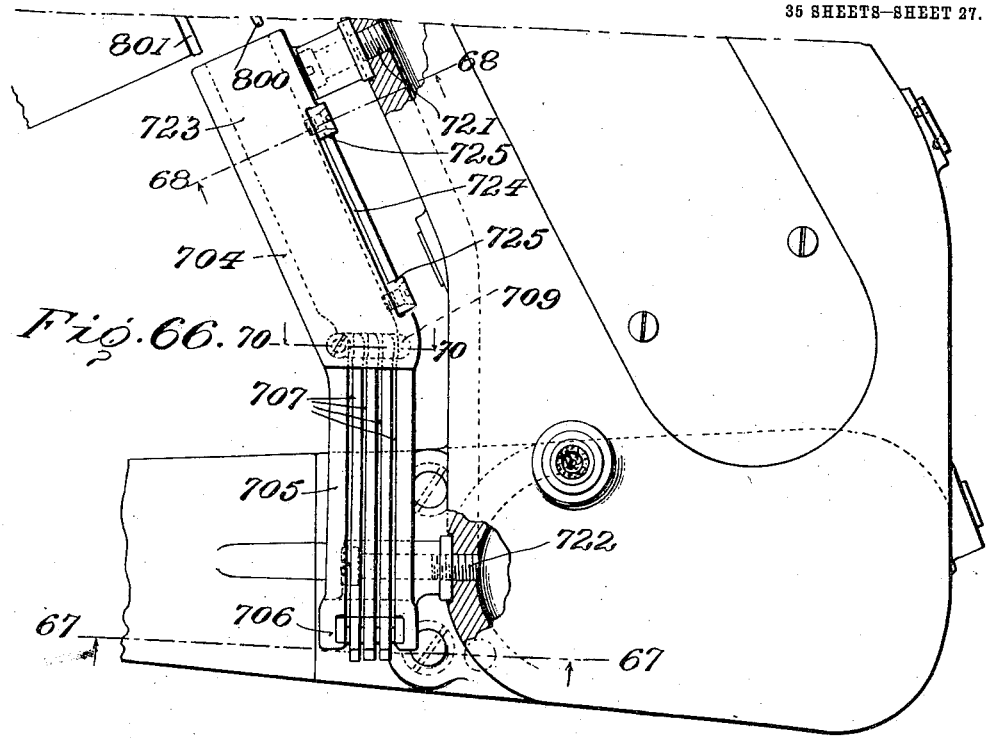
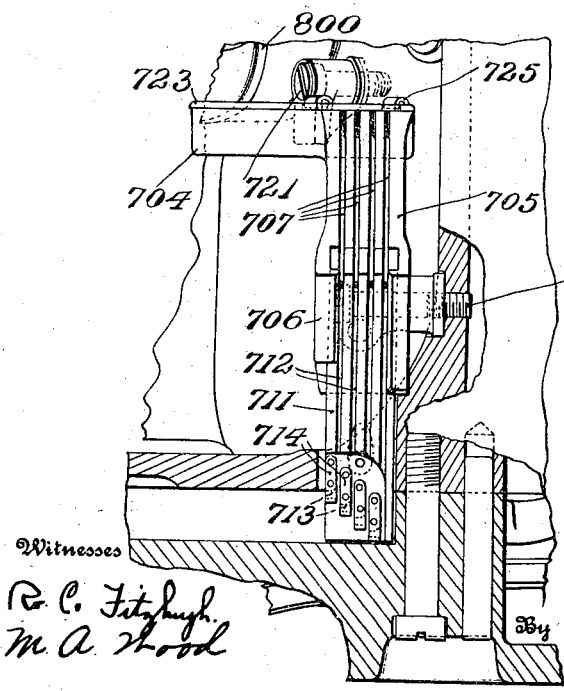
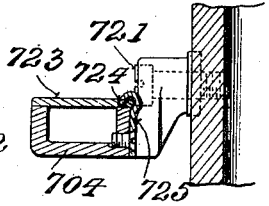

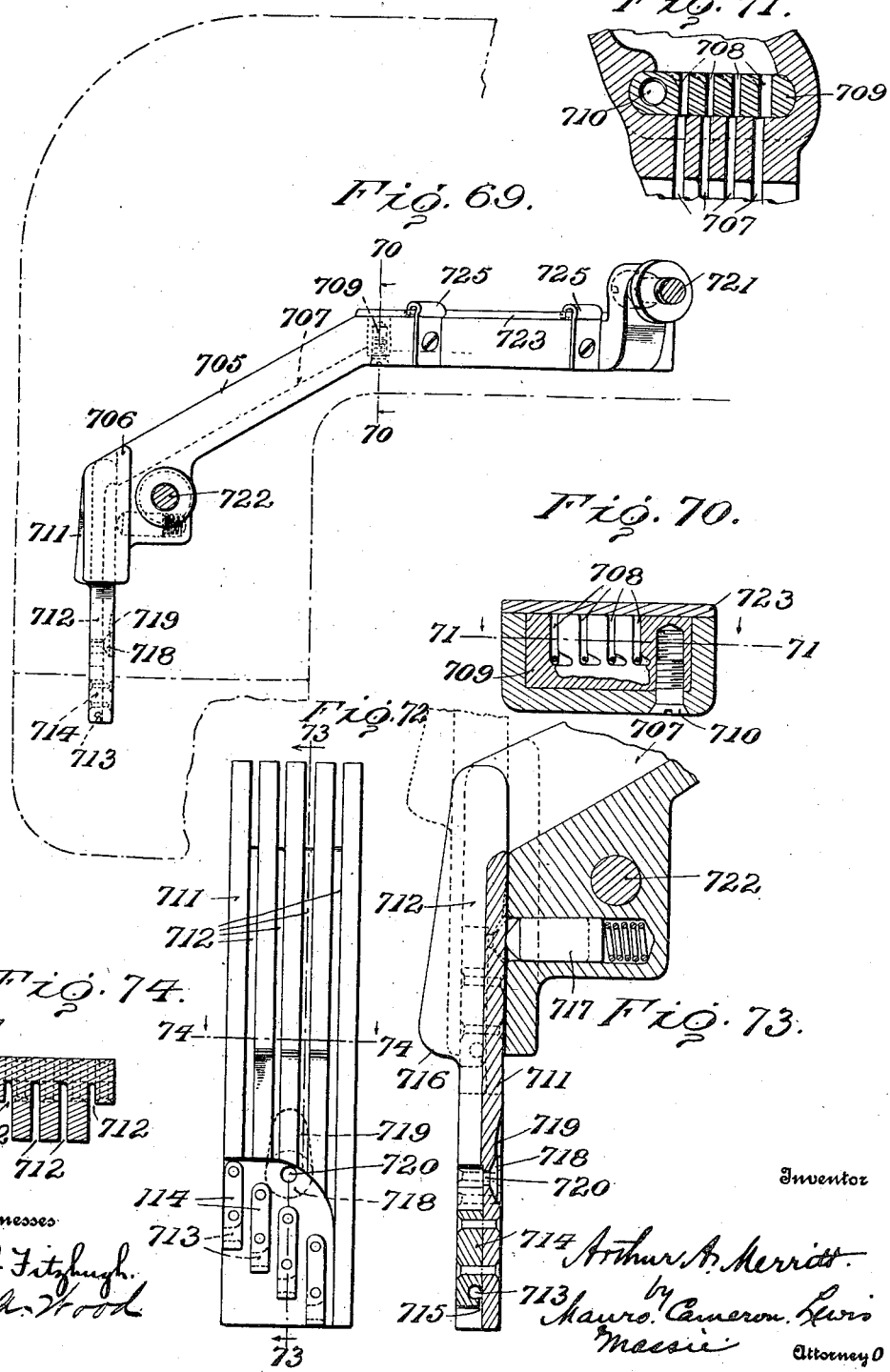

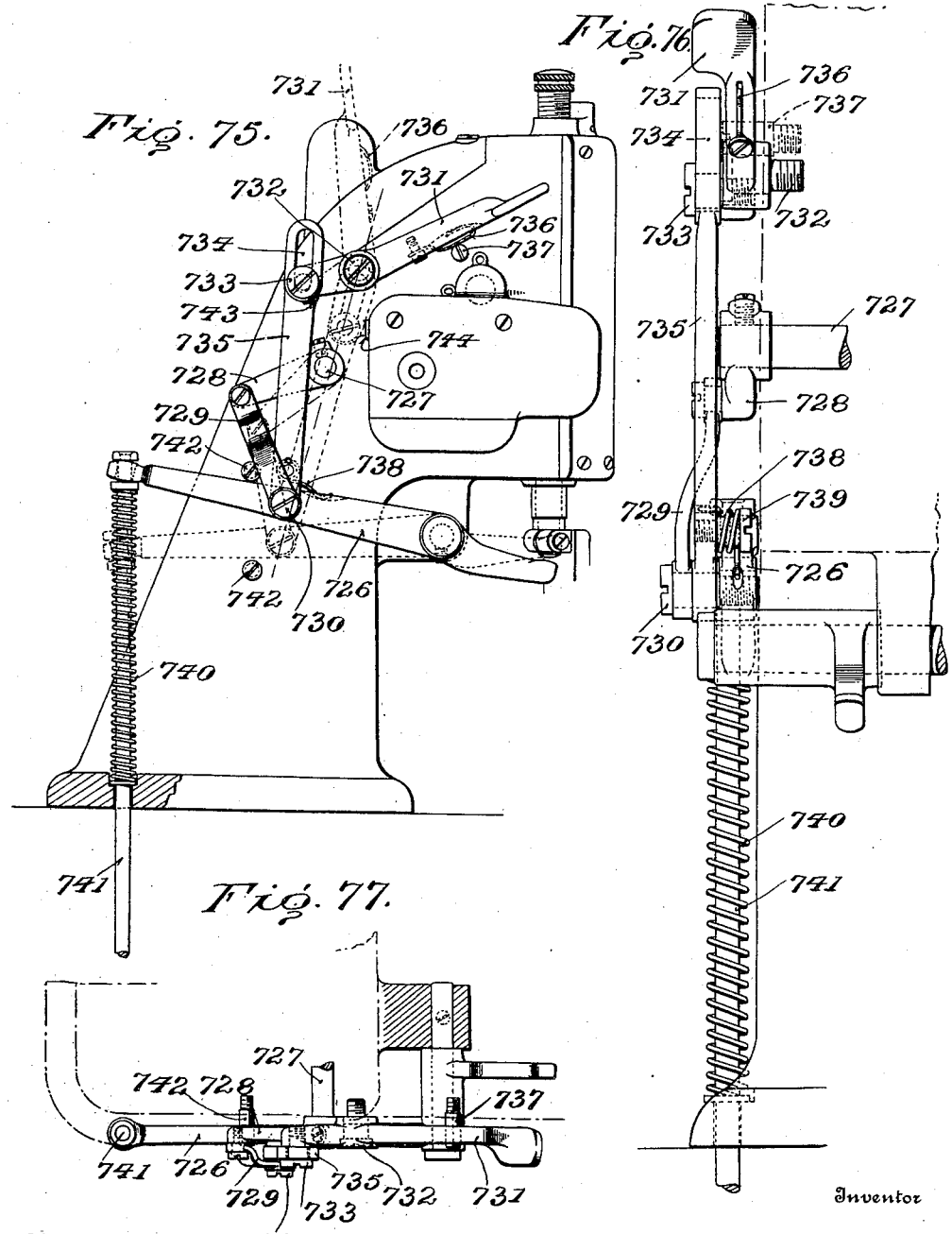

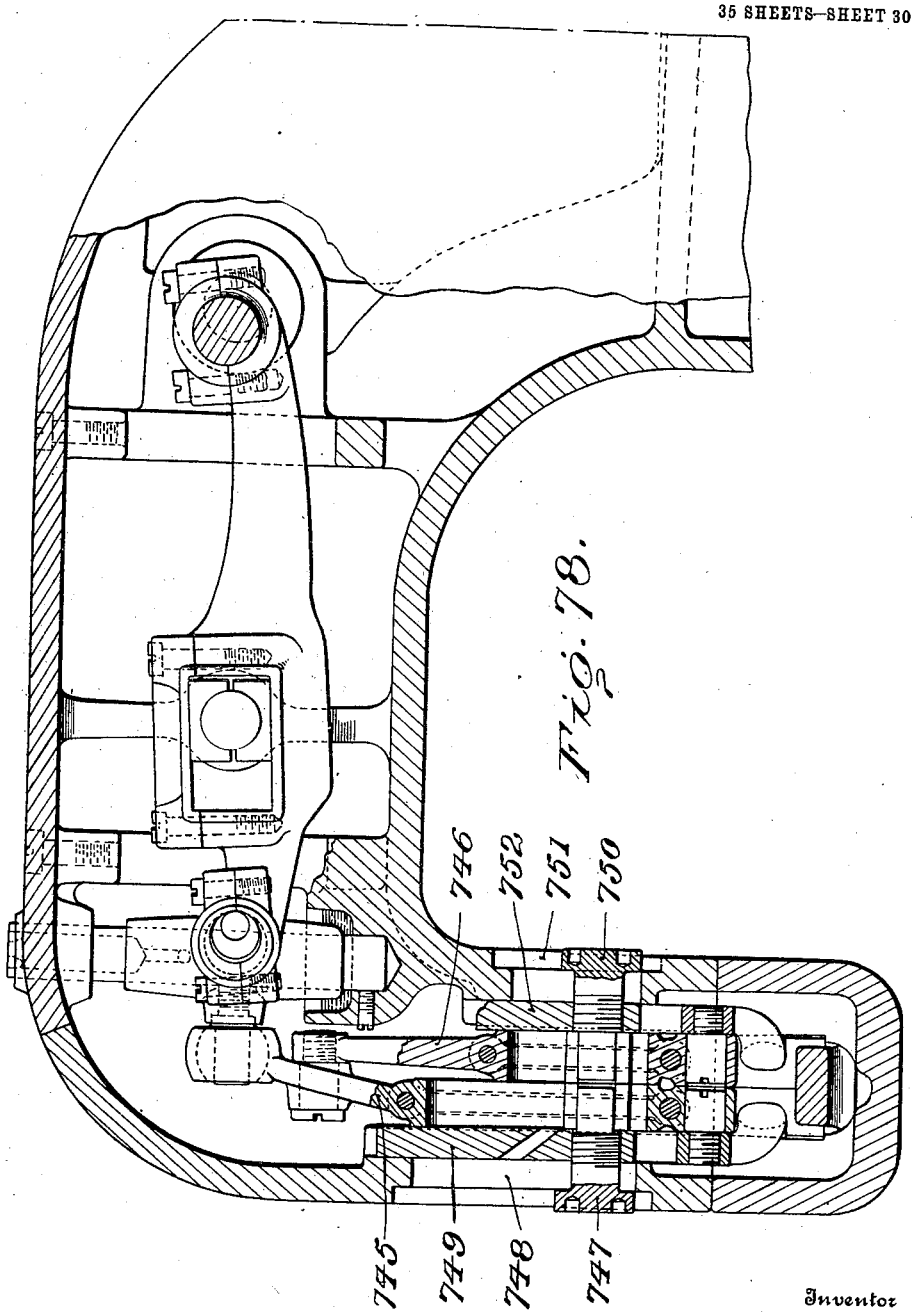

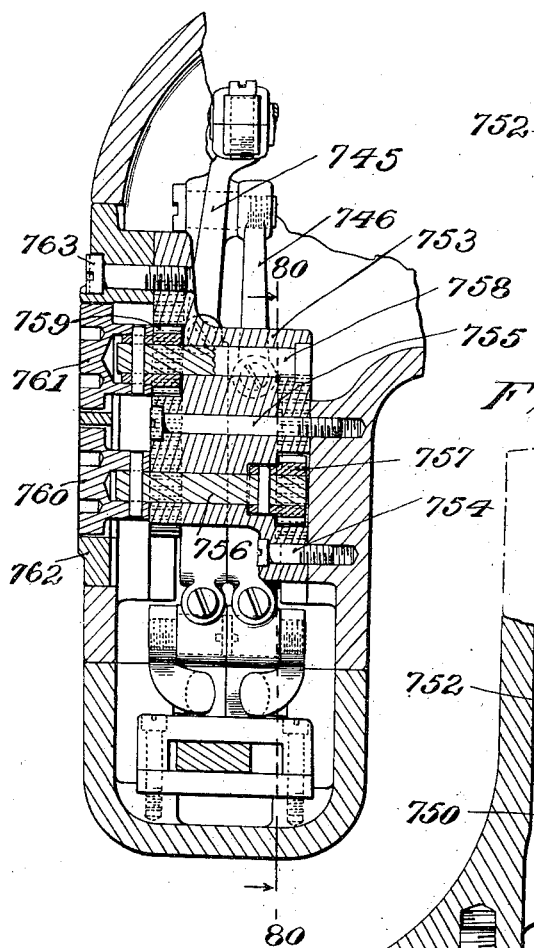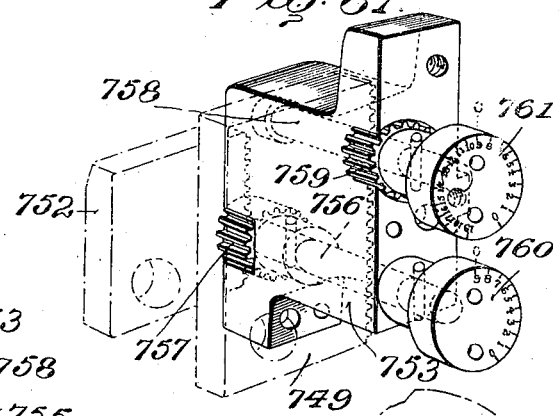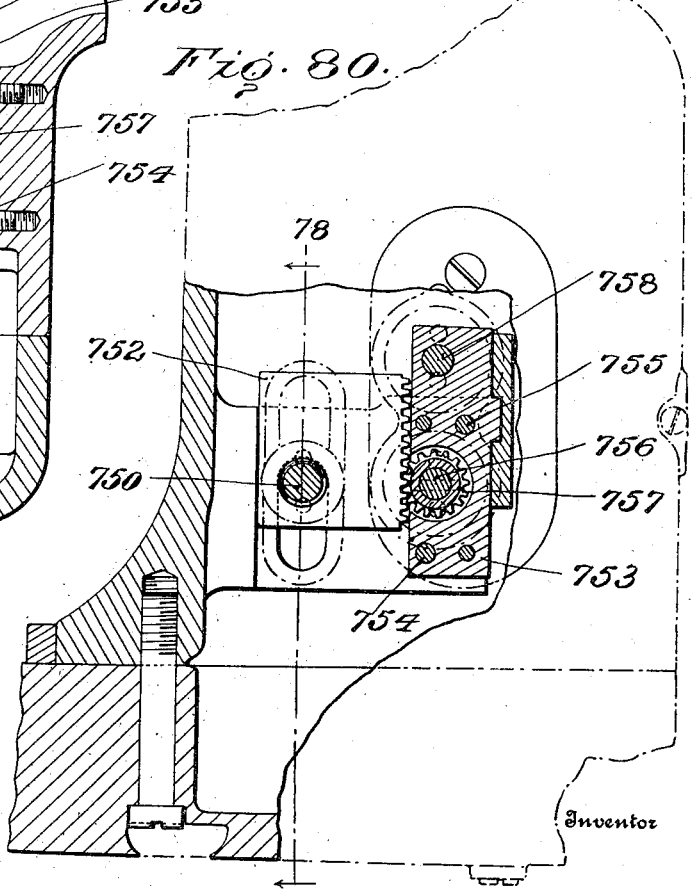

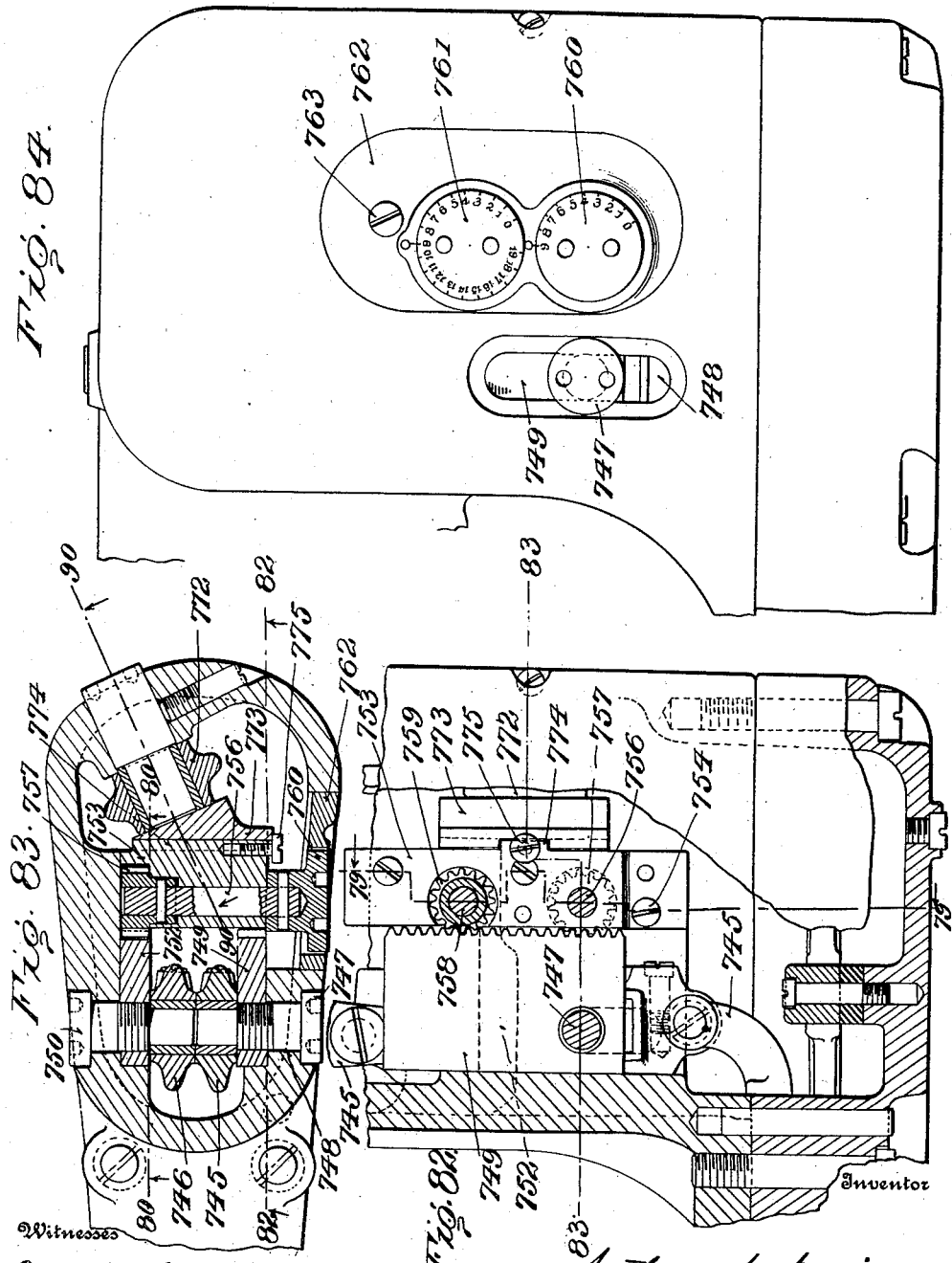

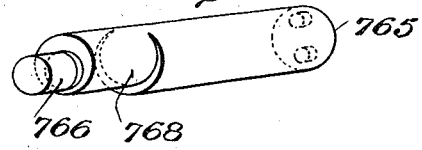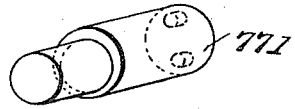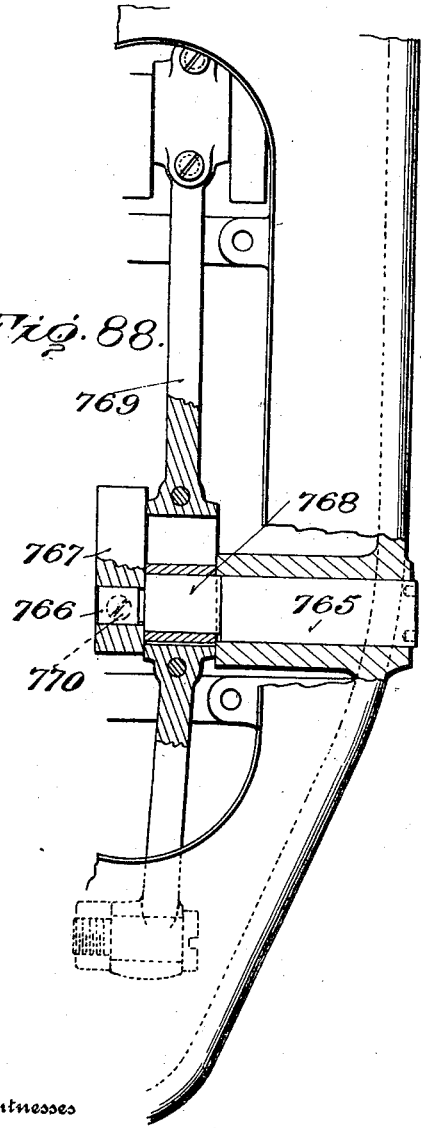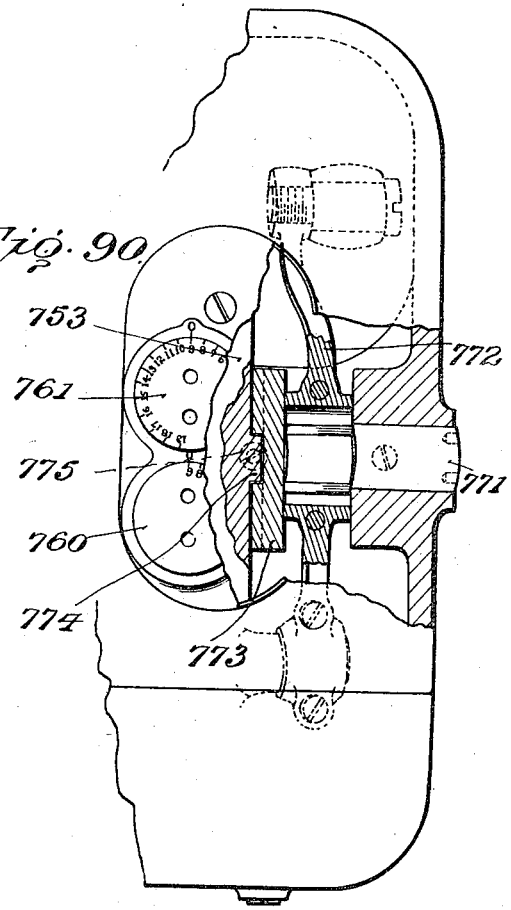

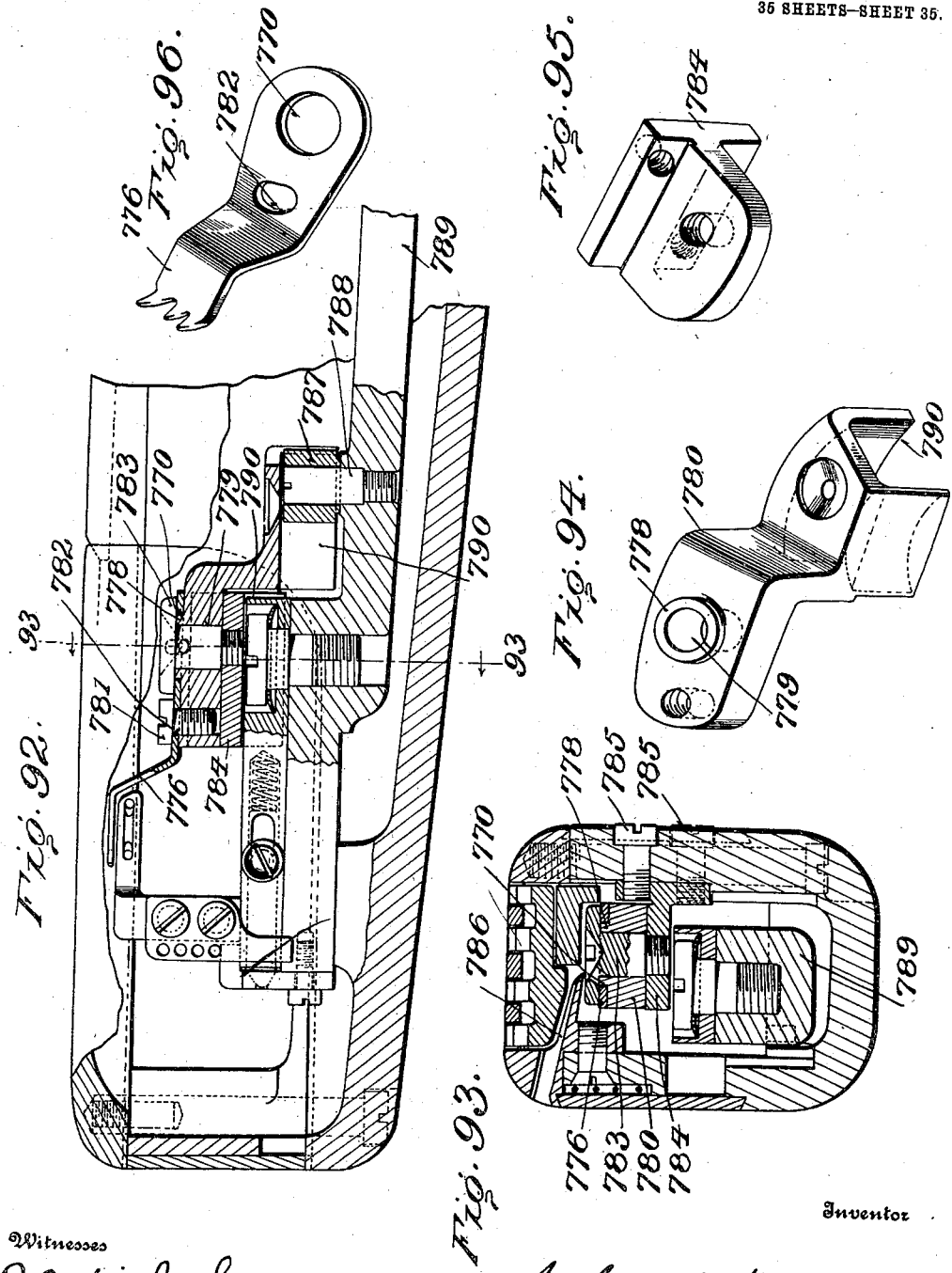

UNITED STATES PATENT OFFICE.

ARTHUR A. MERRITT, OF WORCESTER, MASSACHUSETTS, ASSIGNOR TO WILLCOX & GIBBS SEWING MACHINE COMPANY, OF NEW YORK, N. Y., A CORPORATION OF NEW YORK.

SEWING-MACHINE.

1,041,652.     Specification of Letters Patent.     Patented Oct. 15, 1912.

Application filed December 12, 1908. Serial No. 467,163.

*To all whom it may concern:*

Be it known that I, ARTHUR A. MERRITT, of Worcester, Massachusetts, have invented a new and useful Improvement in Sewing-Machines, which invention is fully set forth in the following specification.

The present invention relates to a sewing machine especially designed to produce, by one operation and at high speed (meaning that each needle shall be capable of making approximately 3,000 or more stitches per minute), a complete seam of special form for joining two abutting cut edges or selvages of knit goods.

The improvements constituting this invention are designed with particular relation to the type of machine shown in an application for patent of Stockton Borton, filed Dec. 13, 1906, Serial No. 347,649, and the machine herein illustrated and described is adapted to produce the seam illustrated in U. S. patent to Stockton Borton, No. 883,614, dated March 31, 1908, said seam comprising nine threads, to wit, four needle-threads, four looper-threads, and a cross-thread.

The various features of improvement, and novel combinations of coöperating elements, many or all of which may be applied with advantage to sewing machines designed for other classes of work and to produce different seams, are fully explained in conjunction with the accompanying drawings illustrating what is at present believed to be preferred embodiments of the invention.

Figure 85:
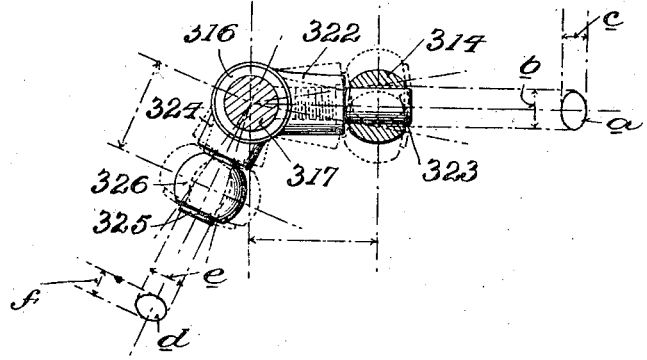
Figure 86:
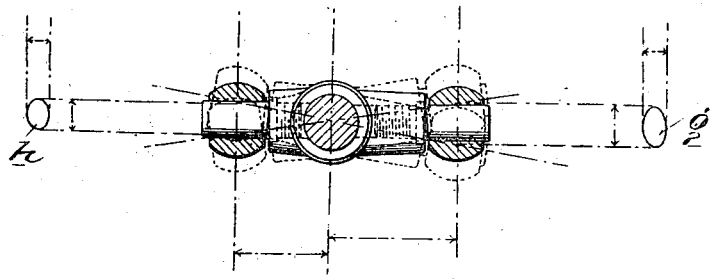
Figure 87:
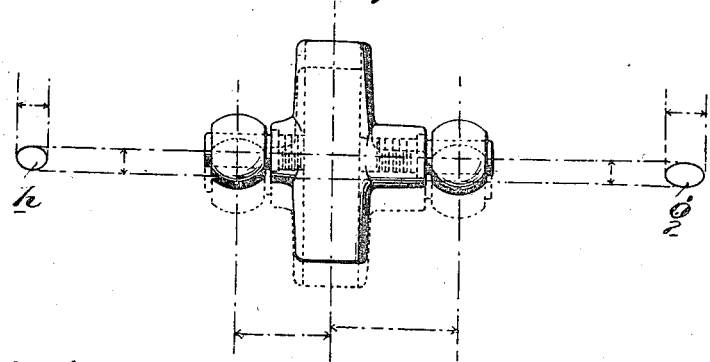

Figure 1 (Sheet 1) is a perspective view of the machine; Fig. 1$^a$ is a perspective view of the trimmings deflector shown detached from the presser-foot; Fig. 2 (Sheet 2) is a front elevation of the machine; Fig. 3 (Sheet 3) is an end elevation looking from the left of Fig. 2; Fig. 4 is a perspective view illustrating connections for releasing the thread-tension devices; Fig. 5 (Sheet 4) is an end elevation looking from the right of Fig. 2; Figs. 6 and 7 illustrate the respective parts of the two-part main driving-shaft; Figs. 8 and 8$^a$ (Sheets 5 and 6) constitute together a top plan view of the machine, on a larger scale than in the previous views, covers constituting parts of the casing having been omitted to expose the mechanism within, and other parts of the casing and mechanism being illustrated in horizontal section; Fig. 9 (Sheet 7) is a rear elevation of the machine, on the smaller scale of Figs. 2-5, part of the casing or framework being broken away and shown in section; Fig. 10 (Sheet 8) is a vertical section on the line 10—10 of Fig. 8$^a$; Fig. 11 (Sheet 9) is a vertical section on the line 11—11 of Fig. 8$^a$; Fig. 12 is a horizontal section on line 12—12 of Fig. 11; Fig. 13 is a horizontal section on line 13—13 of Fig. 10; Fig. 14 (Sheet 10) is a front elevation of the right-hand end of the machine, with the cover in the depending portion of the work-arm removed, and part of the mechanism illustrated in section on line 14—14 of Fig. 8$^a$; Fig. 15 is a horizontal section on line 15—15 of Fig. 14; Fig. 16 is a detail perspective view of the coupling between the looper-lever and the vertical lever from which motion is imparted to the former; Fig. 17 (Sheet 11) is an end elevation looking from the left of Fig. 8, parts of the mechanism being shown in vertical section; Fig. 18 (Sheet 12) is a vertical section through the free end of the work-arm, showing also a portion of the head of the machine and associated mechanism above the end of the work-arm, the front cap or cover which incloses parts of the mechanism on the head of the machine being removed; Fig. 19 shows a front elevation of the parts of the mechanism shown in Fig. 18, with the cover in place and the presser-foot in an elevated position; Fig. 20 (Sheet 13) is a vertical section of part of the machine on line 20—20 of Fig. 17; Fig. 21 is a detail sectional view, on the line 21—21 of Fig. 20, illustrating one of the thread-guides with the thread-retaining pin drawn out to release the threads; Fig. 22 (Sheet 14) is a vertical sectional view of a portion of the machine on line 22—22 of Figs. 8 and 8$^a$; Fig. 23 (Sheet 15) is a vertical section on line 23—23 of Fig. 8; Fig. 23$^a$ is a detail perspective of the rock-lever for driving the needle-bar; Fig. 24 is a detail horizontal sectional view on the line 24—24 of Fig. 23; Fig. 25 is a perspective view of parts which form driving connections between the needle-bar and its rock-lever; Fig. 26 is a detailed view of the driving strap before it is bent to the form shown in Fig. 25; Fig. 27 (Sheet 16) is a horizontal sectional view on line 27—27 of Fig. 18; Fig. 28 is a perspective view of the presser-foot and associated elements; Fig. 29 shows in perspective and detached, the end of the looper-bar and the looper-carrier; Fig. 30 (Sheet 17) is a vertical sectional view on a large scale on line 30—30 of Fig. 27; Fig. 31 (Sheet 18) is a horizontal section through the free end of the work-arm on line 31—31 of Fig. 32, parts of the mechanism within the work-arm being shown in plan and other parts omitted; Fig. 32 is a vertical sectional view through the part of the work-arm shown in Fig. 31 and the mechanism inclosed therein; Fig. 33 (Sheet 19) is a transverse section on line 33—33 of Fig. 32, but on a slightly larger scale than the latter; Fig. 34 is a horizontal section on line 34—34 of Fig. 33; Fig. 35 is a transverse section on line 35—35 of Fig. 32, but on a slightly larger scale than the latter, and with the feed surfaces elevated to project through the throat-plate; Fig. 36 is a transverse section on line 36—36 of Fig. 31; Figs. 37 and 38 are detail views of parts by which the looper-lever is fulcrumed; Fig. 39 (Sheet 20) comprises a collection of detail perspective views of part of the work-arm and the mechanism associated therewith; Figs. 40 and 41 (Sheet 14) are transverse sections on lines 40 and 41, respectively, of Fig. 22 (Sheet 14); Fig. 42 (Sheet 9) is a detail view of a nut referred to in the detailed description; Fig. 43 (Sheet 21) is a vertical sectional view (similar to Fig. 23) through the head of the machine illustrating a form of needle-bar driving means or connections different from those shown in the previous figures of the drawings; Fig. 44 is a horizontal section on line 44—44 of Fig. 43; Fig. 45 is a vertical section on the line 45—45 of Fig. 43; Fig. 46 (Sheet 22) is a front elevation of parts of the mechanism immediately above the end of the work-arm (shown in dotted outline), illustrating a form of driving connections for the cross-thread carrier, cross-thread hook and trimmer mechanism, different from the corresponding driving connections of previous figures; Fig. 47 is a horizontal section on line 47—47 of Fig. 46; Fig. 48 is a detail perspective of parts of the connections; Fig. 49 (Sheet 23) is a vertical sectional view (similar to Fig. 22, Sheet 14) of a portion of the machine, illustrating different forms of thread-guides, tension mechanism and take-ups, from those shown in previous figures of the drawings; Fig. 50 is a detail sectional view of the thread-guides shown immediately above in Fig. 49; Fig. 51 is a top plan view of the tension mechanism shown at the right of Fig. 49; Fig. 52 (Sheet 24) is a vertical section on line 52—52 of Fig. 49; Fig. 53 is a vertical section on line 53—53 of Fig. 49; Fig. 54 is a detail of thread-guiding hooks and plates; Fig. 55 is a detail sectional view, enlarged, on line 55—55 of Fig. 52, of a thread-guide for the cross-thread; Fig. 56 (Sheet 25) is a front elevation, looking from the right in Fig. 57, of the double take-up of Figs. 49 and 52, part of which acts upon the four needle-threads and another part upon the cross-thread; Fig. 56ᵃ shows the parts of the same separated; Fig. 57 is an elevation looking from the left of Fig. 56, with the left-hand side plate removed; Fig. 58 is a top plan view of the same take-up looking downward in Fig. 57; Fig. 59 is an elevation from the right of Fig. 56, with the right-hand side plate removed; Fig. 60 is an elevation looking from the right in Fig. 49 of the take-up shown in the latter and Fig. 53, which acts upon the four looper-threads; Fig. 60ᵃ shows the parts of the same separated; Fig. 61 is an elevation from the right of Fig. 60; Figs. 62 to 65 inclusive (Sheet 26) are a succession of views, each partly in section, on line 52—52 of Fig. 49; showing relative positions of the needle-thread take-up and the needles at different stages of the stitch-forming operation; Fig. 66 (Sheet 27) is a top plan view of the work-arm showing thread-guiding means for the four looper-threads of different construction from corresponding means in previous figures of the drawings; Fig. 67 is a vertical section on line 67—67 of Fig. 66; Fig. 68 is a detail sectional view on line 68—68 of Fig. 66; Fig. 69 (Sheet 28) is a side elevation of the thread-guiding means looking from the right of Fig. 66, the contour of the work-arm being indicated in dotted-lines; Fig. 70 is a transverse section on line 70—70 of Fig. 69; Fig. 71 is a horizontal section on the line 71—71 of Fig. 70; Fig. 72 is an elevation, on a large scale, of the thread-guiding slide; Fig. 73 is a vertical section of the same and associated parts of the machine on line 73—73 of Fig. 72; Fig. 74 is a horizontal section on line 74—74 of Fig. 72; Fig. 75 (Sheet 29) is an elevation from one end of the machine, showing—in addition to treadle-connections such as illustrated in previous figures of the drawings—a hand-lever and connections for lifting the presser-foot; Fig. 76 is an elevation, on a larger scale, of the presser-foot lifting means of Fig. 75, looking from the right of said figure; Fig. 77 is a top plan view of the presser-foot lifting means of Fig. 75; Figs. 78–84 (Sheets 30–32) illustrate an embodiment of means for adjusting and determining the positions of the fulcrums of the two vertical feed-levers, to vary the throw of the two feed-members, different from corresponding means illustrated in previous figures of the drawings; Fig. 78 is a longitudinal vertical section (similar to Fig. 11, Sheet 9) through a part of the work-arm on line 78—78 of Fig. 80; Fig. 79 is a similar section on line 79—79 of Fig. 82; Fig. 80 is a vertical section on line 80—80 of Figs. 79 and 83; Fig. 81 is a detail perspective view of gearing, racks and associated parts of Fig. 79; Fig. 82 is a vertical section on line 82—82 of Fig. 83 through the lower end of the vertical part of the work-arm; Fig. 83 is a horizontal section on line 83—83 of Fig. 82; Fig. 84 is an elevation from the left of Fig. 78; Fig. 85 (Sheet 33) is a horizontal section of the coupling shown in Fig. 11, Sheet 9, which constitutes part of the driving connections to the feed-members; Fig. 86 is a horizontal section of a similar coupling in which the arms radiate in alinement or in parallelism to each other; Fig. 87 is an elevation of the coupling of Fig. 86; Fig. 88 (Sheet 34) is a view partly in horizontal section of a portion of the work-arm and connections for driving the loopers; Fig. 89 is a perspective view of the fulcrum pin shown in Fig. 88; Fig. 90 is a view partly in vertical section on line 90—90 of Fig. 83, and partly in elevation; Fig. 91 is a detail perspective of the fulcrum pin shown in Fig. 90; Fig. 92 (Sheet 35) is a longitudinal section through the end of the work-arm and parts therein showing a somewhat different construction of mechanism from corresponding parts of the previous figures of the drawings; Fig. 93 is a transverse section on line 93—93 of Fig. 92; Figs. 94, 95 and 96 are detail views of elements shown in Figs. 92 and 93.

*Work-arm and frame of machine.*—The framework of the machine comprises two hollow standards 40 and 41 connected by a hollow bridge 42 preferably formed in one casting. The moving parts requiring lubricant are as far as practicable inclosed or covered by hollow portions of the framework so formed that the lubricant or oil is prevented from flowing or leaking to the outer surfaces, and is drained into reservoirs from which it may be readily removed at convenient intervals. The principal reservoir for this purpose, numbered 43 in Fig. 9 (Sheet 7), is constituted by the hollow bridge 42 and parts of each of the hollow standards, the lower wall of the bridge being continued to extend across the interior of the standards as shown at 44 and 45. The bottom wall of the reservoir thus formed slopes from all directions toward the drainage nozzle 46, normally closed by the cap 47 and packing washer 48 secured to the cap by a central screw. Loosening the cap without removing it permits escape of oil by way of the passages therethrough. Oil from the parts in the work-arm which does not flow back into reservoir 43, collects in the bottom of the trough-like horizontal portion of the work-arm, from which it may be drawn off through the opening closed by screw 49, Figs. 10 and 14, or provided with a nozzle and cap similar to 46 and 47.

The hollow work-arm extends forward from the upper end of standard 40 in a horizontal part 50, and from the outer end of the latter a part 51 depends vertically; these parts 50 and 51 are, as shown, preferably a continuation or extension of the hollow standard 40, being cast integral therewith and as a part of the single main casting which also embraces the bridge 42 and the standard 41. The parts of the work-arm thus described form an arch over an open space 52 (Figs. 3, 5 and 10) in which the right arm of an operative has unhampered freedom of movement in manipulating and arranging the work and advancing it along a horizontal part 53, which extends from the lower end of part 51 toward the left and rearward (Figs. 1 and 2) terminating at its free end—which constitutes the free end of the entire work-arm—beneath an overhanging portion of the head of the machine. As illustrated, part 53 is preferably a trough-like casting secured to part 51 by three screws 54, 55 and 56 (Figs. 39, 14 and 2). Two dowel pins 57 and 58 on part 53, fit closely in sockets in the wall of part 51, insuring absolute accuracy in securing the parts together in proper relative positions, and in particular presenting the parts of the looper mechanism operating in the free end of the work-arm in proper position to coöperate with the needles.

Removable caps or covers are provided to facilitate assembling parts, and where access to parts is necessary for inspection, adjustment or repairs. As illustrated in the drawings, these covers are in almost every instance secured in place by screws clearly shown. Thus there is a cover 59 (Figs. 1, 10 and 11—removed in Fig. 8ª) at the top of part 50 and a cover 60 at the front of part 51 of the work-arm; a cover 61 (Figs. 1, 2 and 14) semi-circular in cross-section, along the front of bridge 42; a cover 62 (Figs. 1, 3 and 17—removed in Fig. 8) at the upper end of standard 41; a cover 63 (Figs. 1, 3, 8, 18 and 19) at the front of the upper end of standard 41, or head of the machine; a cap or cover 64 (Figs. 1, 2, 3, 8, 9 and 17) which bears at its lower edge in contact with the edge of a flange or lip 65 on the end face of standard 41. The free end of the work-arm (part 53) is covered by a plate 66 (Figs. 1, 18, 32 and 39) constituting the work-plate or throat-plate of the machine, and having slots or openings through which the feed teeth and needles operate, as later explained. Depending dowel pins 67 and 68 on this plate (Figs. 18, 32 and 39) engage sockets in the wall of the work-arm to accurately position the plate, which is secured in place by screws 69 and 70. A longitudinally slidable U-shaped cover 71 (Figs. 1, 18, 19, 31 and 32) is adapted when in place to cover openings 72 and 83 in the side walls of the free end of the work-arm.

74 (Figs. 1, 33 and 39) is a slightly arched cover for closing the trough-like part 53 of the work-arm from throat-plate 66 to part 51 of the arm; a lip 75 (Figs. 32, 39) at one end of the cover engages an undercut notch in plate 66, and a spring-actuated bolt latch 78 at its other end has a conical point adapted to seat in a shallow conical depression in the wall of part 51 of the work-arm. Finger notches 76 and 77 (Figs. 1 and 39) afford a grip by which an upward pull on this end of the cover will force bolt 78 back into its opening against the tension of its spring and thereby free the cover.

The hollow casing and work-arm, with the covers closing openings therein, inclose practically all of the movable parts which actuate the thread-handling and stitch-forming elements.

*Main driving connections.*—The main-shaft is preferably made in two parts or sections 80 and 81, joined together, at the middle of bridge 42, by a coupling consisting of a sleeve 82 (Figs. 2, 9 and 20) having tapered exteriorly screw-threaded and longitudinally split ends. Nuts 83 serve to contract and clamp the split ends of the sleeve upon the abutting ends of the two parts of the main-shaft. Two screws 84 through sleeve 82 have tapered ends adapted to seat in conical depressions in the ends of the two parts of the shaft, and insure proper radial positioning of said shaft parts in securing them together. This two-part construction of driving shaft not only cheapens its cost, but facilitates the assembling of the two groups of mechanism, one group at the right hand end of the machine having driving connections from the part 81 of the shaft, and the other group at the left-hand end of the machine having driving connections from the part 80 of the shaft.

At its right-hand end the main-shaft carries hand-wheel 85, having the usual grooved driving pulley integral therewith; an oil flange 86 (see dotted lines Fig. 9) on the latter rotates in a recess in the end of bushing or bearing 87 in which the shaft rotates. An opening 870 through the bearing (dotted lines Fig. 9) slightly inclined toward its inner end, drains lubricant from the recess in the end of the bushing into the upper end of standard 40. At the same end (see Figs. 8ª and 9) the shaft works in another bushing or bearing 88 and between these two bushings has two cranks, one 89 for driving the parts through which the loopers are actuated, and the other 90 for driving the parts through which the feed is actuated.

An inclined opening 880 (dotted lines Figs. 9 and 11) drains lubricant from a recess at one end of bearing 88 into standard 40. An opening 91 (Fig. 7), bored longitudinally into part 81 of the main-shaft slightly inclined to the axis thereof, extends through crank 89; a hollow screw plug 92 in the outer end of this opening serves to retain fibrous material 93, such as waste or loose felt and has a central opening through its head for introduction of lubricant. A small transverse opening through crank 89, intercepts opening 91 and is closed by a plug 103, preferably of leather, through which sufficient lubricant will exude to lubricate the crank connection. A transverse opening 104, bored into the surface of crank 90 in a transverse inclined direction, intercepts opening 91 and is closed by a similar leather plug 94 to lubricate this crank connection.

At its left-hand end the main-shaft is journaled in bushings 95 and 96 (Figs. 9 and 20) between which said shaft has a crank 97 from which the needle-bar is driven; the reduced extremity of the shaft projecting beyond bushing 96 (see Figs. 20 and 17) carries an eccentric 101 from which the trimmer-sleeve is driven, as later explained. An inclined opening 950 through bearing 95 (dotted lines Fig. 9) drains lubricant from a recess in one end thereof into the upper end of standard 41. An opening 98 bored longitudinally into the left-hand end of part 80 of the main-shaft (see Figs. 20 and 6) is filled with a fibrous material and lubricant; a plug 99 in the outer end of this opening has a central aperture through which lubricant may be introduced; an opening 100 in the cover 64 makes it unnecessary to remove the latter for this purpose. A small opening is bored into the surface of crank 97 in a direction to intercept the opening 98, and is closed with a leather plug 102 adapted to exude lubricant to the crank connection.

It will be observed that there are no bevel-gear or other connections producing end-thrust upon the main-shaft; hence the necessity of anti-friction end-thrust bearings is eliminated.

*Needle-bar and needles.*—Referring particularly to Figs. 18 and 23, 105 is the needle-bar movable vertically in bushing-bearings 106 and 107, through the upper and lower walls of the hollow head of the machine casing, each bushing being made in two parts with an intermediate leather part 108, 109, surrounding the bar. Oil holes or passages 110 and 111 (also shown in Figs. 1 and 2) lead to the leather parts.

112 is a horizontal rock-shaft journaled in the head of the machine (see Figs. 23 and 8), and having fixed thereon a rock-lever 113 (Fig. 23ª); a short pitman or link 514 connects crank 97 with the driven end of rock-lever 113. The driving end of lever 113 is connected to the needle-bar by what may be designated a "band-drive", which will now be described. At its said driving end lever 113 is widened out (and skeletoned for lightness) to form a segmental peripheral surface 113ᵃ, Fig. 23ᵃ (Sheet 15), the curvature of which is concentric to the axis of shaft 112. Two bars 114 (Figs. 25, 23, 18) are secured to opposite sides of needle-bar 105 by two screws 116, 116, engaging openings through cylindrical heads at opposite ends of said bars, said screws also passing through the needle-bar. A steel-band 117, originally in the form shown in Fig. 26, when finally in place assumes the form shown in Fig. 25, an elongated loop 118 being formed at its middle by passing one end through slot 119 near the other end. In connecting this band to the needle-bar, the latter is passed through slots 119 and 120, and a screw 521 passed through a hole 522 in the band into the needle-bar; the two bars 114 are then introduced into opposite sides of the loop 118 in the band and secured to the needle-bar by their screws 116, 116. The ends of band 117 are secured in open sided cylindrical recesses 125, Fig. 23ᵃ, in the driving end of lever 113, by being coiled about split expansible sleeves 121, 121 (Figs. 25 and 23) respectively. A pin 122 on each sleeve engages an opening 123 in the corresponding end of the band. The outer end of pin 122 projects into a groove 625 about the wall of recess 125. A screw 124, passing through each sleeve 121, has a tapered head and a tapered nut 115 adapted to expand the sleeve to securely clamp the band between the surface of the sleeve and inner wall of recess 125. By the use of implements such as shown in Fig. 25, one engaging the slot in the head of screw 124 and the other engaging the notches in both nut 115 and the end of sleeve 121, the screw 124 may be loosened, the sleeve 121 rotated to slightly wind or unwind the band, as may be desirable, and the screw then tightened to expand the sleeve and secure the parts in their new position of adjustment. As will be seen in Fig. 23, the relatively broad peripheral face of the driving end of lever 113 operates in close proximity to the surface presented by the straight edges of bars 114, practically no more than the thickness of the band intervening. In the movement of the needle-bar, during which the narrow neck-like part 126 of the band 117 moves in opposite directions through slot 119, those portions of the band which shift contact from one surface to another are always in contact with one of said surfaces, avoiding looseness of connection and reducing strain on the band. Furthermore, this proximity of surfaces prevents any slight turning of the needle-bar on its axis which might disturb the axial position of the needles with relation to the mechanism with which they coöperate.

At its lower end, the needle-bar carries a needle-holder or clamp 130 (Fig. 30), in which four needles 1ᵃ, 2ᵃ, 3ᵃ and 4ᵃ are secured by means of four set-screws 131 (also shown in Figs. 5 and 18); a lip 132 on said part has four thread-eyes through which the needle-threads descend to the needle-eyes.

As clearly shown, the eyes of the four needles are disposed on a bias, or in other words, slightly oblique to the line of feed; this is important as it enables the loops of needle-threads to open wide without interference with an adjacent needle, and consequently makes it possible to place the needles very close together without impairing the functioning of the loopers in engaging the needle-thread loops.

In a machine which has been successfully operated, the needles have been placed approximately one-sixteenth of an inch ($\tfrac{1}{16}''$) apart at their points, the other elements being positioned and proportioned accordingly.

Figs. 43 to 45 inclusive illustrate another and simpler form of driving connections for the needle-bar, which have been found to give highly satisfactory results, and may be considered preferable to the means described and illustrated in previous figures of the drawing for the same purpose. Except as to those parts to which specific reference will be made, the parts of the mechanism illustrated in these figures are substantially the same as corresponding parts in previous figures, and hence need not be further described. Vertically movable needle-bar 605 is made hollow at its upper end to provide a small lubricant reservoir 606 closed at its upper extremity by a tightly fitting plug 607. The reservoir may be filled with fibrous material, such as waste. A valve consisting of a ball 608 normally pressed upward to its seat by a spring 609 closes an opening 610 through the plug for introduction of lubricant into the reservoir. The valve may be opened by pressing upon the ball with the tapered pointed end of an oil can from which the lubricant flows through the plug. 613 is a rock-lever the driving end of which is bifurcated or forked, the two arms being designated 615 and 616. These arms are pivotally connected to the lower ends of links 617 and 618 respectively by screws 619 and 620. Each of these screws has a threaded portion engaging a threaded opening in the end of its arm, while the head of the screw is of cylindrical form and extends inward from the arm into an opening in the lower end of its corresponding link. The links 617 and 618 bear against flattened surfaces oppositely formed on the needle-bar 605. At their upper ends both links are pivotally connected to the needle-bar by a screw 621; a cylindrical head at one end of the screw constitutes the pivot on which one link is free to turn, and a cylindrical nut on the other side of the needle-bar, and engaged by the thread of the screw, forms the pivot on which the other link is free to turn. The forked end of the rock-lever, by embracing both links and the needle-bar, holds the links in position in engagement with their pivots and in contact with the flattened oppositely formed surfaces of the needle-bar. Vertical passages extend longitudinally through both links, intercepting at their upper ends the cylindrical openings in which the head and nut of screw 621 engage, and at their lower ends the cylindrical openings in which the heads of screws 619 and 620 engage, thus conducting lubricant to the pivotal bearings at both ends of the links. Lateral openings 622 and 623 from the bottom of the reservoir 606 deliver lubricant from the latter into the upper ends of the openings through the links. Rock-arm 613 is fixed to a rock shaft 612, and is driven through a pivotal connection at its driven end with a short pitman or link 614 driven from a crank 624 on the main shaft, all as in the structure shown in previous figures of the drawings. In Fig. 43 there is shown a tube 625 depending from the cover 626 through which lubricant may be introduced to lubricate the connection between the pitman 614 and the rock arm 613. By thus providing a double link connection, the links being symmetrically disposed on opposite sides of the needle-bar, the application of driving power to the latter is equally balanced, and tendency to turn or twist the needle-bar in its bearings is avoided, at the same time preventing misplacement of the needles due to slight shifting of the needle bar, occasioned by wear or unequal application of the driving power thereto, as may be the case for example with a link connection on one side only of the bar.

*Cross-thread carrier.*—180, Figs. 28 and 30, is an oscillatory cross-thread carrier, adapted in the operation of the machine to loop a cross-thread 5 back and forth across the needle-side of the seam under the stitches formed by the needles. A set screw 181 removably secures it to the lower end of a short vertical shaft 182 extending upward through an opening in a plate 183 secured by screws 184 to the presser-foot. A crank arm 185 at the upper end of shaft 182 is connected by a link 186 to a short arm 187 branching from a trimmer-arm 188, which latter depends from a trimmer-hub 189 (see Figs. 18 and 19) more fully described later.

*Cross-thread hook.*—190, Figs. 28, 27 and 17, is an oscillatory cross-thread hook, which acts in conjunction with the cross-thread carrier to position the cross-thread 5, so that loops thereof will be engaged by the needle-stitches in the manner illustrated in the Borton seam Patent No. 883,614, heretofore mentioned. This hook is secured to the lower end of a short oscillatory shaft 191 which extends upward through a bearing opening in a plate 192, which latter is secured to the presser-foot by screws 193. A crank-arm 194, at the upper end of shaft 191, is connected by a link 195 to arm 187 (see Fig. 28).

*Trimmer.*—The machine comprises trimmer-mechanism acting to trim two edges of fabric to be joined as the work is advanced to the needles. This trimmer consists of a fixed blade 200 (see Figs. 28, 27 and 30) and a reciprocatory blade 201. Blade 200, which is fixed to the presser-foot, has beveled edges one engaging the undercut edge of a groove across the underface of the foot (see also Fig. 1) and the other beveled edge engaged by a reversely beveled edge of a clamp block 202, secured by a screw 203. A yoke 204 secured to the lower end of trimmer arm 188 forms an opening in which blade 201 is clamped by a set screw 205 and shoe 206. Arm 188 is preferably cast integral with hub 189, by which it is secured to tubular shaft or sleeve 207 (Fig. 18) and extends downward from said sleeve through an opening 157 (most clearly shown in Figs. 23 and 27) through the bottom wall of the casing of the head of the machine to one side of the presser-foot. Hub 189 is split and embraces an elongated bearing sleeve 207 (Figs. 17 and 18), to which it may be securely clamped by tightening screws 208. Sleeve 207 surrounds partly tubular presser-foot bar 215 and at its lower end terminates clear of the hub of the presser-foot clamped to the reduced lower end of said bar (clearly seen in Figs. 17 and 18). A spring washer 209 around the presser-foot bar beneath a collar 210 fixed to said bar, bears against the upper edge of the trimmer hub pressing the latter downward and thereby yieldingly holding the movable trimmer blade 201 in contact with fixed blade 200. Elevation of the presser-foot and presser-foot bar carries along the parts just described without changing the relationship thereof.

211 is a horizontal arm, preferably cast integral with trimmer hub 189, and projecting through an opening 212 (see Figs. 1, 17 and 18) in the casing at the head of the machine; a screw 213, at the extremity of the arm, is formed with a spherical bearing, which latter is embraced by the capped end of a pitman 214 the other end of which embraces eccentric 101. In operation these last-named parts are inclosed by cover 64. The trimmer hub and its arm, thus oscillated by eccentric 101, in turn impart movements to the cross-thread carrier and hook, through the connections to arm 187, heretofore explained. The reciprocation of blade 201 gives to the cutting edges a shear-like action cutting straight and clean the upturned edges of the fabric which the feed of the machine intermittently draws in between the blades. The strips or bits of material removed by the trimmer-blades are directed to one side and out of the way by a deflector 229 referred to hereafter. After leaving the trimmer, and before they reach the needles, the trimmed edges are laid flat and into abutment with each other. The sleeve 207, extending through a bearing opening in the bottom wall of the head of the casing affords an elongated bearing surface extending downward to relatively near the point of operation of the cutting blades, thus adding rigidity and strength to these driving connections.

*Presser-foot and chaining foot.*—215, Figs 17 and 18, is the presser-foot bar, parallel to the needle-bar and behind the same when looking in the direction of feed. It is vertically movable in an upper bearing opening 216, and which sleeve 207 in a bearing opening through which said sleeve passes as already explained. A screw-threaded opening tapped into the head of the machine above bearing 216, contains a spring 217 pressing against the upper end of the foot-bar and held under adjustable tension by a hollow elongated nut or plug 218. In the operation of the machine this spring yieldingly presses the foot against the work, permitting the foot to be slightly raised upon each upward and forward movement of the feed-surface in advancing the work.

220 is the presser-foot having a split hub 221 (Figs. 17, 27 and 28) embracing the reduced lower end of presser-foot bar 215, and firmly clamped thereon by tightening the screw 222, which serves to draw together the parts of the split hub. The presser-foot extends forward of its hub and downward toward the work-plate, and has a side strengthening web or rib 223 (Fig. 28) into which a headed stud 224 (Figs. 1 and 17) is screwed. Said stud passes loosely through and is movable in a vertical slot 225 in a depending extension of cover 63, thereby guiding and holding the foot in its vertical movement when lifted to introduce work, and when lifted by upward movements of the feed surface. At its forward end the presser-foot is notched or bifurcated forming two toes 226 and 227 (Fig. 28) separated by a space in which the upturned edges of work to be trimmed advance to the trimmer blades. Trimmer blade 200 is secured in a groove in the underside of toe 226, as already explained. Reciprocating blade 201 works in a horizontal opening 228 (Fig. 28) through toe 227. 229 (Figs. 1, 8, 18, 19, 27—omitted in Fig. 28) is a work-guide and deflector, secured to toe 227 by screw 230, and serving to direct and position the work as it approaches the trimmer-blades, and by an extension which reaches obliquely to the left, deflects and discharges the trimmings, keeping them from being caught by the working parts around the needles.

A chaining-foot or auxiliary presser-foot 231, is most clearly shown in Fig. 30; it is vertically movable in a correspondingly shaped opening through presser-foot 220 in the rear of an opening 232 in said foot through which the four needles pass in entering the work and through which the cross-thread 5 is looped back and forth across the seam. The vertical shank or stem 233 of the chaining-foot is movable in a vertical opening 236 in the main presser-foot, this movement being limited by a screw-stud 234 working in a slot 235. A spring 237 bears at one end upon stem 233 and at its other end against plug 238 closing opening 236, tending to move the chaining-foot to its lowermost position determined by pin 234 and slot 235. The chaining-foot is wide enough to cover the four lines of stitches with which it makes contact. The presence of the threads forming the stitches adds thickness to the work along the line of the seam, this added thickness varying slightly with the different sizes of thread. By its yielding connection to the main presser-foot, the chaining-foot automatically accommodates itself to the difference of thickness without lifting the main presser-foot from contact with the work in front of the needles or at the sides of the seam. This results in distributing and equalizing the grip upon the work in feeding the same all about the point of operation of the needles, so that the feeding pull tends to advance the work uniformly and in a straight line at and about the point of formation of the stitches.

The satisfactory operation of a machine of this type requires that it shall be capable of "chaining-off", *i. e.*, of forming the threads into stitches when there is no fabric under the presser-foot, as in passing the seam from one garment to another without stopping the machine or lifting the presser-foot. In the absence of any fabric, the feed-surface in making the feeding part of its movement makes direct contact with the under surface of the presser-foot, while it grips the chain by pressing the latter against the chaining-foot. When the next garment, for example, enters beneath the forward end of the presser-foot, the upward movement of the feed-surface lifts said foot higher than when no fabric is interposed between these parts. If the presser-foot and chaining-foot were rigidly fastened together (or in other words, if there was no chaining-foot), the latter foot would also be correspondingly lifted at this time, and so elevatedly that the feed-surface might not properly grip and feed the chain. This feed being essential, imperfect formation of stitches would be almost inevitable and imperfectly formed stitches would likely appear at the beginning of the seam on a new garment. The mechanism might even become so clogged with thread as to require stopping the machine. Such difficulties are, however, overcome by the yielding connection between the two feet, enabling the chaining-foot to remain in its lowered position in which it coöperates with the feed-surface to continue the feed of the chain while the next garment is entering beneath the presser-foot.

The means for lifting the presser-foot will be explained hereafter.

*Driving connections for cross-thread carrier, cross-thread hook, and trimmer.*—In the preceding description, there is included explanation of driving connections to these parts. A somewhat different, and it is now believed preferable, form of driving connections is illustrated in Figs. 46 to 48 inclusive (Sheet 22). Except for the points of construction to which specific reference will be made in the following description, the mechanism of these figures of the drawings is substantially the same as corresponding mechanism in the previous figures. Cross-thread carrier 630 is removably secured by a set-screw to the lower end of a short vertical shaft 631, which latter extends upward through a bearing integral with the main presser-foot. At its upper end this shaft has a short crank arm 632. 633 is the cross-thread hook secured by a set-screw to the lower end of a short shaft 634, which latter extends upward through a bearing integral with the main presser-foot. A rock-lever 635 secured to the upper end of shaft 634 by pin 636 has a long arm 641 and a short arm 637, the latter being connected by a link 638 to the end of an arm 639, which latter project from the lower extremity of a tubular shaft or sleeve 640, more fully referred to hereafter. The long arm 641 of lever 635 extends beneath the arm 639 and is bent or curved to the right (Fig. 47) around the lower end of the presser-foot bar, and then extends forward to pivotal connection with a link 642, the other end of said link being in turn pivotally connected to the crank arm 632. The sleeve or tubular shaft 640, which has the arm 639 preferably formed integral with its lower end, in other respects corresponds in construction and function with the tubular shaft 207 described in connection with previous figures of the drawings; this tubular shaft surrounds and is rotatable about the presser-foot bar. A trimmer arm 643, corresponding to the trimmer arm 188 in previous figures of the drawing, is partly shown in Fig. 47; in the present construction, however, this arm is connected only to the movable trimmer-blade and has no branch arm connected to the cross-thread carrier and the cross-thread hook for driving the latter, these parts being in the present case driven entirely from the arm 639 at the lower end of the hollow shaft 640 through the connections already described. By thus driving the parts from the lower end of the tubular shaft, having an elongated bearing surface on the presser-foot bar, the tendency to wear and strain is reduced and a firmer construction provided.

*Thread-guides, tensions, take-ups, etc.*—Similar tension devices are used for the four needle-threads and the four-looper threads (see particularly Figs. 22, 40 and 41—also shown in Figs. 1, 2, 5, 8, 8ª, 10, 14 and 20). 240 is a bracket or frame secured to the upper surface of bridge 42 of the casing by screws 241, 242. 243 is a similar bracket similarly secured by screws 244, 245, at the other end of bridge 42. A bar 246 is longitudinally movable in openings through the base of brackets 240 and 243, and has fixed thereon upwardly extending arms 246, 247. A strong spring 248 normally holds these parts in the position shown in Fig. 22, with a stop pin 249 through bar 246 in contact with bracket 240. A rod 250, fixed at one end in arm 546, passes through an opening in bracket 240, through a series of eight circular tension plates or disks 251, washer 252, coiled spring 254, washer 253, and has a longitudinally split end engaged by an elongated thumb-nut 255. The end of rod 250, at one side of the split, is cut-away or shortened, and at the other side is formed with radiating stop surfaces 256 (Fig. 22—Fig. 10 shows similar parts in the other tension device). A pin 257 projecting into the opening through nut 255, limits the turning of the latter by engaging one or the other of the stop surfaces 256, and thereby limits the adjustment of the nut to vary the compression of spring 254, which compression determines the pressure of the tension disks against each other and the strength of the tension upon the threads. In engaging the screw-threaded end of rod 250, nut 255 tends to compress together the parts separated by the split; the resulting friction prevents accidental turning of the nut. 258 is a second rod secured at one end in arm 546, and passing through bracket 240, spring 259 and a number of washers and two tension plates or disks 260, into engagement with thumb-nut 261, similar in construction and operation to nut 255.

The cross-thread 5 passes into an eye 262 of an arm 263 on bracket 240 (Figs. 2 and 41), between disks 260, around rod 258, out of eye 262, and downward under a pin 269 referred to hereafter. Each of the four needle-threads passes under a horizontal guide-pin 264 (Fig. 41) projecting from an ear on bracket 240, through one of four slots 265 in a vertical flange on the base of bracket 240, under another horizontal guide-pin 266, between its pair of tension disks 251, over rod 250, under a guide pin 267, through one of four slots 268 in another vertical flange on the base of bracket 240, and under pin 269. Plate 163 has in its edge five notches or slots 270 (Figs. 20 and 21), one for each of the five threads just mentioned, adapted to be crossed by the pin 269, which is longitudinally slidable in the plate. In threading the machine, the operator grips the milled head of the pin 269 and withdraws it to the position shown in Fig. 21, the end of a spring 271 engaging a notch near the end of the pin to prevent complete withdrawal of the latter. When the threads have been engaged in the slots 270, pin 269 is shoved into the position shown in Fig. 20, the spring 271 engaging a notch in the pin near its head.

A rod 272, fixed in arm 247 (Fig. 22) passes through an opening in bracket 243 and carries an arrangement of circular tension plates or disks 273, spring, washers and thumb-nut, exactly similar to those on rod 250. Each of the four looper-threads passes under a horizontal guide-pin 274 (Fig. 40) through one of four slots 275 in a vertical flange on the base of bracket 243, under a guide pin 276, between its pair of disks 273, over rod 272, under a guide pin 277, through one of four slots 278 in a second vertical flange on the base of the bracket, and under a guide pin 279. 280 (Figs. 1 and 40) is a plate, similar to plate 163, having in its edge four notches 281, one for each of the looper threads. The function and operation of pin 279 with reference to these notches is the same as that of pin 269 with reference to the thread notches in plate 163.

From the pin 269 the cross-thread and the needle-threads pass to the rotary take-up 282 (Figs. 1, 8 and 20) fixed on part 80 of the main-shaft, and comprising three annular flanges forming therebetween a wide annular groove for the four needle-threads and a narrower groove for the cross-thread. Pins 283, 284, extend across said grooves, as shown, and are so located with relation to their centers of rotation and the movement of the other elements of the machine, that they act in a well-known manner to take up slack thread at proper periods in the stitch-forming operation. From this take-up the five threads pass under a horizontal guide-pin 285, and thence through five thread notches in a bracket-arm 286 (Figs. 1, 2 and 20). From the latter the cross-thread 5 passes directly to the cross-thread carrier. The four needle-threads pass through four notches 287 of a reciprocating take-up 288, which is secured at its upper end by a screw 289 to needle-bar 105 (Figs. 18, 19, 24 and 8), extends in a horizontal direction through a vertical slot 290 in cover 63, and then drops vertically to a horizontal end in which the notches 287 are located. From notches 287 the threads pass to the thread-eyes in flange 132 of the needle-clamp. As the needle-bar ascends to its highest position, take-up 288 acts to deflect the threads, as shown in Fig. 2, thereby coöperating with rotary take-up 282 in taking up slack thread from the needle-thread loops below the work.

From pin 279, the four looper threads 6, 7, 8 and 9 pass to the rotary take-up 291 fixed on part 81 of the main-shaft, and comprising two flanges forming an intervening annular groove across which pins 292, 293, extend. From this take-up the threads pass under a guide-pin 172 (Fig. 1) and enter the open inner end of a horizontal trough-like thread-way 173, between projections 294 (Figs. 1 and 8ª) on the bottom thereof. At its outer end said thread-way has a depending portion forming a slide-way in which a bar or slide 295 is vertically movable (Fig. 14, Sheet 10, Fig. 17, Sheet 11). The four looper threads extend through the thread-way, and enter four parallel grooves extending across the upper end of slide 295 and down the front face thereof, as clearly shown in Fig. 17, in which view the slide is shown in an elevated position to which it may be raised to facilitate the act of threading the machine when cover 74 is removed. With cover 74 off the threads take the positions indicated in dotted lines Fig. 17. A U-shaped spring 296 (Figs. 15 and 17) exerts friction upon the sides of the slide 295, to retain it in the position to which it is moved. Fig. 14 shows the slide in its normal lowered position, its lower end projecting through an opening 297 (see also Figs. 1 and 17) in the wall of the part 51 of the work-arm into the end of a deep thread-groove or channel 298 (see also Fig. 39), cut into the upper edge of one wall of the part 53 of the work-arm, and extending longitudinally of said arm until it intercepts the opening 83 in the side wall of the arm. The four looper threads leave the lower ends of the thread-grooves in slide 295 at different heights, effected by terminating the lower ends of the walls between the grooves at different elevations, as clearly shown in Figs. 14 and 17. A removable cover 299 has a horizontal part for closing the thread-way 173 and a vertical part for covering the thread-grooves in slide 295. The cover is locked in position by curled over ends of U-spring 296 (Fig. 15) engaging notches in the edge of the cover; the arms of the spring may be readily spread apart to disengage them from these notches, thereby freeing the cover for removal. From the thread groove 298, the four looper threads pass directly to thread-eyes on the looper-carrier, fully explained hereafter.

Figs. 49 to 55 inclusive (Sheets 23 and 24) illustrate constructions of thread-guides and tensions somewhat simpler than, and it is now believed preferable to, the embodiments of corresponding means illustrated in the previous figures of the drawings. Except as to the matters hereinafter described, the parts of the mechanism illustrated in these figures of the drawings are substantially like corresponding parts in previous figures.

650 is a bracket or frame secured to the upper surface of bridge 651 of the framework by screws 652 (Fig. 52). Instead of circular tension disks—such as 251 (Fig. 22)—eight elongated tension plates 653 are employed in the present instance. A screw pin 654 passes loosely through openings in these eight plates near one end thereof into fixed engagement with the bracket. A rod 655 fixed at one end in an arm 656, passes loosely through an opening in bracket 650 and openings in the eight tension plates. A coiled spring about this rod, as in the previous construction, presses the tension plates together. A plate 657 secured to and supported by the bracket has therethrough four radiating horizontally-extending thread passages 658, these passages being widely separated at one end and relatively close together at their other end, from which latter four needle-threads pass between the tension plates, as clearly shown in Fig. 52. By widely separating the thread-passages 658 at their outer ends, the threads are held widely separated in their passage to the machine with the object of avoiding entanglement.

The cross-thread passes inward through a thread-guide 659, between tension disks 660, loops about the rod on which said disks are mounted, as in the previous structure, and passes outward through the thread-guide 659. This thread-guide, shown in Fig. 52, but more fully illustrated in Fig. 55, comprises a cup-like part 661 and a stem 662, both fixed to the bracket 650 by a set screw 663. Head 664 at the outer end of stem 662 has therethrough a thread-eye 665 into which thread may be introduced through a slot 666 opening into one side of the eye. A tubular plunger or sleeve 667 surrounds the stem 662 and is adapted to have longitudinal sliding movement in the cup-like part 661 and on stem 662. Spring 668 coiled about the stem 662 normally presses the tubular plunger outward until a shoulder 669 about the interior of its outer end bears against the underside of the head 664, causing the outer end of the plunger to encircle the inner end of the head so as to extend over and close the slot 666, thereby preventing disengagement of the thread from the eye 665 when the parts are in this position. To introduce thread into the eye 665, the operator grips the milled portion 670 of the plunger and presses the latter inward against the tension of spring 668 uncovering the slot 666 so that thread may be passed therethrough into the eye.

From the parts just described, the four needle-threads and the cross-thread pass downward through a series of thread-guiding hooks 671, clearly shown in Fig. 52, secured in any suitable manner, for example by soldering, in notches or recesses in the under edge of the base-plate of bracket 650. From these hooks the threads pass over take-ups hereafter more fully described, and thence through another series of thread-guiding hooks similar in construction to the hooks 671 above mentioned. It will suffice to describe in detail the last-named series of hooks, which are shown in Fig. 52, and more clearly illustrated in Figs. 49, 50 and 54. Of this series there are four hooks 672, one for each of the needle-threads, and a fifth hook 673 for the cross-thread. A plate 675 coöperates with cross-thread hook 673. As clearly shown in Fig. 50, the point of each hook projects into a groove or recess in the back of its coöperating hook or plate, sufficient clearance being allowed between the adjacent surfaces to permit a thread to be passed inward to a position beneath the hook without actually threading it through the eye formed by the hook. The relationship of the point of the hook and its groove, however, prevents the thread from being disengaged, or from becoming disengaged from the hook by movement in a reverse direction. A construction is thus provided which offers great facility in threading the machine, while at the same time effectually avoiding accidental displacement of the thread during the rapid operation of the mechanism. The series of hooks and plate are mounted in proper relationship by securing their shanks (in any suitable way, as by soldering) in parallel grooves or recesses in a block 676, which latter is in turn secured to the bridge 651 of the framework by a screw 677, Fig. 49.

678 is a second bracket secured to the bridge of the framework by suitable screws. A rod 679, fixed at one end to an arm 680, passes loosely through said bracket and loosely through eight elongated tension plates 684 (similar to tension plates 653), and carries a coiled spring 681 which presses the tension plates together. A plate 682 is secured to and supported by bracket 678; it is similar to plate 657, and provides four thread passages 683 from which the four looper threads pass between tension plates 684, through a set of four thread-guiding hooks 685, over a rotary take-up hereinafter described, and through another set of four thread-guiding hooks 686. The sets of thread-guiding hooks 685 and 686 are similar in construction to the thread-guiding hooks before described in detail.

The thread-tension means are released by the action of an arm 687, Fig. 49, similar to arm 308 shown in Fig. 22 and elsewhere, and hereinafter described.

The rotary take-up, or double take-up, which acts upon the four needle-threads and the cross-thread, is shown particularly in Figs. 52, 56 to 59, and 62 to 65. The needle-thread take-up cam-part 695 is integral with a hub 689, into which a set screw 690 is threaded securing it to the shaft. Around this hub flange-plates 691 and 688 are sleeved. Cross-thread cam-part 692 has an opening or recess which fits around hub 689. A flange plate 694 is also sleeved on the hub and screws 696, 696, passing through plate 691 and body part 695 are threaded into nuts which are set in countersunk openings through plate 694 and project therethrough into recesses in cam-part 695. Thus the plates 694 and 691 are firmly secured to cam-part 695. In like manner, screws 693 pass through plate 688 and cam-part 692 and engage with nuts which extend through countersunk openings in plate 691, and secure plate 688 and cam-part 692 to plate 691. There is thus provided at the bottom of the relatively narrow groove between the plates 688 and 691, a cam-like surface which acts upon the cross-thread drawn thereover. A curved plate 697 is secured at one end in a recess in cam-part 695 by a screw 698; its other end projects beyond the body part in the form of a series of tapered fingers 700 separated by four notches 699 for the four needle-threads respectively. A flat spring 701 is interposed and secured at one end between plate 697 and body part 695, and bears along and against the under side of fingers 700, its free end terminating at about the ends of the fingers. There is thus provided in the groove between the plates 691 and 694 an unyielding cam-like surface—the rigid surface of body part 695—and a yielding surface of spring 701, adapted to act upon the four needle-threads in the manner illustrated in Figs. 62 to 65 inclusive. In this succession of views, the rotary take-up is shown in different positions corresponding to different operative positions of the needles. In each view the dotted line 702 indicates the approximate position of the upper surface of the throat-plate. In Fig. 62, the needles are in their uppermost position, about to begin a down stroke, and the rotary take-up has exerted its maximum pull or pressure upon the threads to tighten the last stitch of each needle by taking up slack thread, and also to pull sufficient thread—in addition to the slack—through the tensions for the succeeding stitch. In Fig. 63 the needles have moved down the taut threads and their eyes are about to enter the work. The threads now extend through their respective notches 699, and the spring 701 is pressing outward against the threads, still holding the latter taut to prevent their becoming entangled with the needle points and the parts above the work-plate (shown in other figures of the drawings) which act upon the cross-thread. As the eyes of the needles pass through and below the work, the thread must be very rapidly supplied for formation of the needle loops below the work. This supply of thread is rendered possible by the pull on the thread bending the spring 701 inward to the limit of its movement, as shown in Fig. 64, the needle-thread in this position of the parts passing more nearly in a direct line between the thread-guiding hooks 671 and 672. In the position of the parts shown in Fig. 65 the needles are about to begin their ascending movement. It will thus be seen that the principal functions of the spring 701 are to retard the loosening of the threads after the unyielding part of the take-up passes its point of maximum pressure upon the threads, and to provide a continued pressure upon the threads which prevents slack but yields to supply thread to the formation of the loops while the needles project through the work. From the hooks 672 the four needle-threads pass through thread-eyes in a plate 703 secured to the under side of the head of the machine and projecting therefrom. In acting in the manner above described, this take-up performs, with reference to the needle-threads, the functions of both the rotary take-up 282, and the reciprocating take-up 288, described with reference to previous figures of the drawings.

The rotary take-up for the four looper-threads (Figs. 53, 60, 60$^a$, and 61) comprises a cam-part 802 integral with a hub 804 into which set-screw 803 is threaded to secure it to the shaft. Flange-plates 800 and 801 are sleeved on the hub at opposite sides of part 802. Screws 805, 805, pass through plate 801, cam-part 802 and into nuts projecting through countersunk openings through plate 800, thus securing the parts together.

From the thread-hooks 686 the four looper-threads enter the open inner end of the horizontal part of a trough-like thread-way 704—see particularly Figs. 66 to 73 inclusive, Sheets 27 and 28. From its horizontal portion this thread-way continues forward in an inclined portion 705 and terminates in a vertical part 706. The inclined portion is longitudinally grooved to form four parallel thread passages 707 into which the threads are directed through four thread-guiding slots 708 in a block 709 secured by screws 710 in a recess at the junction of the horizontal and inclined parts of the thread-trough. The vertical end portion 706 of the thread-trough constitutes a slide-way in which a bar or slide 711 is vertically movable. This slide has four longitudinally-extending grooves 712 forming thread-passages for guiding the threads from the ends of the passages 707 to thread-eyes 713 through blocks 714 riveted to the lower end of the slide 711 at different elevations, as clearly shown in Figs. 72 and 73. Slots 715, Fig. 73, permit the threads to be readily introduced into the thread-eyes 713. The ribs separating the thread-passages 712 are formed with curved shoulders 716 against which upward pressure may be exerted by the finger of the operator to elevate the slide to its raised position in threading the mechanism. In its lowermost position the lower end of the slide depends into a passage-way extending longitudinal of the wall of the horizontal part of the work-arm, as shown in Fig. 67, and as previously described with reference to the slide 295 illustrated in previous figures of the drawings. A spring-actuated catch pin 717, most clearly shown in Fig. 73, is adapted to engage a countersunk recess 718 in the rear surface of the slide to retain the latter in its elevated position. A groove 719 intercepting recess 718 at one side acts in conjunction with the inclined bottom of the recess to force the catch pin 717 back to its inactive position when downward pressure is exerted upon the slide 716. When the slide is elevated, the tapered point of the catch pin drops into the recess 718 and coöperates with the vertical portion of the wall of said recess to prevent further upward movement of the slide. When, however, it is desired to remove the slide from the machine, the point of a suitable implement may be inserted through an opening 720, leading into the bottom of the recess 718, to force the catch pin 717 back to a position to release the slide. Screws 721 and 722 pass through bracket arms on the thread-guiding trough and into the wall of the work-arm to secure the trough in position. The thread passage through the horizontal part 704 of the trough is closed by a cover 723 having along one edge a slot 724 engaged by two hooks 725 which hinge the cover in place, as clearly illustrated in Fig. 68. In this construction of the thread-trough, the threads are exposed to view in their longitudinal passages in the inclined part 705 and the vertical slide 711, although in such position at the bottom of these passages as not to be susceptible to entanglement, soiling, or handling by the operator during the operation of the machine.

*Presser-foot lifting and tension-releasing means.*—Referring particularly to Figs. 1, 3, 17 and 20, 300 is a short tubular rock-shaft or sleeve, rotatable on a stud 301. A rock-arm 302, preferably cast integral with the shaft, extends toward the rear of the machine where it is engaged by a rod 303 which latter depends through an opening in the flange of the base of standard 41 (Fig. 1) and through the table upon which the machine is mounted (Fig. 3) into engagement with a knee-lifter device or treadle (not shown) by which the operator may move the end of arm 302 downward to rock the shaft 300. A coiled spring 503 around rod 303 resists the downward movement of arm 302 and normally holds said arm up against stop screw 504 permitting the presser-foot to assume its lowered position. Stop screw 505 limits the downward movement of arm 302. 304 is a second arm preferably cast integral with shaft 300 and reaching forward so that its end normally lies under the lower end of the presser-foot bar 215 (Figs. 4 and 17) with slight clearance. A link 305 connects arm 302 with an arm 306 on the end of a rock-shaft 307 (Figs. 1, 4, 8, 22 and 23), which latter extends through the upper end of hollow standard 41 and is journaled in bearings in the side walls thereof. A collar 507 (Fig. 8) on shaft 307 prevents endwise movement thereof. 308 is a second arm on rock-shaft 307, said arm having a beveled end surface (Fig. 8) bearing against the end of bar 246, and adapted to move the same and the other bars 250, 258 and 272 connected therewith, longitudinally in their bearings to the right (Figs. 22 and 4) against the tension of spring 248. This results in releasing the pressure between all of the tension disks and consequently their grip upon the nine threads.

The movement of the knee-lifter device or treadle (not shown) which pulls the rod 303 downward and rocks arm 302 and its shaft 300, releasing the tension devices through the connections just explained, also swings the arm 304 upward, causing it to engage and move presser-foot bar 215 upward against the pressure of its spring 217 (Figs. 17 and 18). It follows that the presser-foot fixed to the bar, the cross-thread-carrier and the cross-thread-hook both mounted in bearings on the foot, the trimmer mechanism, the bearing sleeve 207, trimmer hub 189, are all elevated from the position shown in Fig. 18 to that shown in Fig. 19, affording ample space between the lower surface of the foot and the throat-plate for any thickness of work to be manipulated over the teeth of the feed surface, which teeth project slightly above the surface of the throat-plate when the machine is stopped with the needles in their highest position. The tension being also released at this time, all of the threads may be freely drawn from their source of supply in removing the work, and the threads severed at any desirable distance from the needles.

In Figs. 75, 76 and 77, Sheet 29 of the drawings, there is shown—in addition to the connections from a knee-lifter device or treadle described in connection with previous figures of the drawing—a hand-lever and connections for raising the presser-foot and releasing the tensions and locking the parts in such position. The rock arm 726 corresponds to the rock-arm 302 previously described; likewise the shaft 727 and the arm 728 thereon correspond to the shaft 307 and the arm 306 heretofore described. A bent link 729 pivoted at its lower end to the rock arm 726 by a screw pivot 730, is pivotally connected at its upper end to the outer end of arm 728. 731 is a hand lever fulcrumed to the head of the machine by a screw pivot 732 and carries a screw stud 733 the shank of which works in a slot 734 in the upper end of a connecting bar 735, which latter at its lower end pivots on the screw pivot 730 beneath the link 729. 736 is a buffer spring secured in a groove along the under side of hand-lever 731 and adapted to contact with a stop screw 737. A spring 738 coiled about the shank of a screw 739, screwed into the connecting rod 735, has one end anchored in an opening in said rod, as clearly shown in Fig. 76, and at its other end bears in a short groove along the upper edge of rock arm 726. In the normal position of the parts, the pressure of spring 740 on the treadle rod 741 constantly tends to move the parts to their normal position shown in full lines in Fig. 75, where the rock-arm 726 contacts with screw stop 742 and the connecting rod 735 is elevated tilting the hand lever 731 forward with its buffer spring against stop screw 737. In this position of the parts, the axis of the pivot screw 733 lies to the left of an imaginary straight line connecting the axes of pivot screws 732 and 730. To elevate the presser-foot and release the tensions by operation of the hand-lever 731, the latter is moved to the position shown in dotted lines in Fig. 75; the pivot screw 733 acts against the lower end of the wall of slot 734, imparting a longitudinal downward and swinging movement of the connecting rod 735, moving said rod, the rock arm 726, the arm 728 and the link 729, to the positions indicated in dotted lines Fig. 75. In this dotted line position of the parts, a projecting stop surface 743 on the end of hand-lever 731, comes in contact with a like stop surface 744 on the head of the machine, and the axis of the pivot screw 733 occupies a position slightly to the right of an imaginary straight line connecting the axes of screw pivots 732 and 730. In this relationship of the axes of the pivots, the upward pressure exerted by the spring 740 tends to hold the stop surfaces 743 and 744 tightly in engagement, thus locking the parts in their dotted line positions, Fig. 75, notwithstanding the weaker pressure of the spring 738 tending to swing the upper end of the connecting bar 735 toward the left. The parts are thus temporarily locked in position to hold the presser-foot elevated and the tensions released, and will so remain until released by a slight forward movement of the hand-lever or a slight downward movement of the treadle connections. A slight forward movement of the hand-lever will move the axis of pivot screw 733 to the left across the imaginary straight line above mentioned, whereupon the pressure of spring 738, tending to throw the connecting bar 735 toward the left, and the upward pressure exerted by spring 740, will move the parts back to their full-line position, Fig. 75, with a quick snap, the impact being deadened by the buffer spring 736. A like result will, as above indicated, be effected by a slight downward pressure on the treadle connections, moving the connecting bar 735 slightly downward from its dotted line position Fig. 75, thereby releasing the upward pressure which spring 740 exerts in keeping the contact surfaces 743 and 744 in engagement, and permitting the spring 738 to move the connecting bar 735 to the left sufficient to throw the axis of screw pivot 733 slightly to the left, whereupon the release of the treadle or knee-lifting device will free the spring 740 to move the parts to the full line position Fig. 75.

*The feed, throat-plate, chaining fingers and loop-shedder.*—Although a unitary feed may be employed, the present invention comprises an improved feed mechanism wherein two separate feed devices or surfaces are given relatively different movement, for purposes more fully explained hereafter. Referring particularly to Figs. 8ª and 11, 310 is a pitman fulcrumed on a pin 311, and also movable longitudinally on said pin through the intermediary of bearing-blocks 312 working in a capped opening of the pitman. The inner end of pin 311 is secured in a socket in a wall or flange 174 (clearly shown in Fig. 10) by a set-screw 313. A capped bearing at the inner end of pitman 310 embraces crank 90. A capped bearing at the outer end of the pitman embraces a spherical bearing 314 of a coupling device through which motion is transmitted to a vertical lever 315 extending longitudinally within the part 51 of the work-arm. The coupling referred to (see also Fig. 85, Sheet 33) comprises a sleeve 316 embracing and vertically movable on a short shaft 317 extending through an opening in the top wall of the part 50 of the work-arm, its lower end being fixed by a set screw 318 in a socket in the lower wall of said part of the arm, as clearly shown in Fig. 11. An upwardly projecting flange 319 around said socket forms a cup for lubricant which lubricates the contacting surfaces of the lower end of sleeve 316 and the shaft 317. The upper end of shaft 317 is hollow, and from the lower end of the hollowed portion a passage 320 leads to the surface of the shaft, its outer end being preferably closed with a leather plug in the manner and for the purpose similar to the closing of the lubricant passages as illustrated in Figs. 6 and 7. The hollow portion of the shaft is preferably filled with a fibrous material, such as waste, held in position by a plug 321 at the outer end of the shaft, said plug having a central opening through which lubricant may be introduced to saturate the fibrous material. Sleeve 316 has two short arms projecting therefrom at an angle of approximately 115° with relation to each other, the arm 322 consisting of a part cast integral with the sleeve and a pin 323 screw-threaded into said part and at its outer end slidingly engaging in an opening through the spherical bearing 314 heretofore mentioned. The other short arm 324 on the sleeve also comprises a part cast integral with the sleeve and a pin 325 screw-threaded into a socket in said part and at its outer end slidingly engaging in an opening through a spherical bearing 326. The latter is embraced by a capped bearing at the upper end of the lever 315. From the construction thus described, it will be readily understood that the slightly elliptical motion imparted to the outer end of pitman 310 acts upon the arm 322 (Fig. 8ᵃ) of the coupling, causing the outer end of said arm to describe a similar slightly elliptical movement, during which the pin 323 has slight longitudinal movement in the opening in the spherical bearing 314, and the sleeve 316 slides up and down on the shaft 317. This elliptical movement of arm 322 is approximated in Fig. 85 (Sheet 33) by the ellipse marked $a$, the major axis of which, equal to the line $b$, represents the distance of movement in a horizontal direction, while the minor axis, equal to line $c$, represents the distance of movement in a vertical direction. The arm 324 of the coupling, which acts upon the upper end of the lever 315 (Fig. 11), describes an elliptical movement approximated in Fig. 85, by ellipse $d$, the major axis of which, equal to line $e$, represents the distance of horizontal movement imparted to the outer end of arm 324, and the minor axis of which, equal to line $f$, represents the distance of vertical movement. It will be seen that the minor axes of both ellipses, equal to lines $f$ and $c$, are of equal length, corresponding to the vertical sliding movement of the coupling on the shaft 317. On the other hand, the major axis, equal to line $b$, is longer than the major axis equal to line $e$, due to the fact that arm 324 is relatively shorter than the arm 322. The dimensions of the coupling such as the length of the arms and their angular relationship, may be varied to fit different conditions and requirements of use. Instead of having the arms at an angle of approximately 115° as in Fig. 85, it may be desirable to position them at 180°, as in Figs. 86 and 87. The couplings being otherwise similar, the form of movement transmitted to the driven part will be the same, as indicated by a comparison of ellipses $a$ and $b$ of Fig. 85 with ellipses $g$ and $h$ of Figs. 86 and 87. A circular movement at the end of one arm will be transformed into an elliptical movement at the end of the other arm if the arms are of different lengths. Various other similar transformations of movement are possible. With arms of equal length, the movement will be similar at the end of both.

The lever 315 is fulcrumed to turn on the inner reduced end of the stem of a milled thumb wheel 327. The stem of said wheel passes through a slot 328 in the front wall of the part 51 of the work-arm, and has thereon a flange 329 which bears against a shoulder around said opening formed by counter-sinking the latter. The stem of thumb-wheel 327 has a screw-threaded portion engaging a nut 330 (Figs. 11, 12 and 42, Sheet 9), a part of said nut extending into the slot 328, as shown in Fig. 11, in order to prevent the nut from turning with the stem. Through the intermediary of two bearing blocks 331 embracing the reduced end of the stem of the thumb-wheel, and working in an elongated capped bearing opening in the lever 315, the latter is free to move longitudinally during its rocking movement about its fulcrum. At its lower extremity this lever is pivoted to the upwardly bent end of a horizontal feed lever 332, this pivot consisting of a screw 333, the threaded end of which engages the lever 332 and the headed end of which engages an opening through the lever 315, as clearly shown in Figs. 11 and 39. The feed lever 332 extends longitudinally within the horizontal part 53 of the work-arm, and near its end is fulcrumed to turn and move longitudinally upon a pivot pin 334, Figs. 31, 32, 33, 34, and 39, which is supported in openings through the side walls of the part 53 of the arm. A set-screw 335, Figs. 33 and 39, is adapted to seat in a notch 336 at one end of fulcrum pin 334 to secure the latter in place. A deeper notch 337 near the other end of the pin registers with the longitudinal thread channel 298 so as not to obstruct the passage of the four looper-threads 6, 7, 8 and 9 therethrough. Two bearing blocks 338 embrace the fulcrum pin 334, and are in turn embraced by an elongated capped bearing opening 339 in the lever 332. 340 is a feed surface comprising three parallel rows of teeth adapted to work through three parallel slots 341 respectively, in the throat-plate 66 (see particularly Fig. 39). The shank 342 of feed surface 340 has a groove 343 (see Fig. 32) in its under surface embracing rib 344 (Figs. 32 and 39) on the end of lever 332 to hold the feed surface against lateral movement, a screw 345 serving to secure the parts together. Through the connections explained, the feed surface 340 is given what is known in the art as a four-motion feed describing a circle or ellipse. The extent of this feed movement, or what is known as the throw of the feed, may be adjusted to increase or decrease the same by loosening the thumb wheel 327 (Fig. 11), and moving the same, its stem and the bearing blocks 331, upward to increase the throw of the feed surface, and downward to decrease the same. The feed thus far described may be designated the "fulling feed", inasmuch as the feed surface 340 operates in advance of the point of formation of the stitches, as clearly shown in Fig. 30, and by being adjusted to have greater movement than the stitch-feed, acts to full the material at this point, with the object of presenting the material (particularly such as relatively flexible knit-goods) to the action of the needles in an unstretched condition and thereby avoiding formation of the stitches on the material when in a stretched condition. It may, of course, be found that in some classes of work which machines of this type are adapted to perform, no material difficulty will be experienced requiring the use of a fulling feed; in such instances feed member 340 may be adjusted to work in unison with feed member 359 about to be described. It will, of course, be understood that when a fulling feed such as described is used, it must be so adjusted with relation to the stitch feed as to have a feed stroke in excess of that of the latter, in order to insure a proper fulling of the material in advance of the needles.

The feed which advances the work to determine the length of the stitches will now be described. 350, Figs. 11 and 12, is an auxiliary lever pivoted at its upper end, by a screw pivot 351, to lever 315 and at its lower end pivoted by a screw pivot 352 (similar to screw pivot 333, heretofore described), to the upwardly bent end of a feed lever 353, which latter extends longitudinally within the horizontal part 53 of the work-arm parallel to the feed lever 332. Intermediate of its ends the lever 350 is fulcrumed to turn on the reduced end of the stem or shank of screw 354 (Figs. 11, 12 and 10.) The lever 350 is also longitudinally movable on its fulcrum through the intermediary of two bearing blocks 355 embracing the pivot end of the screw 354 and located in an elongated capped bearing slot 356 in the lever 350. The stem or shank of the screw 354 passes through a vertical slot 366 (Figs. 10 and 11) in the rear wall of the vertical part 51 of the work-arm, the head of the screw engaging the counter-sunk outer portion of said slot and bearing against an offset or shoulder formed around the slot by the counter-sinking. A screw-threaded portion of the stem of the screw engages a nut 367, which like the nut 330, has a part projecting into the inner end of the slot 366 to prevent the nut turning with the screw. By tightening the screw to draw the nut against the inner surface of the wall of the arm at the sides of the slot, the screw is secured in any position to which it may be adjusted. The horizontal feed lever 353 (like feed lever 332) is fulcrumed to turn on pivot pin 334 (Figs. 33, 34 and 39), and also to move longitudinally with reference to said pin through the intermediary of two bearing blocks 357 embracing the pin and working in a capped bearing opening 358 of the lever 353.

359 is the stitch feed surface, divided into three parallel rows of teeth adapted to work in slots 360, 361 and 362, respectively, of the throat-plate. The shank 363 has a longitudinal groove in its under surface fitting over a rib 364 (Fig. 39) on the end of lever 353 to prevent lateral movement of the parts when they are secured together by the screw 365.

From the construction described, it will be understood that the auxiliary lever 350 is rotated and moved longitudinally on its fulcrum, causing its lower end to describe an elliptical movement, which is in turn imparted to the upwardly bent end of the feed lever 353. This movement of the latter lever transmits to its forward end, to which the stitch feed surface 359 is attached, a circular or elliptical movement the outline of which depends upon the location of fulcrum pin 334 and of the fulcrum pin 354 of lever 350. During a portion of the movement thus imparted to the feed surface 359, its teeth are projected through the slots 360, 361 and 362, engage the under side of the work, and advance the same to determine the length of the stitches. This length of the stitches may be varied by adjusting the screw pivot 354 vertically in its slot 366, thus changing the location of the fulcrum of lever 350; moving the screw pivot 354 downward in Fig. 11, thus bringing the fulcrum nearer the lower end of lever 350, will correspondingly reduce the movement of the feed surface 359 and correspondingly shorten the stitches.

The form of coupling described above for transmitting motion from the pitman 310 to the lever 315 is of special importance and adapted to a wide variety of uses, in that it enables rotary and other movements in a curved line to be transmitted between longitudinally movable levers, pitmen, or analogous parts, without the use of gears and shafts therefor. The movement thus transmitted may be of regular or irregular form, and the path described by one arm of the coupling may differ from that described by the other arm, depending upon the relative lengths of the arms. By the use of such coupling it is possible to dispense with beveled or analogous gearing in the use of which provision must be made for end thrust. Furthermore, the wear on the teeth of beveled gears produces slight lost motion, which in machines of the character herein described is seriously objectionable. Furthermore, beveled and analogous gearing are noisy, particularly when operating at high speed such as that at which machines herein described are adapted to be driven; the improved coupling described practically eliminates these objections.

In Figs. 78 to 84 inclusive of the drawings, Sheets 30–32, there is illustrated a construction which includes means for vertically moving the fulcrums of the vertical feed levers in adjusting their positions to vary the throw of the feed-members, the parts illustrated in said figures being otherwise substantially like corresponding parts heretofore described. The vertical levers 745 and 746 correspond to the levers 315 and 350 previously described. The head of a screw 747 is movable in the counter-sunk outer end of a vertical slot 748 in the wall of the vertical portion of the work-arm. The shank of this screw passes through slot 748, is screw-threaded through an opening in a rack-plate 749, and has a reduced inner end constituting the fulcrum for lever 745. A similar screw 750 passes through a counter-sunk vertical slot 751 in the opposite wall of the work-arm, is screw-threaded through a rack-plate 752, and has a reduced inner end constituting a fulcrum for lever 746. By tightening screws 747 and 750, they draw rack-plates 749 and 752 tightly against the inner surfaces of the wall of the work-arm rigidly fixing the positions of the fulcrums. When the screws are loosened the rack-plates may be moved vertically in their slide-ways carrying with them the screws to change the positions of the fulcrums.

The means for moving the rack-plates will now be explained. 753 is a block secured within the vertical part of the work-arm to its rear wall by screws 754, 755 (Fig. 79). A shaft 756, journaled in an opening through the block carries at one end a pinion 757 which meshes with rack-teeth along one edge of rack-plate 752. A second shaft 758, also journaled in an opening through block 753, carries at one end a pinion 759 meshing with rack-teeth along one edge of rack-plate 749. 760 and 761 are wheels fixed to the ends of shafts 756 and 758 respectively and free to turn in circular openings in a plate 762, which latter is secured to block 753 by a screw 763 and closes an opening in the front wall of the vertical part of the work-arm. Each wheel is provided with two openings for engagement of a spanner by which the wheels, their shafts and pinions may be rotated to move the rack-plates up and down to correspondingly adjust the positions of the fulcrums carried by said plates. Rotation of wheel 761 adjusts the fulling-feed, and of wheel 760 the stitch-feed. The face of each wheel is marked about its periphery with a scale (Fig. 84), the divisions of which are marked by numerals and serve as guides in adjusting the mechanism. Thus setting wheel 760 to its "2" mark and wheel 761 to its "4" mark, preferably effects a relative adjustment which gives to the fulling-feed a feeding movement twice the distance of the feeding movement of the stitch-feed, and so on.

Referring particularly to Figs. 30 and 39, 370 is a chaining-finger plate, secured in a counter-sunk recess in the throat-plate 66 in such position that its three chaining fingers 371 project into a needle-opening 372 through the throat-plate and divide one end of this needle-opening into four spaces or parts into which the needles descend at the sides of the fingers. The principal function of these chaining fingers is to take the place of the work or fabric, enabling the machine to properly form the stitches when running without any work under the needle, in the operation of chaining-off, for example. In this latter operation the stitches are formed about the fingers and advanced off of the free ends thereof by the feed of the chain. At the same time the presence of these fingers in no way interferes with the proper formation of stitches when work is under the needles, as illustrated in Fig. 30. In both cases the threads cross, on both sides of the seam, back and forth across the chaining fingers in practically the same way, the only difference being that in "chaining off", the cross-thread 5 on the needle-side of the work bears directly upon the chaining fingers instead of upon the interposed fabric. Hence the threads may be accurately said to be passed across the chaining fingers whether or not fabric or work is introduced.

373 is a loop-shedder (Figs. 30, 35, 36 and 39) in the form of a depending flange or lip, secured to the under side of the throat-plate across the rear edge of the needle opening 372. As shown, this shedder depends into the needle opening 374 through the feed surface 359 (see also Fig. 39) to the rear of the path of the needles, and between the slots 362 and 360 of the throat-plate, as shown in the upper part of Fig. 39. The function of the loop shedder is to prevent movement of the loops in the needle-threads as the loopers are withdrawn from said loops.

*Loopers and operating means therefor.*— Referring particularly to Figs. 18, 29, 31, 32 and 39, 375 is a looper-bar or lever. 376 is a looper carrier pivoted to turn on a pivot pin 377 which has a screw head and a reduced screw-threaded end engaging a screw-threaded opening in the looper-bar 375. A spring washer 175 interposed between the head of the pivot pin and the upper surface of the looper carrier holds the latter down to operative position and affords friction to hold the carrier in any position to which it may be swung on the pivot and also prevents rattling of the parts. Each of the loopers 6ª, 7ª, 8ª and 9ª (Fig. 29) has a thickened right-angle shank having two openings; the four loopers with their thickened shanks in contact are secured in a group between the upright side-plates 378 and 379, preferably integral with the carrier 376. Two screws 380, 381 pass through openings in a plate 382, side-plate 379, the shanks of the four loopers, and into threaded openings in side-plate 378. A slot or kerf 383 (Fig. 29) cut into the carrier 376 where the side-plate 379 joints it, renders the latter sufficiently yielding to enable the screws to tightly draw the parts together. Each of the loopers has a thread-groove 384 (see Fig. 29 and dotted lines Fig. 30) extending along one side of its rear end to thread-eye 385 and a short groove 386 along its other side from eye 385 to a second thread-eye 387. A plate 388 secured by the screws 380 and 381 between the looper 9ª and the side-plate 378, has a bent upper end serving to guide the looper-thread 9 into the groove 384 of looper 9ª, as clearly shown in Fig. 29. One edge of the plate 382 is formed with four thread-eyes 389, through which the looper-threads are guided to the grooves 384 of the loopers respectively, as clearly shown in Figs. 30 and 31. The looper carrier and loopers are shown in operative position in Fig. 31, for example, the end of carrier 376 engaging under an overhanging flange on a plate 390 secured by screws to the end of the looper lever 375, as clearly shown in Fig. 29, and the conical point of the spring-actuated latch pin 391 being adapted to seat in a conical-shaped opening in the plate 390 to firmly hold the parts in their operative relation. This latch pin works in an opening in the looper carrier 376, its movement being limited by the handle 392 extending through a slot 393. A coil spring 394 housed in the opening of the carrier tends to press the latch pin 391 to the limit of its outward movement. When the machine is stopped and the cover 71 at the end of the work-arm is removed, the operator may by gripping the handle 392 and releasing the latch pin 391 from engagement with the opening in plate 390, swing the looper carrier on its pivot 377, outward through the opening 83 in the side of the wall of the work-arm to a position such, for example, as that indicated in dotted lines in Fig. 31. In this position the loopers are accessible for threading, examination, removal, and repairs.

The loopers are actuated from the looper crank 89 of the main driving shaft (Figs. 8ª, 9 and 10) through the following connections: Pitman 395 has a capped bearing at one end embracing the crank 89, and near its middle is fulcrumed to turn on a pin 396 passing through the side wall of horizontal part 50 of the work-arm, and at its inner end secured by a set screw 397 in a socket in the wall of flange 174 heretofore mentioned. Through the intermediary of two bearing blocks 398 embracing pivot pin 396, and working in a capped elongated bearing opening in the pitman 395, the latter is also free to move longitudinally on its fulcrum. At its outer end pitman 395 is pivoted by screw bolt 450 to the upper end of a lever 399 extending vertically within the part 51 of the work-arm. Lever 399 is fulcrumed to turn on a headed pivot pin 400, the shank of which is secured by a set screw 401 (Figs. 5 and 14) in an opening in the wall of the part 51 of the work-arm. Through the intermediary of bearing blocks 402 embracing pivot pin 400 and working in an elongated capped bearing opening in the lever 399, the latter is adapted to move longitudinally on its fulcrum. At its lower end the lever 399 is capped to embrace a spherical bearing block 403. Movement is communicated from the lower end of the lever 399 to the end of the looper lever 375, which latter extends longitudinally within the part 53 of the work-arm, as heretofore explained, through a coupling similar to the coupling heretofore described as transmitting motion from the pitman 310 to the lever 315. In the present instance the coupling (see particularly Figs. 10, 12, 13, 14 and 16) comprises a sleeve 404 longitudinally movable on a short shaft or bar 405 supported at its opposite ends in openings through the side wall of the lower end of the part 51 of the work-arm and held in position by set-screw 406 (Fig. 13). The pin 405 is hollowed and filled with a fibrous material to be saturated with a lubricant for which an exit opening is provided through the side wall of the hollow pin. The open end of the pin is partly closed by a plug 176 having a central opening therein through which lubricant may be introduced to saturate the fibrous material. Two arms 407 and 408 (see particularly Figs. 14 and 16) project from the sleeve 404 approximately at rightangles with relation to each other, and are preferably cast integral with the sleeve; these arms include pins 409 and 410 screwthreaded at one end to engage sockets as shown. The pin 409 projects into a central opening through the spherical bearing 403. The pin 410 projects through a central opening through a similar spherical bearing 411, which latter is embraced by the capped end of the looper lever 375. From this description it will be understood that the coupling serves to communicate the rotary movement of the lower end of lever 399 to the end of looper bar 375; the turning of the sleeve 404 of the coupling on its pin 405, causes the bearing pins 409 and 410 to have a slight end-wise movement in their openings through the spherical bearing blocks. In the lateral movement imparted to the end of the looper bar 375 through the coupling just described, said bar works in a space between guide-plate 412 and a bridge piece 912 (see Figs. 14 and 39—similar parts more clearly shown in Fig. 79, Sheet 31) extending transversely across the interior of the horizontal part 53 of the work-arm; undesirable vibration of the driven end of the looper bar is thus avoided.

The fulcrum of the looper bar 375 will now be described. A cylindrical block 413 (see particularly Figs. 38, 33 and 32) is seated and rotatable in a circular recess 414 in the bottom wall of the horizontal part 53 of the work-arm. The looper bar 375 fits and is longitudinally movable in a deep transverse recess 415 through this block. To accommodate and permit the insertion of the block into this position in the arm, the curved recesses 416 and 417 (Fig. 34) are formed in the inner surfaces of the side walls of the work-arm as an upward continuation of the circular recess 414. A block 418 similar in its general shape to block 413, fits down into the recesses 416 and 417, and at its bottom surface clears the block 413 but bears against the looper bar 375 holding it in its bearing through the block 413 and the latter in place against the bottom of recess 414. Two screws 419, 420 pass through the side walls of the work-arm into block 418 to secure the latter in proper position.

Instead of employing the heretofore described pin 396 (Fig. 8ª) on which to fulcrum the pitman which is driven by the loopercrank on the main-shaft, it has been found advantageous to employ a pin 765 such as shown in Figs. 88 and 89, Sheet 34. This pin is rotatable in a bearing opening through the wall of the work-arm by engaging a spanner in openings in the outer end. It has a reduced end 766 rotatable in an opening in a wall or flange 767 (similar to flange 174 heretofore described) and an intermediate eccentrically disposed part 768 which constitutes the fulcrum of pitman 769.

Turning the pin in its bearings adjusts the fulcrum part 768 within the range of its eccentricity, and permits of positioning the fulcrum to accommodate it to proper and exact movements of other parts of the driving connections. Furthermore, this adjustment may be availed of to compensate for slight inaccuracies in the making and assembling of parts of the mechanism. A set screw 770 fixes the position of the pin when adjusted. It will also be of advantage to employ a similar adjustable fulcrum pin in place of pin 311, Fig. 8ª. With like advantage an adjustable fulcrum pin 771 (Figs. 90 and 91, Sheet 34) may be employed for the vertical loop-lever 772 (corresponding to lever 399 of previous figures of the drawings) in preference to the fulcrum pin 400, Figs. 10 and 14. Pin 771 is rotatable in a bearing in the wall of the vertical part of the work-arm by a suitable spanner, and has a reduced eccentrically disposed inner end constituting the fulcrum. A wedgelike block 773, Figs. 90, 82 and 83, bears against one side of lever 772 to confine it and associated parts in proper position during their operation. This block has a groove engaging a horizontal rib 774 on block 753 and is adjustable along said rib by a screw 775.

*Loop-spreader.*—A loop-spreader 425, is clearly shown in Figs. 30, 31, 32 and 39; it is in the form of a plate having three thread-engaging hook-points or teeth 426 at one end and a split sleeve 427 at its other end adapted to be clamped upon the reduced upper end 433 (see particularly Fig. 30, where the parts are shown in section) of a hub at one end of an arm 429. Said hub and its arm are rotatable on a headed pin 428 secured at its lower end by a set screw 432. A link 430 pivotally connected to the end of arm 429, is in turn pivoted to looper bar 375 by pivot screw 431. Movement is thus transmitted from the looperbar 375 to the loop-spreader, causing the toothed end of the latter to swing back and forth transversely to the work-arm. In its movement in one direction (the direction of the arrow Fig. 31), the teeth 426 of the spreader engage the looper-threads, as shown in Fig. 30, and in conjunction with the movement of the loopers 6ª, 7ª, 8ª and 9ª, form spread loops in said threads through which the needles descend. The dimensions and movements of the parts in the particular machine shown in the drawings is such that for each stitch a loop in each of the four looper-threads is so distended and held that two adjacent needles descend through said loop in forming a seam such as illustrated in the aforesaid Borton Patent No. 883,614.

In Figs. 92 to 96, Sheet 35, there is shown a somewhat different form of loop-spreader and connections for driving the same. The looper spreader 776 has at one end three teeth for acting upon the threads, as before. At its other end a circular opening 777 engages around a circular flange 778 about an opening 779 through a tail-piece 780. A screw 781 passing through a curved slot 782 into the tail-piece rigidly secures the loop-spreader in place, allowing limited adjustment around flange 778 as a pivot, to effect proper relative positioning of the parts. A pivoting-screw 783 passes through the opening 779 into the arm of a bracket 784 secured to the inner face of the vertical rear wall of the work-arm by screws 785, 785. A gutter 786, Fig. 93, is adapted to deliver lubricant into a conical recess in the head of screw 783 from which an opening leads to the contacting bearing surfaces of the screw and tail-piece 780. An anti-friction roller 787, rotatable on a screw pin 788 secured to looper bar 789 (corresponding to looper-bar 375 before described), works in a curved downwardly opening groove 790 at one end of tail-piece 780, whereby the movement of the forward end of looper-bar 789 in a continuous curved or elliptical path imparts the desired lateral swinging movement to the loop-spreader 776. Except for other obvious slight differences, the construction illustrated in Figs. 92 and 93 is substantially the same as in previous figures of the drawings.

*Loop-check and needle-guide.*—405 is a loop-check and needle-guide, clearly shown in Figs. 30, 31, 32 and 39, and fastened to the inner face of the rear wall of the free end of the work-arm by a screw 406. It has in its vertical face four parallel vertical grooves 407, each approximately semi-circular in cross-section. The needles descend into these grooves and are partly surrounded thereby, the proximity of the walls of the grooves being such as to open the loops in the needle-threads at the right-hand sides of the needles and to direct said loops toward the approaching loopers so that the latter may with certainty and accuracy pass through said loops. In case any one or more of the needles has been deflected at its point in passing through the work, the deflected point coming into engagement with the wall of the corresponding needle groove above mentioned, will be guided to its normal position. The loop-check thus also serves as a needle-guide. The lower flat horizontal face of loop-check 405, occupies a position in contact with the upper surface of the looper carrier 376 and an elevation 408, extending transversely across and preferably cast integral with the lower wall of the part 53 of the work-arm, presents a flat upper surface in contact with the under surface of the looper carrier. The end of the looper-bar 375 and parts associated therewith are thus firmly held against vertical vibration during their rapid movements in a horizontal plane.

Portions of the mechanism herein illustrated and described have been made the subject-matter of divisional applications, filed January 12th, 1910, Serial Numbers 537,681; 537,682; 537,683; 537,684; 537,685; and others filed January 28th, 1910, Serial Numbers 540,598 and 540,599.

What I claim is:—

1. In a sewing machine, the combination of a presser-foot; a cross-thread-carrier and a cross-thread hook coöperating therewith; two upright shafts to which said carrier and hook are respectively secured, one of said shafts being mounted and supported in bearings on the presser-foot; and driving connections to said upright shafts.

2. In a sewing machine, the combination of a presser-foot; a cross-thread-carrier and a cross-thread hook coöperating therewith; two upright shafts mounted and supported in bearings on the presser-foot and to which said carrier and hook are respectively secured; and driving connections to said upright shafts.

3. In a sewing-machine, the combination of a presser-foot bar; a presser-foot thereon; a cross-thread carrier; a cross-thread hook; two upright shafts mounted in bearings on the presser-foot and to which said carrier and hook are respectively secured; a sleeve or tubular shaft rotatable about said presser-foot bar; and driving connections to said tubular shaft and from the latter to said upright shafts.

4. In a sewing machine, the combination of a presser-foot bar; a presser-foot thereon; a cross-thread carrier; a cross-thread hook; two upright shafts mounted in bearings on the presser-foot and to which said carrier and hook are respectively secured; a sleeve or tubular shaft rotatable about said presser-foot bar; driving connections to said tubular shaft; and driving connections, including an arm on the lower end of the tubular shaft, from said tubular shaft to the two upright shafts.

5. In a sewing machine the combination of a presser-foot; two upright shafts mounted in bearings on the presser-foot; coöperating thread-handling elements one on each shaft and adapted to act upon thread in the formation of a seam; driving connections extending to said shafts from a main driving shaft of the machine; and presser-foot lifting means under control of operator for elevating the presser-foot and with it the shafts and thread-handling elements.

6. Thread-tensioning means for a plurality of threads, including two longitudinally movable rods; a set of tension plates associated with each rod; means yieldingly pressing the plates of each set together;

means connecting said rods to move together; and means under control of an operator for longitudinally moving said rods to release the pressure between said plates.

7. Thread-tensioning means for a plurality of threads, including a longitudinally movable bar; a plurality of rods having fixed connection to said bar to move therewith; a set of tension plates associated with each rod; means yieldingly pressing the plates of each set together; and means under control of an operator for longitudinally moving said bar and rods to release the pressure between the plates.

8. In a sewing machine, thread-tensioning means for a plurality of threads, including two brackets mounted apart on the frame of the machine; a bar supported and movable longitudinally in the brackets; two rods movable in openings of the brackets respectively and both having fixed connection to the bar to move therewith; a set of tension plates associated with each rod and its corresponding bracket; means yieldingly pressing the plates of each set together; and means under control of an operator for longitudinally moving said bar and rods to release the pressure between the plates.

9. In a sewing machine, thread-tensioning means for a plurality of threads, including two brackets mounted apart on the frame of the machine; a bar supported and movable longitudinally in the brackets; two rods movable in openings of the brackets respectively and both having fixed connection to the bar to move therewith; a set of tension plates associated with each rod and its corresponding bracket; a spring exerting tension to hold the bar and rods in normal position; and a spring associated with each rod and its set of tension plates for yieldingly pressing the plates together when the rod is in its normal position; and means under control of an operator for moving said bar and rods against the pressure of said first-named spring out of normal position, thereby releasing the pressure of the other springs.

10. In a sewing machine, the combination with thread-tensioning means, of a thread-guide consisting of a plate or block having a plurality of radiating thread-openings therethrough, said openings being relatively near together at one end and relatively far apart at their other end.

11. In a sewing machine, the combination of a presser-foot; thread-tensioning means; a rock-arm; connections from the rock-arm adapted upon actuation of the arm either to lift the presser-foot or render thread-tensioning means inactive, or both; connections extending downward from said arm whereby it may be operated; and other actuating means extending to said arm and adapted to be operated by hand.

12. In a sewing machine, the combination of a presser-foot; thread-tensioning means; a rock-arm; connections therefrom adapted upon actuation of the arm either to lift the presser-foot or render the thread-tensioning means inactive, or both; and means for actuating said arm and locking it in the position to which it is moved.

13. The combination with a looper-lever having a fulcrum on which it is oscillatory in a lateral direction and movable longitudinally, of a loop-spreader, and connections from the looper-lever to vibrate the loop-spreader in a direction transverse to the longitudinal movement of the looper-lever.

14. The combination with a looper-lever having a fulcrum on which it is oscillatory in a lateral direction and movable longitudinally, of a loop-spreader; a fixed support on which the loop-spreader is pivotally mounted; and connections from the looper-lever to the loop-spreader adapted to vibrate the latter on its pivot in a direction transverse to the longitudinal movement of the looper-lever.

15. The combination with a looper-lever having a fulcrum on which it is oscillatory in a lateral direction and movable longitudinally, of a loop-spreader; a fixed support on which the loop-spreader is pivotally mounted; and connections between the looper-lever and the loop-spreader comprising a cam-groove on one part engaged by a coöperating element projecting from the other part and adapted to vibrate the loop-spreader on its pivot in a direction transverse to the longitudinal movement of the looper-lever.

In testimony whereof I have signed this specification in the presence of two subscribing witnesses.

ARTHUR A. MERRITT.

Witnesses:
H. A. W. HAYWARD,
J. B. SEDGWICK.

It is hereby certified that in Letters Patent No. 1,041,652, granted October 15, 1912, upon the application of Arthur A. Merritt, of Worcester, Massachusetts, for an improvement in "Sewing-Machines," errors appear in the printed specification requiring correction as follows: Page 7, line 25, for the word "which" read *with;* page 8, line 91, for the reference-numeral "246" read *546;* page 18, line 60, for the word "the" read *its;* same page, line 81, for the compound word "loop-lever" read *looper-lever;* and that the said Letters Patent should be read with these corrections therein that the same may conform to the record of the case in the Patent Office.

Signed and sealed this 26th day of November, A. D., 1912.

[SEAL.]

C. C. BILLINGS,
*Acting Commissioner of Patents.*